(12) United States Patent
Skupin et al.

(10) Patent No.: US 11,425,451 B2
(45) Date of Patent: Aug. 23, 2022

(54) MEDIA STREAMING CONCEPT ALLOWING EFFICIENT SUPPORT OF FAST TUNE-IN AND ANY-TIME SWITCHING

(71) Applicant: FRAUNHOFER-GESELLSCHAFT ZUR FOERDERUNG DER ANGEWANDTEN FORSCHUNG E.V., Munich (DE)

(72) Inventors: Robert Skupin, Berlin (DE); Cornelius Hellge, Berlin (DE); Thomas Schierl, Berlin (DE); Yago Sánchez De La Fuente, Berlin (DE); Thomas Wiegand, Berlin (DE)

(73) Assignee: FRAUNHOFER-GESELLSCHAFT ZUR FOERDERUNG DER WANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/446,726

(22) Filed: Jun. 20, 2019

(65) Prior Publication Data
US 2019/0373308 A1 Dec. 5, 2019

Related U.S. Application Data

(63) Continuation of application No. PCT/EP2017/084062, filed on Dec. 21, 2017.

(30) Foreign Application Priority Data

Dec. 22, 2016 (EP) ...................................... 16206460

(51) Int. Cl.
*H04N 21/438* (2011.01)
*H04N 21/2187* (2011.01)
(Continued)

(52) U.S. Cl.
CPC ..... *H04N 21/4384* (2013.01); *H04N 21/2187* (2013.01); *H04N 21/23439* (2013.01); *H04N 21/84* (2013.01); *H04N 21/8455* (2013.01)

(58) Field of Classification Search
None
See application file for complete search history.

(56) References Cited

U.S. PATENT DOCUMENTS

2012/0084454 A1 4/2012 Lindquist et al.
2013/0091297 A1* 4/2013 Minder .................. H04L 65/80
709/231

(Continued)

FOREIGN PATENT DOCUMENTS

CN 103141114 A 6/2013
CN 103843301 A 6/2014

(Continued)

OTHER PUBLICATIONS

ISA/EP, International Search Report and Written Opinion, dated Mar. 8, 2018, re PCT International Patent Application No. PCT/EP2017/084062.

*Primary Examiner* — Jefferey F Harold
*Assistant Examiner* — Charles N Hicks
(74) *Attorney, Agent, or Firm* — Perry + Currier Inc.

(57) ABSTRACT

Concepts are described which allow to efficiently deal with the enablement of fast tune-in or any-time switching capabilities in streaming media content.

7 Claims, 24 Drawing Sheets

(51) Int. Cl.
*H04N 21/2343* (2011.01)
*H04N 21/84* (2011.01)
*H04N 21/845* (2011.01)

(56) References Cited

U.S. PATENT DOCUMENTS

| | | | |
|---|---|---|---|
| 2014/0280781 A1* | 9/2014 | Gregotski | H04L 67/06 709/219 |
| 2016/0234536 A1* | 8/2016 | Stockhammer | H04L 67/02 |
| 2018/0007395 A1* | 1/2018 | Ugur | H04N 21/4384 |
| 2020/0267429 A1* | 8/2020 | He | H04N 21/8456 |

FOREIGN PATENT DOCUMENTS

| | | |
|---|---|---|
| EP | 2764674 A1 | 8/2014 |
| WO | WO-2016093752 A1 | 6/2016 |
| WO | WO-2016113458 A1 | 7/2016 |

\* cited by examiner

| frames | 1-8 | 9-16 | 17-24 | 15-32 | 33-40 | 41-48 | 49-56 | 57-64 | 65-72 |
|---|---|---|---|---|---|---|---|---|---|
| stream 1 | RAP | | | | | | | | RAP... |
| stream 2 | RAP | RAP | RAP | RAP | RAP | RAP | RAP | RAP | ... |
| stream 3 | RAP | | | | | | | RAP... | | max RAP (stream 1) = 64;
max RAP (stream 2) = 56
desired RAP = 8
N = max RAP/desired RAP

Fig. 1A

| frames | 1-8 | 9-16 | 17-24 | 15-32 | 33-40 | 41-48 | 49-56 | 57-64 | 65-72 | 73-80 | 81-88 | 89-96 | 97-104 | 105-112 | 113-120 | RAP period | quality level | server storage contribution |
|---|---|---|---|---|---|---|---|---|---|---|---|---|---|---|---|---|---|---|
| stream 1 | RAP | | | | | | | | | | | | | | | 64 | 1 | 1.00 |
| stream 2 | | RAP | | | | | | | | | | | | | | 64 | 1 | 1.00 |
| stream 3 | | | RAP | | | | | | | | | | | | | 64 | 1 | 1.00 |
| stream 4 | | | | RAP | | | | | | | | | | | | 64 | 1 | 1.00 |
| stream 5 | | | | | RAP | | | | | | | | | | | 64 | 1 | 1.00 |
| stream 6 | | | | | | RAP | | | | | | | | | | 64 | 1 | 1.00 |
| stream 7 | | | | | | | RAP | | | | | | | | | 64 | 1 | 1.00 |
| stream 8 | | | | | | | | RAP | | | | | | | | 64 | 1 | 1.00 |
| | | | | | | | | | | | | | | | | | sum | 8.00 |

Fig. 1B

| U-RAP frames | 1-8 | 9-16 | 17-24 | 15-32 | 33-40 | 41-48 | 49-56 | 57-64 | RAP period | quality level | server storage contribution |
|---|---|---|---|---|---|---|---|---|---|---|---|
| stream 1 | RAP | | | | | | | | 64 | 1 | 1.00 |
| stream 2 | RAP | RAP | RAP | RAP | RAP | RAP | RAP | RAP | 8 | 8 | 1.00 |
| | | | | | | | | | | sum | 2.00 |

| U-RAP frames | 1-8 | 9-16 | 17-24 | 15-32 | 33-40 | 41-48 | 49-56 | 57-64 | GOP | quality level | server storage contribution |
|---|---|---|---|---|---|---|---|---|---|---|---|
| stream 1 | RAP | | | | | | | | 64 | 3 | 1.00 |
| stream 2 | RAP | RAP | RAP | RAP | RAP | RAP | RAP | RAP | 8 | 3 | 1.40 |
| | | | | | | | | | | sum | 2.40 |

Fig. 1C

| iSIDR | frames | 1-8 | 9-16 | 17-24 | 15-32 | 33-40 | 41-48 | 49-56 | 57-64 | RAP period | quality level | server storage contribution |
|---|---|---|---|---|---|---|---|---|---|---|---|---|
| | stream 1 | RAP | | | | | | | | 64 | 1 | 1.00 |
| | stream 2 | | RAP | | | | | | | 56 | 1 | 0.90 |
| | stream 3 | | | RAP | | | | | | 48 | 1 | 0.80 |
| | stream 4 | | | | RAP | | | | | 40 | 1 | 0.68 |
| | stream 5 | | | | | RAP | | | | 32 | 1 | 0.55 |
| | stream 6 | | | | | | RAP | | | 24 | 1 | 0.43 |
| | stream 7 | | | | | | | RAP | | 16 | 1 | 0.30 |
| | stream 8 | | | | | | | | RAP | 8 | 1 | 0.18 |
| | | | | | | | | | | | sum | 4.83 |

Fig. 1G

| frames | 1-8 | 9-16 | 17-24 | 15-32 | 33-40 | 41-48 | 49-56 | 57-64 | RAP period | quality level | server storage contribution |
|---|---|---|---|---|---|---|---|---|---|---|---|
| stream 1 | RAP | | | | | | | | 64 | 1 | 1.00 |
| stream 2 | | | RAP | | | | | | 48 | 2 | 0.75 |
| stream 3 | | | | | RAP | | | | 32 | 3 | 0.50 |
| stream 4 | | | | | | RAP | | | 16 | 4 | 0.25 |
| stream 5 | | | | RAP | | | | RAP | 8 | 5 | 0.50 |
| | | | | | | | | | | sum | 3.00 |

Fig. 3C

| frames | 1-8 | 9-16 | 17-24 | 15-32 | 33-40 | 41-48 | 49-56 | 57-64 | RAP period | quality level | server storage contribution |
|---|---|---|---|---|---|---|---|---|---|---|---|
| stream 1 | RAP | | | | | | | | 64 | 1 | 1.00 |
| stream 2 | | | RAP | | | | | | 48 | 1 | 0.80 |
| stream 3 | | | | | RAP | | | | 32 | 1 | 0.55 |
| stream 4 | | | | | | RAP | | | 16 | 1 | 0.30 |
| stream 5 | | | | RAP | | | | RAP | 8 | 1 | 0.70 |
| | | | | | | | | | | sum | 3.35 |

Fig. 3D

| alt-RAP | frames | 1-8 | 9-16 | 17-24 | 15-32 | 33-40 | 41-48 | GOP | server storage contribution |
|---|---|---|---|---|---|---|---|---|---|
| | stream 1 | RAP | non-RAP | RAP | non-RAP | RAP | non-RAP | 16 | 1.00 |
| | stream 2 | non-RAP | RAP | non-RAP | RAP | non-RAP | RAP | 16 | 1.00 |
| | | | | | | | | sum | 2.00 |

Fig. 11A

| alt-RAP | frames | 1-8 | 9-16 | 17-24 | 15-32 | 33-40 | 41-48 |
|---|---|---|---|---|---|---|---|
| | stream 1 | RAP / non-RAP | non-RAP / RAP | RAP / non-RAP | non-RAP / RAP | RAP / non-RAP | non-RAP / RAP |
| | stream 2 | non-RAP / RAP | RAP / non-RAP | non-RAP / RAP | RAP / non-RAP | non-RAP / RAP | RAP / non-RAP |

MEDIA STREAMING CONCEPT ALLOWING EFFICIENT SUPPORT OF FAST TUNE-IN AND ANY-TIME SWITCHING

CROSS-REFERENCES TO RELATED APPLICATIONS

This application is a continuation of copending International Application No. PCT/EP2017/084062, filed Dec. 21, 2017, which is incorporated herein by reference in its entirety, and additionally claims priority from European Applications No. EP 16 206 460.4, filed Dec. 22, 2016, which is incorporated herein by reference in its entirety.

BACKGROUND OF THE INVENTION

The present application is concerned with media streaming concepts which may be implemented, for instance, using DASH or some other adaptive streaming environment.

There are several delay-sensitive services that involve a low end-to-end latency, such as events live streaming or VR-streaming (VR=Virtual Reality). When such services are provided using adaptive HTTP streaming techniques, such as MPEG-DASH, some issues arise that make it more challenging to provide a service of quality. Typically, services based on HTTP adaptive streaming make use of a long buffer that helps overcome variations in the network characteristics (instantaneous throughput), as well as in the bitrate of the media stream. Typical buffer lengths used for VoD services (VoD=Video on Demand) might be from 20 seconds up to a couple of minutes.

However, for the mentioned delay-sensitive services, buffer lengths might be from a few hundreds of milliseconds up to a couple of seconds. Under some circumstances, such as small temporary throughput variations, client might need to switch to another representation with a different quality since the buffer might not be long enough to compensate for network variations. In addition to switching, fast tune-in times might be involved for some services. This is important for instance for live streaming services, where a client has to be very close the edge, i.e., to the real time.

In order to be able to perform fast tune-in or "any-time" switching, a Random Access Point (RAP) has to be had very frequently. One of the drawbacks of having very frequent RAPs within a stream is that the coding efficiency sharply decreases as the RAP frequency increases.

FIG. 17 shows by way of a bar graph the BD-rate gains when coding four different videos at RAP periods of 32 frames (left-hand bars) and 64 frames (right-hand bars), respectively, compared to coding the same videos at RAP pitch/period of 16 frames, respectively. This means that simply reducing the RAP distance is no solution as it decreases RD performance.

SUMMARY

According to an embodiment, a device for streaming media content from a server may have: a deriver configured to derive media information from the server, and the media information having first information specifying a set of representations of the media content at which the media content is available for download at the server; second information on, for each of at least a subset of representations, a temporal distribution of random access points of the respective representation, and for each of at least a sub-subset of one or more representations of the subset of representations, a temporal alternation of first intervals of the media content coded into the respective representation and second intervals of the media content lying between the first intervals, a segment downloader configured to download the media content from the server in a sequence of segments with selecting on the basis of the first and second information, for each of at least a subset of the sequence of segments, one of the subset of representations and retrieving the respective segment from the representation selected for the respective segment.

Another embodiment may have a manifest file having a media presentation description having first information specifying a set of representations of media content at which the media content is available for download at a server; second information on, for each of at least a subset of one or more representations of the set of representations, a temporal distribution of random access points of the respective representation, and a temporal alternation of first intervals of the media content coded into the respective representation and second intervals of the media content lying between the first intervals.

Another embodiment may have a server offering a download of a media content, wherein the server stores and sends-out, upon request, to a client segments of a set of representations of the media content, with the representations of the set of representations having the media content coded thereinto in segments, the representations of at least a subset of the set of representations differing in a temporal distribution of random access points, and each of at least a sub-subset of one or more representations of the subset of representations having coded thereinto the media content intermittently; and a media presentation description having first information specifying the set of representations of media content at which the media content is available for download; second information on, for each of at least a subset of one or more representations of the subset of representations, a temporal distribution of random access points of the respective representation, and a temporal alternation of first intervals of the media content coded into the respective representation and second intervals of the media content lying between the first intervals.

According to another embodiment, a method for streaming media content from a server may have the following steps: deriving media information from the server, and the media information having first information specifying a set of representations of the media content at which the media content is available for download at the server; second information on, for each of at least a subset of representations, a temporal distribution of random access points of the respective representation, and for each of at least a sub-subset of one or more representations of the subset of representations, a temporal alternation of first intervals of the media content coded into the respective representation and second intervals of the media content lying between the first intervals, downloading the media content from the server in a sequence of segments with selecting on the basis of the first and second information, for each of at least a subset of the sequence of segments, one of the subset of representations and retrieving the respective segment from the representation selected for the respective segment.

Another embodiment may have a non-transitory digital storage medium having a computer program stored thereon to perform the method for streaming media content from a server, the method having the steps of: deriving media information from the server, and the media information having first information specifying a set of representations of the media content at which the media content is available for download at the server; second information on, for each of at least a subset of representations, a temporal distribution of random access points of the respective representation, and for each of at least a sub-subset of one or more representations of the subset of representations, a temporal alternation of first intervals of the media content coded into the respective representation and second intervals of the media content lying between the first intervals, downloading the media content from the server in a sequence of segments with selecting on the basis of the first and second information, for each of at least a subset of the sequence of segments, one of the subset of representations and retrieving the respective segment from the representation selected for the respective segment, when said computer program is run by a computer.

According to another embodiment, a device for streaming media content from a server may have: a deriver configured to derive media information from the server, the media information having first information specifying a set of representations of the media content at which the media content is available for download at the server; second information on, for a first representation of a subset of representations of the set of representations, a temporal distribution of random access points of the first representation, and third information on, for each of one or more second representations of the subset of representations, a temporal distribution of random access points of the respective second representation and specifying that the respective second representation is of lower priority than the first representation, a segment downloader configured to download the media content from the server in a sequence of segments with selecting on the basis for the media information, for each of the sequence of segments, one of the set of representations and retrieving the respective segment from the representation selected for the respective segment, wherein the segment downloader is configured to, responsive to commencing downloading the media content by selecting and retrieving from any of the subset of representations, based on the second and third information, detect a next-to-come random access point of the first representation and, select for segments preceding the next-to-come random access point of the first representation, one of the one or more second representations, and for segments including and succeeding the next-to-come random access point of the first representation, the first representation.

Another embodiment may have a manifest file having a media presentation description having first information specifying a set of representations of a media content at which the media content is available for download; second information on, for a first representation of a subset of representations of the set of representations, a temporal distribution of random access points of the first representation, and a third information on, for each of one or more second representations of the subset of representations, a temporal distribution of random access points of the respective second representation and specifying that the respective second representation is of lower priority than the first representation.

Another embodiment may have a server offering a download of a media content, wherein the server stores and sends-out, upon request, to a client segments of a set of representations of the media content, with the representations of the set of representations having the media content coded thereinto in segments, and the representations of at least a subset of the set of representations differing in a temporal distribution of random access points, and a media presentation description having first information specifying the set of representations of the media content at which the media content is available for download at the server; second information on, for a first representation of the subset of representations of the set of representations, a temporal distribution of random access points of the first representation, and third information on, for each of one or more second representations of the subset of representations, a temporal distribution of random access points of the respective second representation and specifying that the respective second representation is of lower priority than the first representation.

According to another embodiment, a method for streaming media content from a server may have the following steps: deriving media information from the server, the media information having first information specifying a set of representations of the media content at which the media content is available for download at the server; second information on, for a first representation of a subset of representations of the set of representations, a temporal distribution of random access points of the first representation, and third information on, for each of one or more second representations of the subset of representations, a temporal distribution of random access points of the respective second representation and specifying that the respective second representation is of lower priority than the first representation, downloading the media content from the server in a sequence of segments with selecting on the basis for the media information, for each of the sequence of segments, one of the set of representations and retrieving the respective segment from the representation selected for the respective segment, wherein the method may have the steps of, responsive to commencing downloading the media content by selecting and retrieving from any of the subset of representations, based on the second and third information, detecting a next-to-come random access point of the first representation and, selecting for segments preceding the next-to-come random access point of the first representation, one of the one or more second representations, and for segments including and succeeding the next-to-come random access point of the first representation, the first representation.

Another embodiment may have a non-transitory digital storage medium having a computer program stored thereon to perform the method for streaming media content from a server, the method having the steps of: deriving media information from the server, the media information having first information specifying a set of representations of the media content at which the media content is available for download at the server; second information on, for a first representation of a subset of representations of the set of representations, a temporal distribution of random access points of the first representation, and third information on, for each of one or more second representations of the subset of representations, a temporal distribution of random access points of the respective second representation and specifying that the respective second representation is of lower priority than the first representation, downloading the media content from the server in a sequence of segments with selecting on the basis for the media information, for each of the sequence of segments, one of the set of representations and retrieving the respective segment from the representation selected for the respective segment, wherein the method may have the steps of, responsive to commencing downloading the media content by selecting and retrieving from any of the subset of representations, based on the second and third information, detecting a next-to-come random access point of the first representation and, selecting for segments preceding the next-to-come random access point of the first representation, one of the one or more second representations, and for segments including and succeeding the next-to-come random access point of the first representation, the first representation, when said computer program is run by a computer.

According to another embodiment, a device for streaming media content from a server in segments may have a deriver configured to derive media information from the server, the media information having first information specifying a set of representations of the media content at which the media content is available for download at the server, and second information on the temporal distribution of random access points of the representations of at least a subset of representations of the set of representations, and a segment downloader configured to download the media content from the server in a sequence of segments by selecting for each segment one of the set of representations on the basis of the media information and retrieving each segment from the representation selected for the respective segment, wherein the segment downloader is configured to perform the selection for a subsequence of segments of the sequence of segments on the basis of the first and second information such that the representation selected for the segments of the subsequence alternates between the representations of the subset of representations at segments where random access points of the representations of the subset of representations to which the selection alternates, are absent.

Another embodiment may have a manifest file having a media presentation description having first information specifying a set of representations of a media content at which the media content is available for download, and second information on the temporal distribution of random access points of the representations of at least a subset of representations of the set of representations, and a hint related to a temporal distance between random access points within a subsequence of segments resulting from selecting and retrieving the subsequence of segments from the subset of representations in a manner alternating between the representations of the subset of representations at segments where random access points of the representations of the subset of representations to which the selection alternates, are absent.

Another embodiment may have a server offering a download of a media content, wherein the server stores and sends-out, upon request, to a client a segments of a set of representations of the media content, with the representations of the set of representations having the media content coded thereinto in the segments, and the representations of at least a subset of the set of representations differing in a temporal distribution of random access points, and a media presentation description having a first information specifying a set of representations of the media content at which the media content is available for download at the server, and a second information on the temporal distribution of random access points of the representations of a subset of representations of the set of representations, and a hint related to a temporal distance between random access points within a subsequence of segments resulting from downloading the subsequence of segments from the subset of representations in a manner alternating between the representations of the subset of representations at segments where random access points of the representations of the subset of representations between which the selection alternates, are absent.

According to another embodiment, a method for streaming media content from a server in segments may have the steps of: deriving media information from the server, the media information having first information specifying a set of representations of the media content at which the media content is available for download at the server, and second information on the temporal distribution of random access points of the representations of at least a subset of representations of the set of representations, and downloading the media content from the server in a sequence of segments by selecting for each segment one of the set of representations on the basis of the media information and retrieving each segment from the representation selected for the respective segment, wherein the selection for a subsequence of segments of the sequence of segments on the basis of the first and second information is performed such that the representation selected for the segments of the subsequence alternates between the representations of the subset of representations at segments where random access points of the representations of the subset of representations to which the selection alternates, are absent.

Another embodiment may have a non-transitory digital storage medium having a computer program stored thereon to perform the method for streaming media content from a server in segments, the method having the steps of: deriving media information from the server, the media information having first information specifying a set of representations of the media content at which the media content is available for download at the server, and second information on the temporal distribution of random access points of the representations of at least a subset of representations of the set of representations, and downloading the media content from the server in a sequence of segments by selecting for each segment one of the set of representations on the basis of the media information and retrieving each segment from the representation selected for the respective segment, wherein the selection for a subsequence of segments of the sequence of segments on the basis of the first and second information is performed such that the representation selected for the segments of the subsequence alternates between the representations of the subset of representations at segments where random access points of the representations of the subset of representations to which the selection alternates, are absent, when said computer program is run by a computer.

According to another embodiment, a device for streaming media content from a server may have: a deriver configured to derive media information from the server, and the media information having first information specifying a set of representations of the media content at which the media content is available for download at the server; second information on, subdividing the set of representations into subsets of one or more representations, by bitrate or quality so that the subsets are associated with different bitrates and/or different qualities, and the representations of one subset are associated with one bitrate and/or quality, at least a predetermined subset of the subsets including at least two representations; third information on, for each representation of the predetermined subset, a temporal distribution of random access points of the respective representation, and a segment downloader configured to download the media content from the server in a sequence of segments with selecting on the basis of the media information, for each of the sequence of segments, one of the set of representations and retrieving the respective segment from the representation selected for the respective segment, wherein the segment downloader is configured to perform rate adaptation by switching between the subsets; and responsive to switching to the predetermined subset, detecting, based on the third information, one of the representations of the predetermined subset which has, among the random access points of all representations of the predetermined subset, the random access point which occurs soonest relative to the switching to the predetermined subset, and selecting the one representation for a first segment at switching to the predetermined subset.

Another embodiment may have a manifest file having a media presentation description having first information specifying a set of representations of the media content at which the media content is available for download at a server; second information on, subdividing the set of representations into subsets of one or more representations, by bitrate or quality so that the subsets are associated with different bitrates and/or different qualities, for switching between the subsets for rate adaptivity, and the representations of one subset are associated with one bitrate and/or quality, with at least a predetermined subset of the subsets including at least two representations for switching between them for enabling fast tune-in; third information on, for each representation of the predetermined subset, a temporal distribution of random access points of the respective representation.

Another embodiment may have a server offering a download of a media content, wherein the server stores and sends-out, upon request, to a client segments of a set of representations of the media content, with the representations of the set of representations having the media content coded thereinto in segments, the set of representations being subdivided into subsets of one or more representations so that the subsets are associated with different bitrates and/or different qualities for allowing switching between the subsets for rate adaptivity, and the representations of one subset are associated with one bitrate and/or quality, the representations of at least a predetermined one of the subsets differing in a temporal distribution of random access points, and a media presentation description having first information specifying a set of representations of the media content at which the media content is available for download at a server; second information on, subdividing the set of representations into subsets of one or more representations, by bitrate or quality so that the subsets are associated with different bitrates and/or different qualities, for switching between the subsets for rate adaptivity, and the representations of one subset are associated with one bitrate and/or quality, with at least a predetermined subset of the subsets including at least two representations for switching between them for enabling fast tune-in; third information on, for each representation of the predetermined subset, a temporal distribution of random access points of the respective representation.

According to another embodiment, a method for streaming media content from a server may have the following steps: deriving media information from the server, and the media information having first information specifying a set of representations of the media content at which the media content is available for download at the server; second information on, subdividing the set of representations into subsets of one or more representations, by bitrate or quality so that the subsets are associated with different bitrates and/or different qualities, and the representations of one subset are associated with one bitrate and/or quality, at least a predetermined subset of the subsets including at least two representations; third information on, for each representation of the predetermined subset, a temporal distribution of random access points of the respective representation, and downloading the media content from the server in a sequence of segments with selecting on the basis of the media information, for each of the sequence of segments, one of the set of representations and retrieving the respective segment from the representation selected for the respective segment, wherein the downloading includes performing rate adaptation by switching between the subsets; and responsive to switching to the predetermined subset, detecting, based on the third information, one of the representations of the predetermined subset which has, among the random access points of all representations of the predetermined subset, the random access point which occurs soonest relative to the switching to the predetermined subset, and selecting the one representation for a first segment at switching to the predetermined subset.

Another embodiment may have a non-transitory digital storage medium having a computer program stored thereon to perform the method for streaming media content from a server, the method having the steps of: deriving media information from the server, and the media information having first information specifying a set of representations of the media content at which the media content is available for download at the server; second information on, subdividing the set of representations into subsets of one or more representations, by bitrate or quality so that the subsets are associated with different bitrates and/or different qualities, and the representations of one subset are associated with one bitrate and/or quality, at least a predetermined subset of the subsets including at least two representations; third information on, for each representation of the predetermined subset, a temporal distribution of random access points of the respective representation, and downloading the media content from the server in a sequence of segments with selecting on the basis of the media information, for each of the sequence of segments, one of the set of representations and retrieving the respective segment from the representation selected for the respective segment, wherein the downloading includes performing rate adaptation by switching between the subsets; and responsive to switching to the predetermined subset, detecting, based on the third information, one of the representations of the predetermined subset which has, among the random access points of all representations of the predetermined subset, the random access point which occurs soonest relative to the switching to the predetermined subset, and selecting the one representation for a first segment at switching to the predetermined subset, when said computer program is run by a computer.

According to another embodiment, a device for streaming media content from a server may have: a deriver configured to derive media information from the server, the media information having first information specifying a set of representations of the media content at which the media content is available for download at the server; second information on a media content availability duration for which the media content is available at the server, and third information on a fast random access capability duration, a segment downloader configured to download the media content from the server in a sequence of segments with selecting, on the basis of the MPD, for each of the sequence of segments, one of the set of representations and retrieving the respective segment from the representation selected for the respective segment, wherein the segment downloader is configured to, when commencing downloading the media content by selecting and retrieving from the subset of representations, derive a minimum of an availability duration of a primary representation of the subset of representations from the media content availability duration, and check whether the fast random access capability duration has already been exceeded, and if so, perform the selecting, on the basis of the MPD, for each of the sequence of segments, one of the set of representations in a manner so that a set of one or more secondary representations of the subset of representations are excluded from being selected, or the selection follows a predetermined one-dimensional temporal selection path through the representations of the subset, and if not, perform the selecting, on the basis of the MPD, for each of the sequence of segments, so that the set of one or more secondary representations of the subset of representations are available for selection and use the set of one or more secondary representations for a faster random access.

Another embodiment may have a server offering a download of a media content, wherein the server stores and sends-out, upon request, to a client segments of a set of representations of the media content, with the representations of the set of representations having the media content coded thereinto in segments, and the representations of at least a subset of the set of representations differing in a temporal distribution of random access points, and a media presentation description having a first information specifying a set of representations of a media content at which the media content is available for download at the server; a second information on a media content availability duration for which the media content is available at the server, and a third information on a fast random access capability duration, wherein the server is configured to provide a minimum availability duration for a primary representation of the set of representations according to the media content availability duration, and provide a minimum availability duration for a set of one or more secondary representations of the subset of representations according to the fast random access capability duration, wherein the fast random access capability duration is shorter than the media content availability duration.

According to another embodiment, a method for streaming media content from a server may have the following steps: deriving media information from the server, the media information having first information specifying a set of representations of the media content at which the media content is available for download at the server; second information on a media content availability duration for which the media content is available at the server, and third information on a fast random access capability duration, downloading the media content from the server in a sequence of segments with selecting, on the basis of the MPD, for each of the sequence of segments, one of the set of representations and retrieving the respective segment from the representation selected for the respective segment, the method having the steps of, when commencing downloading the media content by selecting and retrieving from the subset of representations, deriving a minimum of an availability duration of a primary representation of the subset of representations from the media content availability duration, and checking whether the fast random access capability duration has already been exceeded, and if so, perform the selecting, on the basis of the MPD, for each of the sequence of segments, one of the set of representations in a manner so that a set of one or more secondary representations of the subset of representations are excluded from being selected, or the selection follows a predetermined one-dimensional temporal selection path through the representations of the subset, and and if not, perform the selecting, on the basis of the MPD, for each of the sequence of segments, so that the set of one or more secondary representations of the subset of representations are available for selection und use the set of one or more secondary representations for a faster random access.

Another embodiment may have a non-transitory digital storage medium having a computer program stored thereon to perform the method for streaming media content from a server, the method having the steps of: deriving media information from the server, the media information having first information specifying a set of representations of the media content at which the media content is available for download at the server; second information on a media content availability duration for which the media content is available at the server, and third information on a fast random access capability duration, downloading the media content from the server in a sequence of segments with selecting, on the basis of the MPD, for each of the sequence of segments, one of the set of representations and retrieving the respective segment from the representation selected for the respective segment, the method having the steps of, when commencing downloading the media content by selecting and retrieving from the subset of representations, deriving a minimum of an availability duration of a primary representation of the subset of representations from the media content availability duration, and checking whether the fast random access capability duration has already been exceeded, and if so, perform the selecting, on the basis of the MPD, for each of the sequence of segments, one of the set of representations in a manner so that a set of one or more secondary representations of the subset of representations are excluded from being selected, or the selection follows a predetermined one-dimensional temporal selection path through the representations of the subset, and if not, perform the selecting, on the basis of the MPD, for each of the sequence of segments, so that the set of one or more secondary representations of the subset of representations are available for selection und use the set of one or more secondary representations for a faster random access, when said computer program is run by a computer.

According to another embodiment, a media content source provider for generating a set of representations of a media content for live-streaming may have a media content input for the media content, one or more encoders for encoding the media content into a set of representations in segments so that the representations of the set of representations differ in a temporal distribution of random access points, an output for outputting the set of representations, wherein the media content source provider is configured so that the set of the representations has at least one first representation into which the media content is coded continuously, and at least one second representation into which the media content is coded intermittently so that, within each interval between consecutive random access points of the first representation, the at least one second representation has at least one first segment within which the media content is not coded into the at least one second representation or within which the media content is coded into the at least one second representation at reduced quality, and at least one second segment forming a random access point of the at least one second representation.

According to another embodiment, a method for generating a set of representations of a media content for live-streaming may have the steps of: receiving the media content, encoding the media content into a set of representations in segments so that the representations of the set of representations differ in a temporal distribution of random access points, wherein the media content source provider is configured so that the set of the representations has at least one first representation into which the media content is coded continuously, and at least one second representation into which the media content is coded intermittently so that, within each interval between consecutive random access points of the first representation, the at least one second representation has at least one first segment within which the media content is not coded into the at least one second representation or within which the media content is coded into the at least one second representation at reduced quality, and at least one second segment forming a random access point of the at least one second representation.

Another embodiment may have a non-transitory digital storage medium having a computer program stored thereon to perform the method for generating a set of representations of a media content for live-streaming, the method having the steps of: receiving the media content, encoding the media content into a set of representations in segments so that the representations of the set of representations differ in a temporal distribution of random access points, wherein the media content source provider is configured so that the set of the representations has at least one first representation into which the media content is coded continuously, and at least one second representation into which the media content is coded intermittently so that, within each interval between consecutive random access points of the first representation, the at least one second representation has at least one first segment within which the media content is not coded into the at least one second representation or within which the media content is coded into the at least one second representation at reduced quality, and at least one second segment forming a random access point of the at least one second representation, when said computer program is run by a computer.

According to another embodiment, a media content source provider for generating a set of representations of a media content for live-streaming may have: a media content input for the media content, one or more encoders for encoding the media content into a set of representations in segments so that the representations of the set of representations differ in a temporal distribution of random access points, an output for outputting the set of representations, wherein the media content source provider has a drift measurer configured to generate a drift measure for a drift of a sequence of segments of the media content resulting from selecting the segments from the set of representations with alternating between the representations at segments where the representations between which the selection alternates, have no random access point, and control at least one of the one or more encoders so that the coding of the media content into at least one of the set of representations depends on the drift measure.

According to another embodiment, a method for generating a set of representations of a media content for live-streaming may have the steps of: receiving a media content, by one or more encoders, encoding the media content into a set of representations in segments so that the representations of the set of representations differ in a temporal distribution of random access points, outputting the set of representations, generating a drift measure for a drift of a sequence of segments of the media content resulting from selecting the segments from the set of representations with alternating between the representations at segments where the representations between which the selection alternates, have no random access point, and controlling at least one of the one or more encoders so that the coding of the media content into at least one of the set of representations depends on the drift measure.

Another embodiment may have a non-transitory digital storage medium having a computer program stored thereon to perform the method for generating a set of representations of a media content for live-streaming, the method having the steps of: receiving a media content, by one or more encoders, encoding the media content into a set of representations in segments so that the representations of the set of representations differ in a temporal distribution of random access points, outputting the set of representations, generating a drift measure for a drift of a sequence of segments of the media content resulting from selecting the segments from the set of representations with alternating between the representations at segments where the representations between which the selection alternates, have no random access point, and controlling at least one of the one or more encoders so that the coding of the media content into at least one of the set of representations depends on the drift measure, when said computer program is run by a computer.

The aspects of the present application discussed below are inspired by the idea that an efficient tune-in or anytime-switching into a certain media content is possible by rendering available the media content in more than one representation substantially relating to the same bitrate level and/or quality, so that the juxtaposition of the more than one representation may allow for a higher temporal RAP density than the individual representations, and/or vice versa, the juxtaposition of the more than one representation may allow for an increase of the temporal RAP density of the downloaded stream compared to the individual representations.

In accordance with a first aspect of the present application, media streaming is made more efficient in handling fast tune-in and any-time switching capabilities, by designing the set of representations of the media content in such a manner, and providing the client with information allowing same to derive, that the set of representations comprises at least a subset of representations of which each has a respective temporal distribution of random access points associated therewith, and of which at least a sub-subset of one or more representations has the media content coded thereinto intermittently, so that intervals of the media content coded into the respective representation are temporarily separated by other intervals of the media content lying between the coded intervals. By this measure, the aforementioned server-side overhead with respect to storage capacity and management is reduced, owing to the intermittent coding nature of the sub-subset of representations, and the subset of representations may be designed such that fast tune-in is feasible at dense grid of a pool of random access points stemming from all representations of the subset of representations. In accordance with an embodiment, 1) at least one representation of the subset has encoded thereinto the media content non-intermittently, 2) the one or more other (discontinuous) representations of the sub-subset has its RAPs temporarily distributed in such a manner that the frequency at which an RAP occurs in any of the subset or representations complies with the desired tune-in or any-time switching capability, and 3) it is true for each random access point of a discontinuous representation that either the media content is coded into this representation until the next-to-come random access point of the at least one continuous representation or it is possible to, at, or prior to, reaching a non-coded interval of the respective discontinuous representation to switch to another discontinuous representation via a random access point of the latter, thereby reaching the next-to-come random access point of the continuous representation. That is, by informing the streaming device on the temporal distribution of random access points of the subset of representations and the temporal alternation of coded first intervals and second intervals lying therebetween, with respect to the one or more discontinuous representations, the segment downloader of such a streaming device is able to take this information into account when downloading the media content. In particular, faster switching into the subset of representations is feasible. The set of representations at which the media content is rendered available for download at the server, may comprise, or may not comprise, additional representations beyond the subset of representations into which tune-in or any-time switching is rendered faster.

In accordance with the second aspect of the present application, the aim of more efficiently allowing for a fast tune-in or any-time switching capability, is achieved by designing at least a subset of the set of representations at which a media content is rendered available for download at the server, in such a manner that the temporal distribution of random access points is signaled for a subset of representations, and that 2) one or more second representations of this subset are signaled to be of lower priority than a first representation of the subset. By this measure, the streaming device or client knows about the subsidiary nature of the second representations relative to the first representation and that these second or subsidiary representations should merely be used for fast tune-in or any-time switching instances. The subsidiary or second representations do not necessarily need to be discontinuous representations, i.e., representations having the media content coded thereinto intermittently as is the case in accordance with the first aspect. Rather, the second or secondary representations could have the media content coded thereinto at varying quality, such as at reduced quality at intervals where switching to the first representation or to another second representation enables bridging of the time until the next-to-come random access point of the next representation. Alternatively, simple black or idle data intervals may be provided between coded intervals of the second representations instead of the aforementioned non-coded intervals of the first aspect so that the second representations in accordance with the second aspect would not result in an error at the client side if continuously reproduced, nevertheless reducing the storage capacity at the server-side. The second or subsidiary representations could even be designed in a "complete manner", or in a manner like the first representation, i.e. could be completely coded. The priority ranking would in this case avoid that the streaming device remains being stuck in one of the secondary representations which may be less RD efficient than the first representation and should merely be used till reaching the next RAP of the first representation. The streaming device or client, being informed on the temporal distribution of random access points of the subset of representations is able to use the secondary representations in order to switch into any of the subset of representations earlier, than solely relying on the random access points of the first representation.

In accordance with a third aspect of the present application, streaming media content is made more efficient with respect to supporting fast tune-in and any-time switching, by offering to the streaming device or client within the set of representations at which the media content is available for download at the server, at least a subset of representations between which the streaming device may alternate at segments where random access points of the representations between which the alternation takes place, are absent. The subset of representations may comprise merely two representations. By alternating between these representations, the random access points of these representations may be "bypass" for a certain number of segments long to take advantage of a corresponding lower bitrate at which the media content is streamed. The server may inform the client about a relationship between quality and random access point distance resulting from bypassing a number of random access points of the subset of representations. For example, a promise may be provided to the streaming device or client informing the latter on a guaranteed quality met, adhering to some maximum random access point distance/pitch and the downloaded sequence selected from the subset of representations. As for the other aspects, the set of representations may, in addition to the subset of representations, comprise further representations or not.

In accordance with a fourth aspect of the present application, media streaming is made more efficient in handling fast tune-in and any-time switching capabilities, by designing the set of representations of the media content in such a manner that the set of representations is subdivided into subsets of one or more representations so that the subsets are associated with different bitrates and/or different qualities and allow for switching between the subsets for rate adaption, while the representations of one subset are associated with one bitrate and/or quality, and that the representations of at least a predetermined one of the subsets differ in a temporal distribution of random access points so as to enable fast tune-in, or switching to, the predetermined subset. Thus, in accordance with the fourth aspect of the present application, the subset subdivision represents a kind of clustering or, in different terms, provides a new dimension of offering the media content: a subset like the predetermined subset, enable faster tune-in or switching to the respective subset, but merely represent one adaption level for enabling rate adaptive download of the media content. In case of merely having one such subset, same allows for rapidly accessing the media content via this subset before starting rate adaptation by switching to other subsets which may have merely one representation each. In case of each subset allowing fast tune-in, same allows for rapidly switching between the bitrate and/or quality levels associated with the subsets so that rate adaptation is enabled at a fine temporal grid, thereby enabling a fast reactivity to transmission bandwidth variations and, accordingly, keeping buffer level for compensating bandwidth variation low. The at least one predetermined subset may, for example, be designed in accordance with the first, second or third aspect.

A fifth aspect of the present application seeks to render media streaming more efficient in terms of supporting fast tune-in or any-time switching by offering a set of representations at which a certain media content is available for download at the server, along with information on a media content availability duration and a fast random access capability duration. The former concerns a minimum of an availability duration of a primary representation of the subset of representations or of a predetermined one-dimensional selection path through the subset of representations, while the latter concerns the availability of secondary representations. If the secondary representations are still present according to the fast random access capability duration, the same may be used for fast tune-in or any-time switching, i.e., for a faster random access. By this measure, a live media stream may, for instance, be offered in a manner so that the effort in terms of storage capacity and management overhead at the server-side may be kept at a minimum around the "real time" of the media content.

The present application also provides concepts for generating sets of representations which may be used in connection with the first to fourth aspects of the present application. Thus, in accordance with a sixth aspect of the present application, a media content source provider which generates a set of representations of a media content for live streaming in such a manner that the set of representations comprises at least one continuous representation and at least one discontinuous representation. And with respect to a sixth aspect of the present application, a media content source provider generates a set of representations of a media content for live streaming in such a manner that a drift measurer controls one or more encoders used for encoding the media content into the set of representations depending on a drift measure which measures a sequence of segments of the media content resulting from selecting the segments from the set of representations, alternating between the representations and segments where the representations between which the selection alternates, have no random access point.

BRIEF DESCRIPTION OF THE DRAWINGS

Embodiments of the present invention will be detailed subsequently referring to the appended drawings, in which:

FIG. 1A shows a schematic diagram illustrating three streams pairs of which could be used to form a design of a set of representations having their RAP segments temporally arranged at different RAP distances so as to enable fast tune-in using the low RAP distance representation, with this configuration being called U-RAP configuration;

FIG. 1B shows a schematic diagram illustrating a design of a set of representations having their RAP segments temporally arranged in a staggered manner so as to enable fast tune-in, with this configuration being called SIDR; on the right hand side, the resulting storage overhead at server-side is indicated;

FIG. 1C schematically indicates another construction of a representation subset allowing fast tune-in, called U-RAP, indicating the resulting server overhead at the server-side at the top of FIG. 1C for the case of construing the participating representations in a manner so as to achieve constant bitrate at tune-in situations, and at the bottom of FIG. 1C the storage capacity overhead for the case of designing this configuration so as to achieve static quality at tune-in situations;

FIG. 1G shows a schematic diagram showing the iSIDR configuration of FIG. 1F, however designed to attain constant quality at tune-in situations rather than constant bitrate at tune-in, as depicted in FIG. 1F;

FIGS. 3A & 3B show schematic diagrams illustrating a configuration called Dyadic RAP with FIG. 3A showing the resulting storage overhead server-side resulting from designing this configuration to achieve constant bitrate in switching situations, while FIG. 3B shows the resulting storage overhead at server-side when designing this configuration to achieve constant quality in switching situations;

FIGS. 3C & 3D show schematic diagrams corresponding to the ones of FIGS. 3A and 3B but with respect to another switching configuration, namely a switching configuration called 1/M Reduction RAP;

FIG. 11A shows a schematic diagram illustrating a design of a subset of representations allowing a construction or composition of a finally downloaded/selected sequence of segments, or at least a sub-sequence thereof, within which the RAP interval is greater than the RAP interval of the participating representations of the subset, this configuration being called alt-RAP, with the resulting or associated storage overhead at server-side being indicated on the right hand side;

FIG. 11B shows a schematic diagram illustrating for the example of FIG. 11A an example of composing a downloaded/selected sequence of segments of an RAP interval having the length of 3 segments;

FIG. 11C, D shows a schematic diagram illustrating for two examples of a design of a subset of representations prepared for alternating download with fast tune-in capability, wherein examples for paths are indicated which may remain on the server after expiration of some live featuring offering;

Figure 1D:
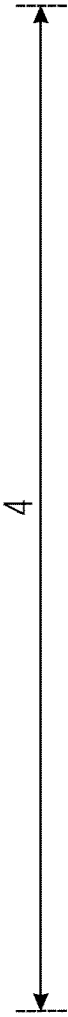
FIG. 1D shows a schematic diagram illustrating a modification of the U-RAP configuration of the top half of FIG. 1C by removing the duplication of the RAP segments at both streams, so as to obtain an iU-RAP configuration, indicating the resulting the storage overhead at server-side on the right hand side.

Before describing in more detail below various embodiments of the present application associated with the various aspects of the present application, various comparison concepts to allow for supporting faster tune-in or any-time switching are discussed. It should be noted that the media content streamed in accordance with the concepts described below in the embodiments of the present application described below, may be any media content such as, but not exclusively, video or audio. Alternative kinds of media content are, for instance, 3D measures, simulation data such as weather data or the like.

As a first example, think of adding a representation/stream of low RAP distance to a representation/stream of high RAP distance. Let N be the relation between rate at highest/maximum RAP period and lowest/desired RAP period, e.g., GOP size, then FIG. 1A illustrates N=8 between streams 1 and 2 and N=7 between streams 3 and 4.

Consider the co-availability of streams 1 and 2 for a client at a server. That is, stream 1 is segmented into segments just as stream 2 is, such as segments of a length coinciding with the RAP distance of stream 2, i.e., 8 frames in the example of FIG. 1A. In stream 2, every segment has an RAP while this is true only for every 8th segment for stream 1. Both streams represent the same media, but stream 1 has the media coded thereinto more efficiently than stream 2 owing to the increased RAP distance. A client seeking to tune-in into the media at a temporal position other than the RAP segments of stream 1 may firstly tune-in into stream 2 then transitioning or switching to stream 1 as soon as stream 1 has its next RAP segment. The same applies when switching from another representation of the same media, i.e., representations other than streams 1 and 2, to the media represented by streams 1 and 2.

Although the solution presented in FIG. 1A in order to provide fast tune-in and any-time switching capability, one disadvantage of the solution is the increased overhead at server-side and the difficulty in trying to keep the noticeability in quality/bitrate variation when using the additional stream 2 preliminarily for tune-in as low as possible despite huge differences in random access point distance between both streams. The increased overhead pertains, for instance, to the storage capacity and management. Rendering available stream 2 in addition to stream 1 results in spending more than twice the storage capacity than compared to rendering available stream 1 only, since stream 2 is less RD efficient. This additional overhead is especially problematic when dealing with applications such as panoramic scenes sub-divided into many tiles each associated with a different view section and separately represented by a different set of streams/representations. Such a circumstance occurs, for example, in virtual reality applications. In such a case, spending an additional stream for fast tune-in or switching capabilities duplicates an amount of data which is huge already. Beyond that in case of having to cope with a huge difference in random access point distance between both streams, the RD performance of both streams becomes considerable, and this leads to noticeable discontinuities at tune-in with respect to at least bitrate or quality, because the client has to bridge the time till encountering the next RAP of the large RAP distance stream using the additional stream having low RD performance.

One option to support fast tune-in or any-time switching even more efficient is to provide the media content in the form of representations with a mutually equal random access point period, but mutually shifted random access point positions. In case of video, the IDR (instantaneous decoding refresh) pictures of the representation would be shifted relative to each other with a random access point period, however, being equal to each other. This concept is illustrated in FIG. 1B and called SIDR in the following (shifted IDR) although, as already indicated above, the concept is not only applicable to video data but also to audio data. Although FIG. 1B is called shifted IDR, it should be noted that IDRs are merely one possible example for random access points and that other types of random access points may be used as well such as CRAs or the like. This note is applicable to all RAPs mentioned hereinafter and shown in the figures.

In accordance with the SIDR concept, media data is made available at the server in the form of several streams called streams 1-8 in FIG. 1B. The RAP period is equal among these streams. However, the RAP offset varies among the streams. All streams may have equal quality at approximately equal bitrate. To be more precise, while the RAP period 4 is equal for all streams of FIG. 1B, the RAPs of stream 2 are offset to the RAPs of stream 1 by an RAP offset 6 which is 1/N times the RAP period 4 with N=8 in the exemplary case of FIG. 1B. Likewise, stream 3 has its RAPs offset relative to the RAPs of stream 1 by two times the RAP offset 6, stream 4 has its RAPS offset to the RAPs of stream 1 by three times the RAP offset 6, and so forth. Naturally, N may be chosen differently, i.e., may be different from 8. Likewise, FIG. 1B indicates merely for illustration purposes that the RAP period 4 is 64 frames long, while the RAP offset 6 is 8 frames long. The streams 1 to 8 may be retrievable or downloadable by the client in segments of a length corresponding to the RAP offset 6, for instance, or segments even shorter than the RAP offset 6, but alternatives thereof may also be feasible. In some, all the encoded streams lead to an overhead of N in case of the streams having approximately equal bitrate. In the example of FIG. 1B, for instance, the overhead is equal to 8 with a maximum RAP period of 64, an effective RAP distance or period of 8 frames for a faster tune-in or any-time switching. The GOP (group of picture) size used to encode the media content into streams 1 to 8 may be 8 frames.

Contrary to SIDR, it is possible to combine streams with unequal RAP periods. The combination of such streams with unequal RAP periods influences the coding efficiency of the streams. The resulting service offered at the server can be set up to offer the streams, for instance, at approximately equal bitrate at varying quality or at approximately equal quality with varying bitrate. Both options are discussed in the following.

In the case of approximately equal quality, it is assumed that the following pairs of RAP period to overhead wherein overhead denotes the overhead associated with the insertion of the RAPs at the RAP period relative to no insertion of RAP periods. The pairs are summarized in the table below:

| RAP Period | Overhead |
| --- | --- |
| 96 | 0.98 |
| 72 | 0.99 |
| 64 | 1.00 |
| 56 | 1.03 |
| 48 | 1.06 |
| 40 | 1.08 |
| 32 | 1.10 |
| 24 | 1.15 |
| 16 | 1.20 |
| 8 | 1.40 |

In the case of approximately equal bitrate, the following pairs of RAP period on the one hand and quality level on the other hand, are assumed:

| RAP Period | Quality Level |
| --- | --- |
| 64 | 1 |
| 56 | 2 |
| 48 | 3 |
| 40 | 4 |
| 32 | 5 |
| 24 | 6 |
| 16 | 7 |
| 8 | 8 |

The following consideration assumes segment-wise CBR (constant bitrate) for the approximately equal bitrate case.

With respect to FIG. 1C, one example of using unequal RAP periods is illustrated. This concept is denoted U-RAP. In accordance with U-RAP, a media content is offered with two streams so that the overhead involved with implementing U-RAP is substantially a duplication of storage capacity and management at server-side, i.e., the overhead is substantially two for the case of approximately equal bitrate. In particular, one stream, called stream 1, in FIG. 1C, offers the media content at the highest/maximum RAP period whereas the other, called stream 2 in FIG. 1C, offers the media content at the lowest/desired RAP period. FIG. 1C illustrates two examples. At the top of FIG. 1C stream 1 and stream 2 have approximately equal bitrate, but varying quality. Exemplarily, quality level 1 is indicated for stream 1, and quality level 8 is indicated for stream 2. At the bottom of FIG. 1C, stream 1 and stream 2 have approximately equal quality, but varying bitrate. Exemplarily, quality level 3 is indicated for both streams 1 and 2, whereas the server storage contribution by adding stream 2 to stream 1 results in the overall server storage capacity increasing in a factor 2.4.

Having a closer look into the solution presented in FIG. 1C, it becomes clear that there are two segments within the two different streams for the same time interval that are available within RAP. In particular, frames 1 to 8 from the first segment of the media content and are coded with an RAP into streams 1 and 2, respectively. Offering two versions of a video segment with RAP for the same time interval does not benefit the user at all and leads to server storage waste. A better solution is to not encode/offer an RAP segment of the stream with the finer RAP granularity for the time interval where the first stream offers/has encoded thereinto an RAP segment. There is a multitude of trade-off when designing the RAP/representation configuration as given in the following subsections. One such solution is illustrated in the following figure and is referred to as improved U-RAP (iU-RAP). FIG. 1D illustrates the concept of iU-RAP illustratively with respect to the case where both streams, streams 1 and 2, are of an approximately equal bitrate, but differ in quality. FIG. 1D represents, thus, a modification of the U-RAP scenario depicted in the top half of FIG. 1C The overhead here is 2−1/N with N exemplarily being 8 in the present case, i.e., 1.88. Still, for approximately equal bitrate, the quality of the second stream is significantly lower than that of the first stream since they have approximately equal bitrate. However, the improvement comes at no cost with respect to fast tune-in or any-time switching: for every N segment, downloading may be commenced on the basis of stream 1 directly, whereas for the other segments, stream 2 may be used as a substitute until encountering the first-to-come segment of stream 1 from which segment onwards, stream 1 is used for download.

Figure 1E:
FIG. 1E shows a schematic diagram illustrating a similar modification for the U-RAP configuration of the lower half of FIG. 1C so as to obtain an iU-RAP configuration.

FIG. 1E shows, for the sake of completeness, the concept of iU-RAP where the streams have approximately equal quality, but varying bitrate, wherein FIG. 1E shows the situation as a modification of the U-RAP scenario shown in the bottom of FIG. 1C. The server storage capacity is here decreased from 2.4 to 2.3.

Figure 1F:
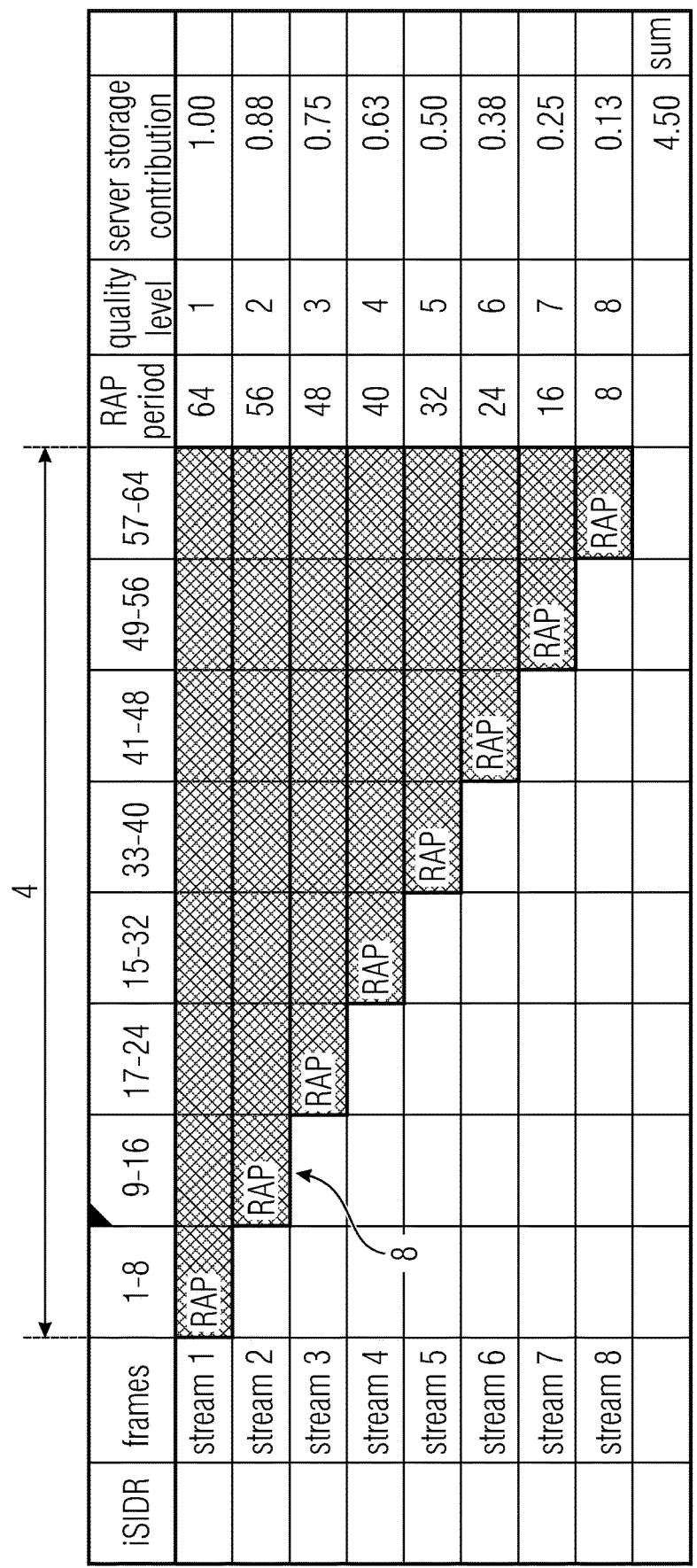
FIG. 1F shows a modification of the SIDR configuration of FIG. 1B so as to result in a more efficient configuration in terms of storage overhead indicated on the right hand side, the configuration called iSIDR.

A variant of the first described concept SIDR by which the overhead could be reduced, is to encode N streams each of which has an RAP at a different segment position and only spends or lasts until the closest available RAP segment, i.e., the next-to-come RAP segment, of the first stream. See, for instance, FIG. 1F. In case of FIG. 1F, the media content is offered to the client in the form of 8 representations, called streams 1-8, just as was the case in FIG. 1B. Stream 1 of FIG. 1F is equal to stream 1 of FIG. 1B. This stream has the media content encoded thereinto continuously with the RAP period 4 being 8 segments long. Streams 2 to 8 coincide with streams 2 to 8 of FIG. 1B as far as the RAP segments are concerned, i.e., they have the same RAP period 4, but stream i has its RAPs shifted by (i−1)/N×RAP period, shifted relative to the RAPs of stream 1. However, streams 2 to 8 don't have the media content encoded thereinto continuously. Rather, streams 2 to 8 represent discontinuous representations. For each stream of streams 2 to 8, the media content is coded into the respective representation merely with respect to those segments which separate the respective RAP segments of this stream from the next-to-come, i.e., the next temporally following, RAP segment of stream 1. See, for instance, RAP segment 14 of stream 2. The next temporally following RAP segment of stream 1 pertains to frames 65 to 72. The segments in between pertain to frames 17 to 64. These segments are coded into stream 2. The segments between the RAP segment of any of streams 2 to 8 until the next preceding RAP segment of stream 1, inclusively, however, is not coded into the respective stream. For stream 2, this is merely the segment pertaining to frames 1 to 8 where stream 1 has a RAP segment. With respect to stream 8, however, the non-coded segments preceding the RAP segment of stream 8 with respect to frames 57 to 64, relate to frames 1 to 56. Merely one segment out of 8 segments is coded into stream 8. The solution illustrated in FIG. 1F is called iSIDR. FIG. 1F illustrates the case of approximately equal bitrate, but varying quality among streams 1 to 8. "Equal bitrate" shall denote here a comparison between the bitrate of stream 1 on the one hand and the respective one of streams 2 to 8 on the other hand. For instance, the comparison may relate segments present in any of representations 2 to 8 to their corresponding temporally collocated segments in stream 1. Any segment on streams 2 to 8 would then have the same size as the temporally collocated one in stream 1. Alternatively, the sum of sizes of segments in stream 2 to 8 in each period 4 is equal the sum of sizes of segments of stream 1 in the same period 4. As illustrated in FIG. 1F the quality level exemplarily decreases from stream 1 to stream 8, continuously from 1 to 8. For the solution depicted in FIG. 1F, i.e., the solution of approximately equal bitrate, the quality of the different streams would actually be pretty similar, although slightly lower than that of the SIDR case, but the amount of storage at the server-side would be smaller compared to the SIDR case. The storage capacity is reduced from a factor 8 to a factor 4.5 as can be seen by comparing FIGS. 1B and 1F. For comparison, FIG. 1G depicts the iSIDR solution where the streams have equal quality, but varying bitrate. Here, the storage capacity reduction leads from 8 to 4.83.

Figure 2A:
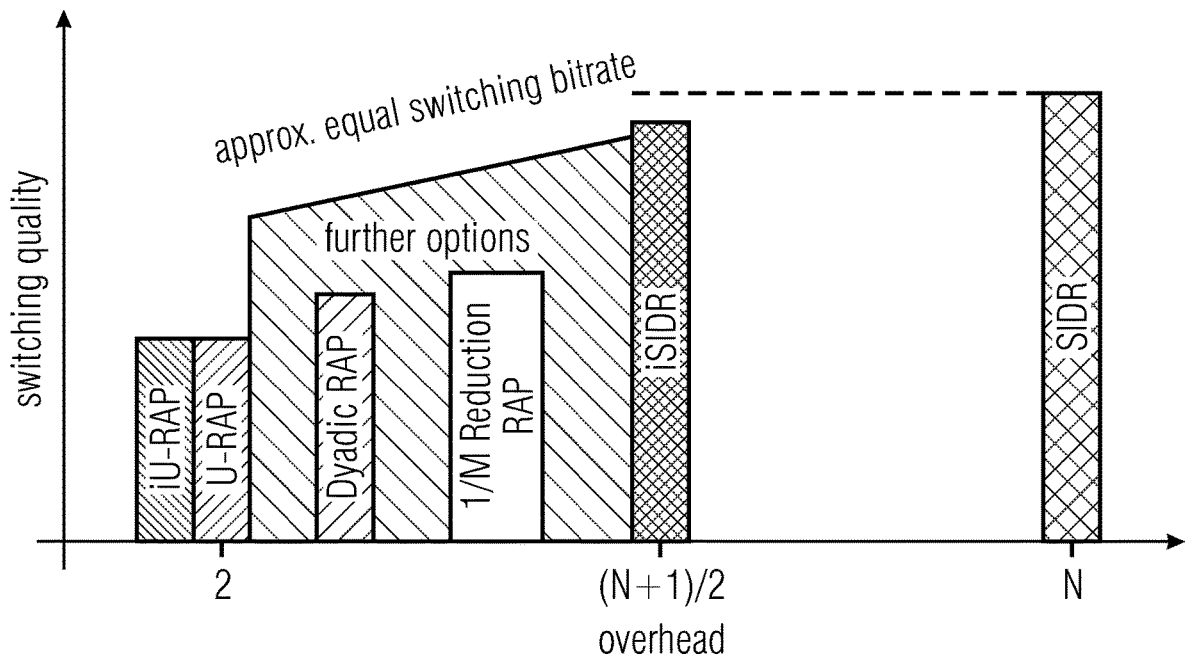
FIG. 2A shows, in the form of a graph, having an x axis corresponding to storage overhead at server-side, and a y axis for the switching quality at tune-in or switching circumstances, indicating therein which storage overhead associated with, and which switching quality is attainable with, the various representation configurations discussed with respect to FIGS. 1A to 1F and 3A and 3D, namely those configurations designed for approximately equal switching bitrate at tune-in or switching instances.
Figure 2B:
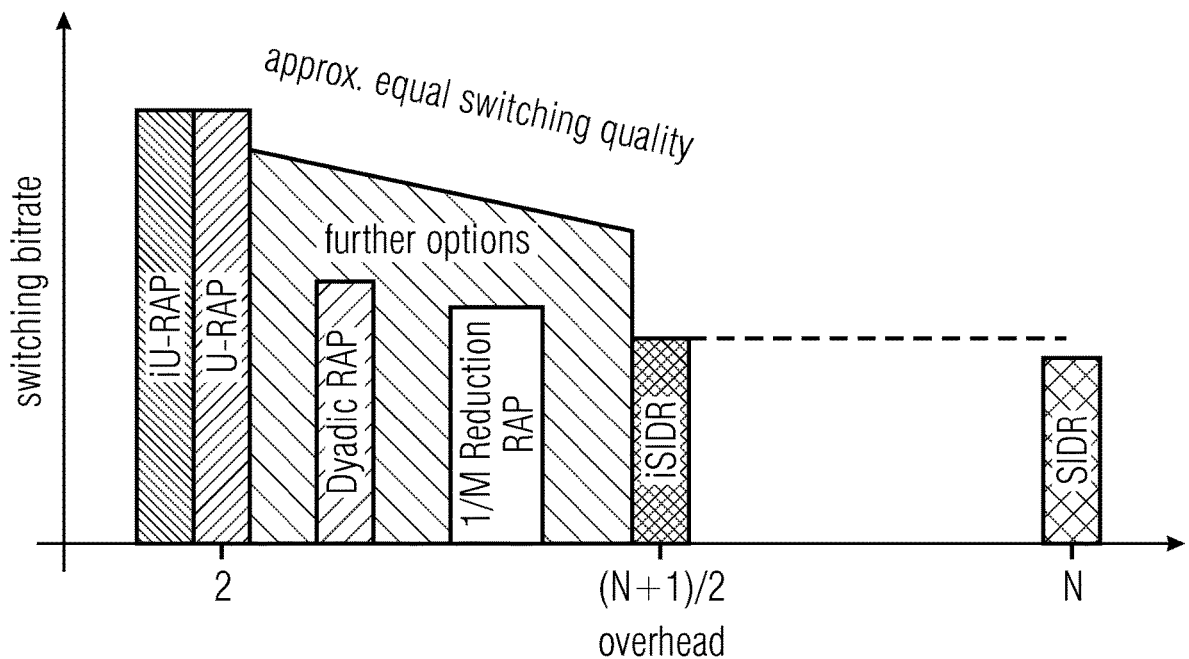
FIG. 2B shows a diagram similar to FIG. 2A however showing the attainable switching bitrate for the various configurations, designing these configurations to achieve approximately equal switching quality at switching or tune-in situations.

The four concepts or solutions described so far correspond to extremes of an optimization problem which seeks to render available a media content for streaming with supporting fast tune-in or any-time switching, the optimization problem depending on switching quality and server-side storage overhead at a predetermined switching bitrate, i.e., frequency of available tune-in or switching positions, i.e., the desired RAP period or minimum RAP period, and at a predetermined maximum RAP period, i.e., an RAP period defining a minimum bitrate achievable when remaining in representation 1. FIG. 2A illustrates the distribution of the various solutions or concepts within the space spent by switching quality on the one hand and overhead on the other hand, in the case of approximately equal bitrate among the streams offered at the server. As can be seen in FIG. 2A, SIDR results in the best switching quality at the cost of highest storage overhead, while iU-RAP results in a considerably lower switching quality which is as low as the switching quality attainable using U-RAP but associated with lower storage overhead. iSIDR lies in between as far as the storage overhead is concerned, and merely suffers from a relatively low switching quality penalty compared to SIDR. While FIG. 2A shows the switching quality and the storage overhead for the different solutions presented above for the case that approximate equal bitrate is spent for the different streams, FIG. 2B shows a similar figure with respect to the solutions presented above for the case that approximate equal quality for the different streams is considered. In particular FIG. 2B inspects the switching bitrate associated with the various solutions and concepts at a respective associated storage overhead. That is, while in FIG. 2A, any tune-in results in substantially the same switching bitrate, i.e., the switching bitrate does not substantially vary at tune-in, whereas the switching quality does, the opposite is true for the case of FIG. 2B, where the solutions are offered to the streams in a manner so that any tune-in results in a continuous or almost static quality, but with varying bitrate at tune-in. This can be seen in FIG. 2B while no switching bitrate increase is associated with SIDR, considerable switching bitrate increase is associated with U-RAP and iU-RAP when, however, the latter two solutions or concepts result in considerably lower storage overhead where the storage overhead of iU-RAP is even lower than the one associated with U-RAP. Again, iSIDR lies in between as far as the storage overhead is concerned and merely slightly increases the switching bitrate.

FIGS. 2A and 2B already mention two further concepts or solutions called Dyadic RAP and 1/M Reduction RAP. They are briefly discussed in the following.

Figure 3A:
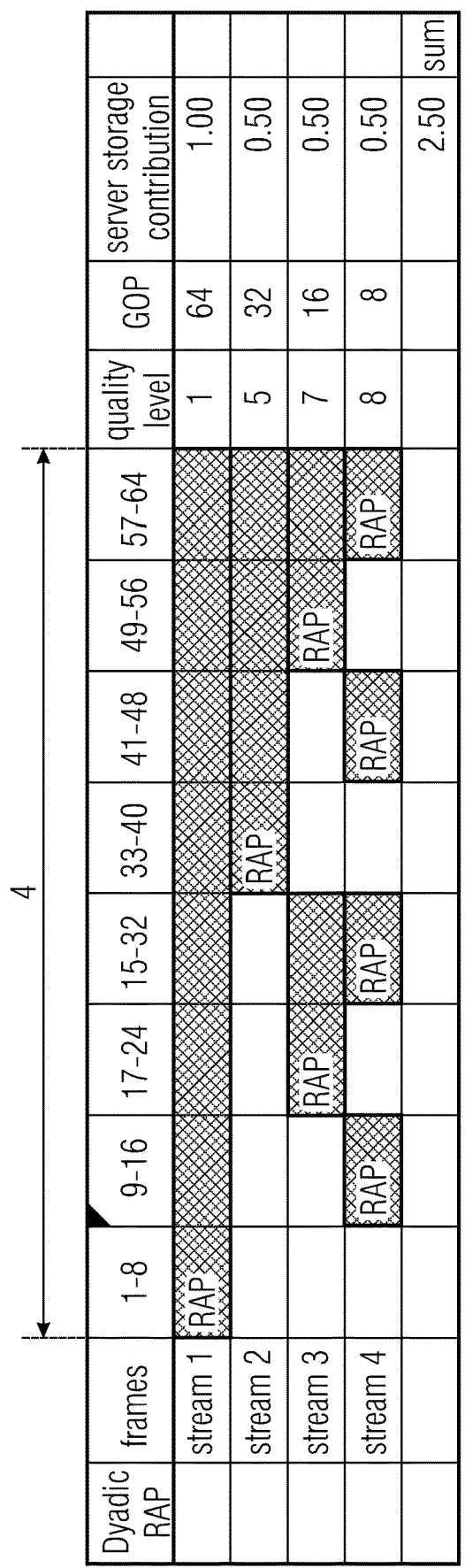
Figure 3B:
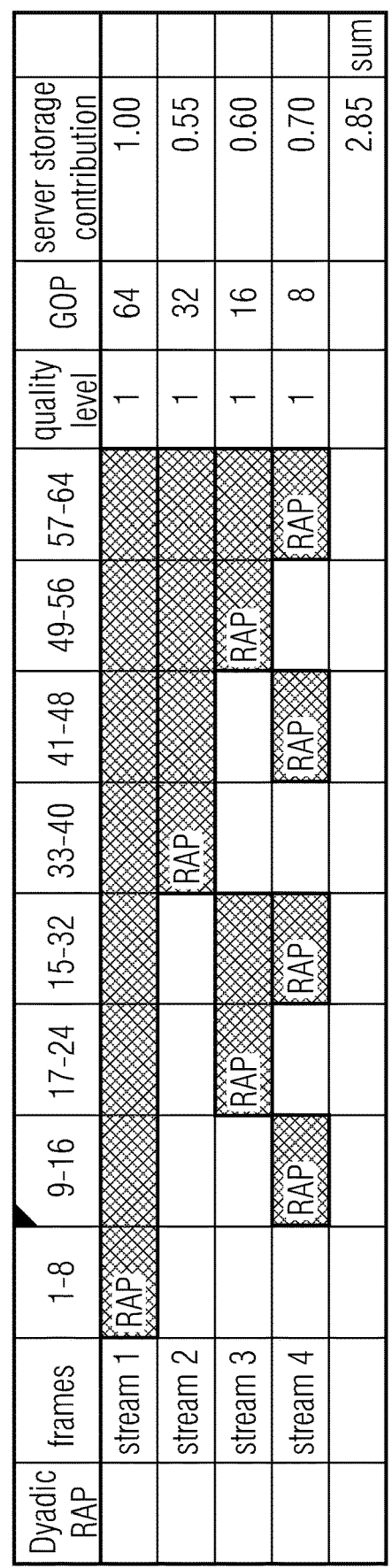

According to Dyadic RAP, Dyadic RAP distributed representations are used. The main idea is here that each step at the RAP interval is halved and only the segment(s) that correspond(s) to the missing RAP position(s) is/are added. If at one step the RAP interval is not dividable by two, the RAP interval is ceil(prevRAPinterval/2). To render this clearer, see FIG. 3A. According to FIG. 3A, the media content is made available by way of four representations, called stream 1-4. Stream 1 corresponds to stream 1 of all the other solutions discussed so far. That is, the representation has the media content encoded thereinto continuously with an RAP period/pitch 4 of 8 segments. Streams 2 to 4 have merely half of the segments coded thereinto, whereas the others are missing in the respective stream. For each run of 8 segments starting with an RAP segment of stream 1, such as the segments concerning frames 1 to 64 depicted in FIG. 3A, stream 2 has merely coded thereinto the media content within the second half of these 8 segments, i.e., here the segments relating to frames 33 to 64. This half starts with an RAP segment concerning frames 33 to 40. The two halves of stream 1 are further divided in stream 3: every second quadrant of the continuous run of 8 segments starting with an RAP segment of stream 1, of the media content is coded into respective segments of stream 3, i.e., the segments from frames 17 to 32, and frames 49 to 64 in the illustrated case of FIG. 3A, each such quadrant starting with an RAP segment and being 2 segments long. Stream 4 further subdivides each of these two-segment long quadrants into one non-coded segment followed by an RAP segment. FIG. 3A illustrates the case where streams 1 to 4 are of an equal bitrate but vary in quality. FIG. 3B shows the case of using Dyadic RAP with the same temporal distribution of coded and non-coded segments within streams 2 to 4, and with the same distribution of RAP segments, but with the streams differing in bitrate, but being associated with the same quality. The server storage capacity needed is presented on the right hand side. For the equal bitrate case, the overhead may be computed by $1+[\log_2 N]*\frac{1}{2}$.

Naturally, as is true for all the other solutions and concepts outlined above, the number of streams as well as the RAP period for stream 1, may be varied compared to the specific example presented in the figures.

FIGS. 3C and 3D concern the 1/M Reduction RAP concept. Similar in fashion to the above Dyadic RAP variant, the finer RAP representations or streams of the 1/M reduction RAP variant, i.e., streams 2 to 5 in FIGS. 3C to 3D, with exemplarily M=5, are created by selectively decreasing RAP period starting from the coarsest RAP stream n=1. For each representation n>1, the 1/M*(RAP Period of stream n−1)-th segment is chosen as a RAP segment for the stream n in that cycle. When the number of remaining segments is not divisible by M, the remaining missing RAPs are filled up as indicated in FIGS. 3C and 3D, here exemplarily for M=4. For any M|mod(N,M)=0, Overhead $$\sum_{i=1}^{M} \frac{iN}{M} + 1 - \frac{N}{M}$$

for (approx.) equal bitrate. In other words, stream 1 of the 1/M Reduction RAP concept is equal to the case of the other solutions or concepts. Here, the RAP period 4 of stream 1 is exemplarily chosen to be N=8 segments, but the length could also be different. The additional M streams, with M=4 in the examples of FIGS. 3C and 3D, are construed as follows: streams n=2 . . . M have an RAP segment at the $((n-1) \cdot N/M)^{th}$ segment after the corresponding RAP segment of stream 1, i.e., the second, fourth and sixth segment after the RAP segment of stream 1 in case of FIGS. 3C and 3D. Stream M+1 has an RAP segment at every segment where none of the streams 1 to M has an RAP segment. Again, FIG. 3C illustrates the case of using the 1/M Reduction RAP concept with approximately equal bitrate among the representations, but different quality, while FIG. 3D illustrates the case of using the 1/M Reduction RAP concept with approximately equal quality among the streams 1 to M+1, but with different bitrates.

For the time being, the above described concepts of designing a set of representations allowing for a fast switching thereinto, shall suffice. Later on, the description is resumed by describing optimization methods to find possibly other deigns forming a solution which is optimal in terms of certain parameters such as storage overhead and/or switching quality and/or switching bitrate increase.

Figure 4:
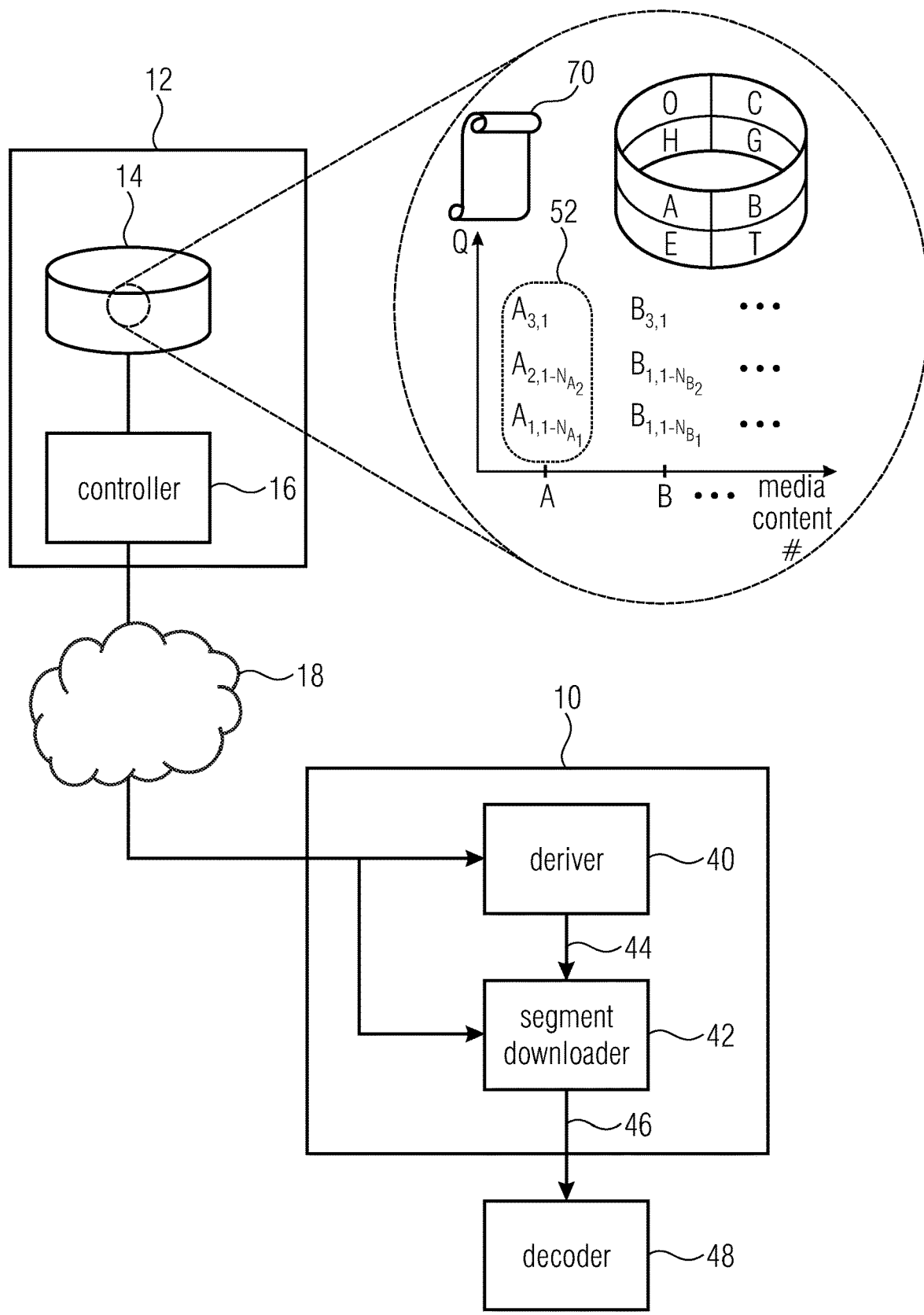
FIG. 4 shows a schematic block diagram of components of certain embodiments of the present application including a streaming device acting as a client, a server which communicates over a network, wherein FIG. 4 serves as a basis for explaining various embodiments of the various aspects of the present application.

With respect to FIG. 4, a device for streaming media content from a server is described. This streaming device, thus, represents a client and is configured to take advantage of media content which is offered at the server in a manner according to, or similar to, the solutions or concepts described above with respect to FIGS. 1C to 1F and 3A to 3D. Care should be taken not to treat the reference to the just-mentioned Figures too strictly. The embodiment described with respect to FIG. 4 would also be advantageous if, for instance, the embodiments described above with respect to the just-mentioned Figures are modified to the extent that the discontinuous representations do not manifest themselves in an alternation between coded and non-coded intervals, but first intervals and intervals where the coding quality is reduced compared to the first intervals, or where merely idle data is coded, such as black or silence. With respect to the media content, the above statement is true according to which the media content may be any sort of media content, including, but not exclusively, video and audio.

FIG. 4 shows the streaming device as well as the server from which the streaming device 10 streams media content. The server is indicated using reference 12 and comprises a storage 14 for storing the representations of the media content to be streamed and a controller 16 connected to storage 14 so as to have access to data stored thereon, and configured to communicate with streaming device 10 via a network 18. Storage 14 may comprise any of one or more hard disks, flash memories, magnetic tapes or combinations thereof. For example, a controller 16 may be embodied in hardware, firmware or software, i.e., may be implemented as an integrated circuit, a field programmable array or as a suitably programmed computer.

Server 12 may store several media contents in storage 14, and render the same available for download by a streaming device 10, respectively. In particular, server 12 renders available the media content available for download in different version, called "representations", into which the media content is coded in a different manner. The "media content" coded into different representations thereof, however, is the same. For example, FIG. 4 illustrates server 12 is offering to the client a panoramic scene in the form of several videos A-H, each video showing a different section of the panoramic scene. In this case, each video represents one media content. Server 12 may render available each media content in the form of a set of representations. In FIG. 4, media content A is available in server 12 in representations $A_{\#,\#}$. Each such representations represents the media contents A at different qualities Q. In the example of FIG. 4, each media content A to H is available at server 12 in several representations or versions. For a first quality, a subset of representations is available such as $A_{1,1}$ to $$A_{1,N_{A_1}}$$

for media content A. This subset of representations may be construed or designed in any of the manners described above with respect to FIGS. 1C to 1F and 3A and 3D while in a similar manner as described at the beginning the description of FIG. 4. Another subset of representations represents the respective media content at a further quality level such as an improved quality level compared to the former one. For instance, representations $A_{2,1}$ to $$A_{2,N_{A_2}}$$

represent media content A. This subset may be construed and designed in a similar manner as the first subset $A_{1,\#}$. For illustration purposes only, another quality level 3 may have, for instance, merely one representation which represents the respective media content such as $A_{3,1}$ which represents media content A at an improved quality level compared to the previous ones.

It should be noted that FIG. 4 is to be understood as being merely illustrative as far as the availability of media content(s) at server 12 is concerned. The available media content is not restricted to pertain to a panoramic video scene. If several media contents are made available at server 12, then these media contents may be, for instance, different programs of a broadcasting service, for instance. Likewise, FIG. 4 is merely illustrative as far as the set of representations being available for each media content is concerned. It would suffice, for instance, if server 12 has, for each media content, merely one subset of representations such as subset $A_{1,\#}$ for representation A, i.e., one of the subsets formed in accordance with, or similar to, the representation designs presented above with respect to FIGS. 1C to 1F and 3A to 3D.

As already stated above, each representation has encoded thereinto the media content in segments. In order to illustrate this briefly, reference is made to FIG. 5 which shows representatively media content A, here exemplarily depicted as a video, but as already outlined above, the media content which the embodiments of the present application refer to, may alternatively be of a different sort.

Figure 5:
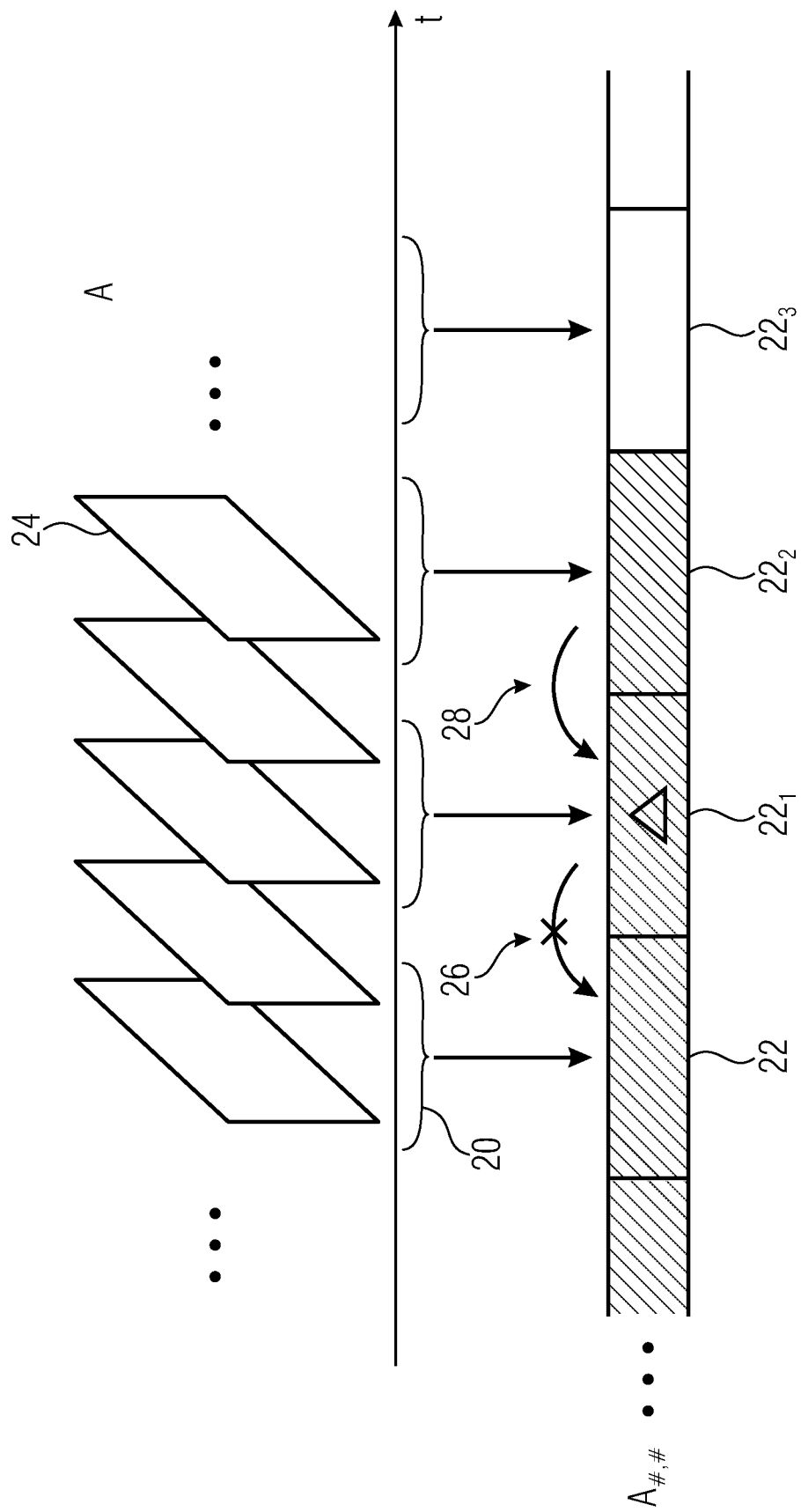
FIG. 5 shows a schematic diagram illustrating the segment-wise coding of a media content into a respective representation, FIG. 5 further illustrating various types of segments.

The segments 20 into which media content A is subdivided cover, for instance, consecutive temporal intervals of media content A, with each such segment 20 being coded into a respective one of segments 22 of a representation $A_{\#\#}$ of media content A due to this one to one correspondence between segment 20 of media content A and segments 22 of media representation $A_{\#,\#}$, the term "segment" is sometimes used interchangeably in order to denote a certain interval of media content A. The coding used in order to code the media content A into a segment 22 of representation $A_{\#\#}$ is not restricted to any specific codec. The same applies to the length of segments 20. They may even vary although a constant length of segment 20 over media content A is depicted in FIG. 5. In the examples of FIGS. 1A to 3D, for instance, the segments 20 were 8 frames 24 of a video long. However, this is not mandatory.

The media content's segment 20 may be coded into segments 22 of representation $A_{\#,\#}$ in a different manner. This is illustrated in FIG. 5 by difference symbols and hatching/shading. For instance, segments indicated by a triangle such as $22_1$ shall have the corresponding segment of the media content encoded thereinto in a manner so that the media content may be decoded on the basis of the segment $22_1$ independent from, i.e., without any need for availability of, any preceding segment 22 as illustrated in FIG. 5 by a crossed-out arrow 26. Generally, segments 22 of representation $A_{\#,\#}$ which have their corresponding segment 20 of the media A encoded therein are indicated using hatching, namely hatching consisting of continuous lines. Segment $22_2$, for instance, has no triangle inscribed thereinto and has, accordingly, its corresponding segment 20 of the media content A encoded thereinto in a manner so that the decoding of segment $22_2$ necessitates the availability of any preceding segment, such as the immediately preceding segment $22_1$ within representation $A_{\#,\#}$ as indicated by non-crossed-out arrow 28. The "dependency" indicated by arrow 28 may refer to samples and the reconstruction domain, i.e., the decoding of segment $22_2$ may depend on reconstructed samples of the preceding segment. Segment $22_2$ refers to, such as segment $22_1$. However, additionally or alternatively, the "dependency" may refer to a different level other than the reconstruction domain itself such as the dependency on motion vectors used during decoding/reconstruction of the referenced segment.

As already described above, there are representations for which some of segments 20 of media content A are non-coded into, or skipped in coding media content A into, the respective representation. Such segments shall be indicated in FIG. 5 by using no hatching. Thus, the latter segments 22 are illustrated as empty boxes as illustrated with respect to segment $22_3$. Segment $22_3$ may, thus, not even be stored within storage 14 or server 12 or may not be available for download by streaming device 10 as there is, for instance, no address for addressing segment $22_3$. Alternatively, however, no hatching shall indicate segments which merely serve as a placeholder in that such segments such as segment $22_3$ have encoded thereinto don't-care data instead of the corresponding segment 20 of media content A. For instance, black frames or silence frames could be coded into such a segment $22_3$ so that the resulting data amount for such a segment is negligible. Even alternatively, such a segment $22_3$ indicated using no hatching shall have indicated the corresponding segment 22 of media content A at a quality level which is very low so that the resulting data amount consumed by such a segment $22_3$ is negligible as well and does not really represent a serious coded representation of the corresponding segment 20. Even alternatively, segments $22_3$ may be segments the addresses, such as the URLs, of which are co-used addresses, i.e. addresses provided in the MPD as addresses of both segments $22_3$ and other segments of other representations such as of segments of type $22_1$ and $22_2$ which are temporally co-located to segments $22_3$. The address or URL of such a segment $22_3$, thus, actually points to a segment of another representation. The resource in the server/cache is a unique resource used by, or being part of, more than one representation.

Figure 6:
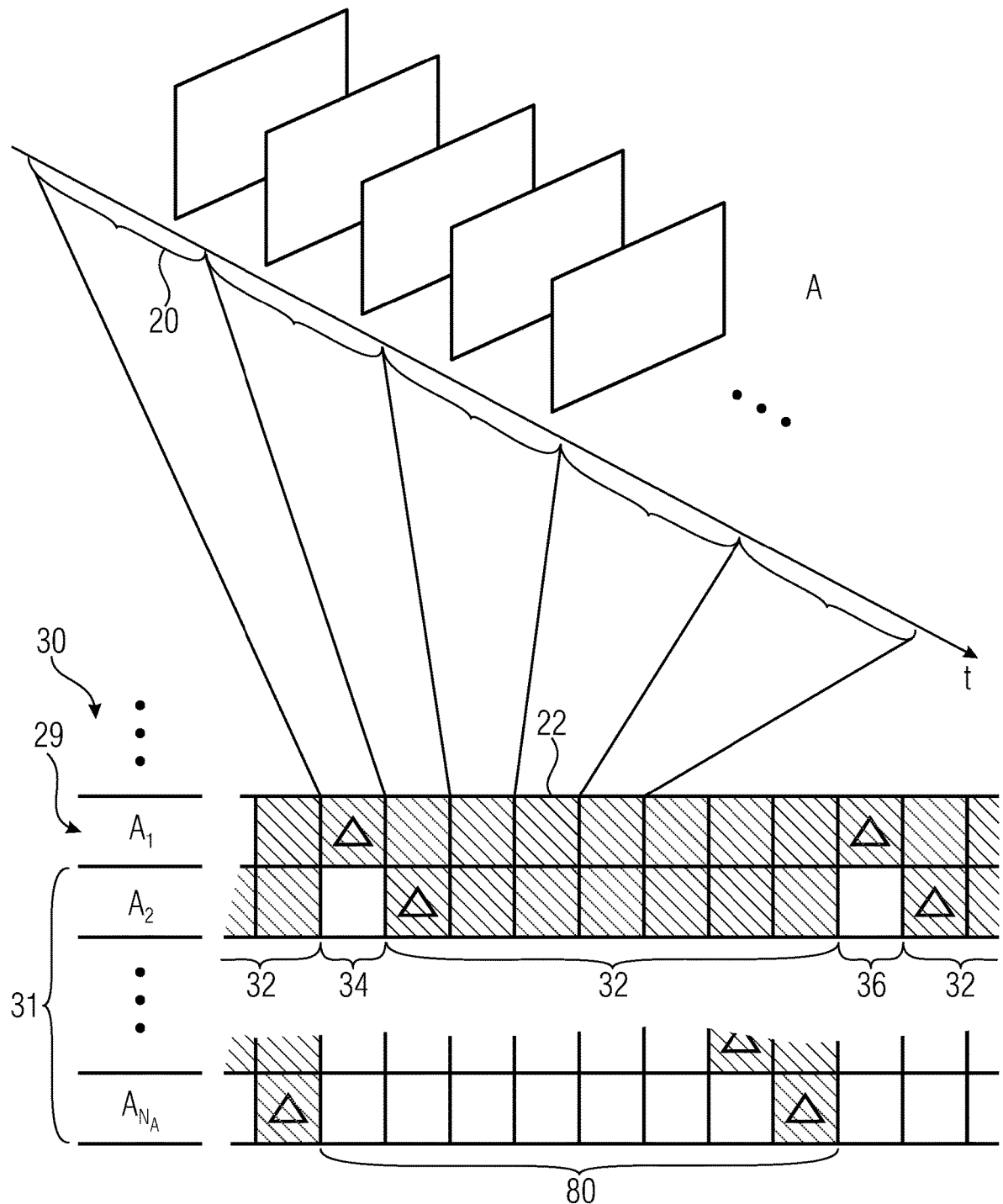
FIG. 6 schematically illustrates the design of a subset of representations in accordance with an embodiment of the present application where the subset comprises a continuous representation and at least one discontinuous representation.

The symbols and hatchings/shadings used and presented with respect to FIG. 5 shall also be used in the following figures in order to indicate the "type of coding" of respective segments of representations depicted in these figures. FIG. 6, for instance, illustrates a subset 30 of representations having a media content encoded thereinto which is, in case of FIG. 6, representatively media content A. The subset 30 comprises several representations which are denoted as $A_1 \ldots A_{N_A}$ for ease of reference. The latter representations might be, for instance, representations $A_{1,1} \ldots$ .

$$A_{2,N_{A_1}}$$

and/or $A_{2,1} \ldots$ $$A_{1,N_{A_1}}$$

of FIG. 4. The segments 20 of the media content A and the corresponding segments 22 of the representations $A_\#$ are illustrated using the same convention applied in FIG. 5. As may be seen from FIG. 6, the number of representations within subset 30 is $N_A$. This number may be any integer number greater than 1. Each representation $A_\#$ has the media content A encoded thereinto with an own or different temporal distribution of random access points. That is, each representation has its own temporal distribution of random access points. In other words, each representation $A_\#$ has encoded thereinto segments 20 of media content A in a manner so that each representation $A_\#$ has its own selection of segments 20 out of the sequence of segments 20 which form a random access point where a tune-in or a switching to, the respective representation $A_\#$ is feasible. Two representations shall differ in temporal distribution of random access points as long as the random access points of these representations do not completely coincide. Preferably, for each segment 22 where one of the representations $A_\#$ of subset 30 has a random access point segment indicated by a triangle there is no further representation within subset 30 which has a random access point segment pertaining to the same segment 20 of media content A, i.e., there are no temporally aligned random access point segments within subset 30. Accordingly, for each segment 20, there is, at the maximum, merely 1 segment 22 within representations of subset 30 which has the segment 20 encoded thereinto in the form of a random access point. In case of FIG. 6, there is exactly one representation within subset 30 which has, for a certain segment 20 of media content A, a random access segment 22 having the respective segment 20 encoded thereinto in the form of a random access point.

It should be noted that FIG. 6 illustrates the case where each representation $A_\#$ of subset 30 has encoded thereinto media content A in a manner so that a constant and regular random access point pitch separates the random access point segments of the respective representation $A_\#$. For instance, representation $A_1$ is a continuously coded representation 29, i.e., a representation having media content A encoded thereinto completely in that each segment 20 of media content A is coded into the corresponding segment 22, and the random access point segments are temporarily distributed so that random access point segments are encountered every $8^{th}$ segment 22 within representation $A_1$. However, this is merely an example and should not be understood as being restrictive in that no other temporal distribution or pattern of random access point segments could apply. The other representations $A_2$ to $A_{N_A}$ are discontinuous representations 31, i.e., representations for which at least some segment 20 are not coded into a corresponding segment of this representation or coded into a respective segment according to segments of type $22_3$ of FIG. 5. Accordingly, each of representations $A_2$ to $A_{N_A}$ has encoded thereinto the media content 20 in intervals which alternate with each other, namely, first intervals having the media content coded thereinto, and second intervals there in between. Representation $A_2$, for instance, has the media content A encoded thereinto within an interval 32 formed by a run of segments 22 having the corresponding segment 20 of media content A encoded thereinto, and preceding and succeeding to this interval 32, there are intervals 34 and 36 consisting of segments of the type $22_3$ (non-hatched) which separate interval 32 from further intervals 32 consisting of runs of one or more coded segments. Each interval 32 to 36 may consist of one or more segment 22.

Some notes should be made with respect to FIG. 6. Although FIG. 6 illustrates the case that the subset 30 comprises exactly one continuously coded representation 29, namely, $A_1$, there may be more than 1 or, alternatively, no such continuously coded representation. Later on, for instance, examples are provided. The number of discontinuous representations 31 may be one or more. Further, although FIG. 6 suggests that the segmentation into segment 20 is equal for all representations $A_\#$ of subset 30, this need not be the case necessarily. Even further, although FIG. 6 illustrates the case where the temporal distribution of random access point segments, intervals 32 and intermediate intervals 34/46, has, for each representation $A_\#$ of subset 30, a periodicity equal to the RAP pitch of the continuous representation $A_1$, this also does not need be the case necessarily. All in all, FIG. 6 illustrates that the design of representations of subset 30 is made according to the design example of any of FIGS. 1E and 1F, but as already indicated above, this is merely an example and may be made differently.

Referring back to the description of FIG. 4, FIG. 4 shows that streaming device 10 comprises a deriver 40 and a segment downloader 42. Deriver 40 is configured to receive from server 12 media information. This media information 44 is used by segment downloader 42 in order to control and perform the downloading of the media content from server 12. In particular, segment downloader 42 downloads the media content from server 12 as a sequence of segments 46 and outputs this sequence of segments 46, for instance, to a decoder 48.

With respect to deriver 40 and segment downloader 42, it should be noted that same may be implemented by way of hardware, firmware or software. For instance, an integrated circuit could be used in order to implement the functionalities of deriver 40 and segment downloader 42 such as in different circuit parts thereof. Alternatively, different portions of a field programmable array could suitably be programmed to perform the tasks of both elements, respectively, and even, alternatively, different sections of a computer program could be used to program a computer so as to perform the tasks of these modules 40 and 42.

With respect to FIG. 7, it is described in the following as to which media information 44 is received by deriver 40 so as to provide segment downloader 42 with this information for use in controlling the downloading. Despite the "compressed" illustration of an embodiment for media information 44, i.e., as to what the same contains, it is noted that the media information 44 may be derived by deriver 40 in a manner distributed over certain sections and portions of data received from server 12 as it is described in more detail below. Further, FIG. 7 concentrates on the media information 44 which deriver 40 derives from server 12 so as to forward this information to segment downloader 42. It should be noted, however, that the media information 44 may be conveyed from server 12 to streaming device 10 or deriver 40, respectively, by way of parameters from which information 44 may be derived by deriver 40, but whose parameters have a different structure or form than information 44, but from which information 44 is derivable merely by exploiting some default settings agreed between server and client, for instance. Such details and examples thereof are also described below.

First information or a first part 50 of information 44 which deriver 40 derives from server 12 specifies the set of representations of the media content such as the set 52 of media content A. That is, on the basis of information 50, deriver 40 knows about the presence and availability of representations within set 52 with all of these representations pertaining to the media content in question, such as, for example, media content A. Thus, the first information 50 also specifies subset 30 of representations. As already mentioned above, the whole set 52 may coincide with, or be made-up of, subset 30. A second information or second part 53 of information 44 which deriver 40 derives from server 12 pertains to the aforementioned design or construction of the representations of subset 30. Information 52, again, comprises two parts. Subpart 54 of information 53 pertains to the temporal structure of the discontinuous representation or representations of subset 30, i.e., of representations $A_{1,2}$ to $A_1$, $M_A$. Information 54 indicates the temporal distribution of random access points for each representation. A place holder used in FIG. 7 in order to denote the random access point distribution of representation $A_{1,2}$ is, for instance, RAP DISTR($A_{1,2}$). Information 54 also reveals the temporal alternation between intervals 32 to 36, i.e., the temporal distribution of coded segments and segments according to $22_3$ with this information indicated by presence DISTR ($A_{1,2}$) for representation $A_{1,2}$, for instance. The other subpart 56 of information 53 pertains to the temporal distribution of random access points of the optionally present 1 or more continuous representations, here representation $A_{1,1}$ in FIG. 7, i.e., RAP DISTR($A_{1,1}$).

Further information may be derived by deriver 40 from server 12. For instance, FIG. 7 shows that information 44 may also contain information on a quality level associated with subsets 30 with this information 58, thus, revealing the quality associated with representation $A_{1,1}$, namely, $Q(A_{1,1})$, and representation $A_{1,2}$, namely, $Q(A_{1,2})$, since these are the representation 29 of subsets 30 which is selected out of the respective subset 30 on the long run. Later on, it will be described that information 58 may be accompanied with information revealing quality variation associated with using representations 31 for switching into subset 30. Likewise, information 44 could also comprise information 59 on bitrates associated with each of subsets 30, i.e. $R(A_{1,1})$ and $R(A_{2,2})$. Even further, information 44 could also comprise an information 62 on how to compute the addresses of segments of each representation of subset 30 denoted as ADDRESS($A_{\#,\#}$) in FIG. 7. In MEPG DASH, such information 62 is, for example, known as template, i.e. a computational prescription allowing the computation of segment address of the representation which the template relates to.

Figure 8:
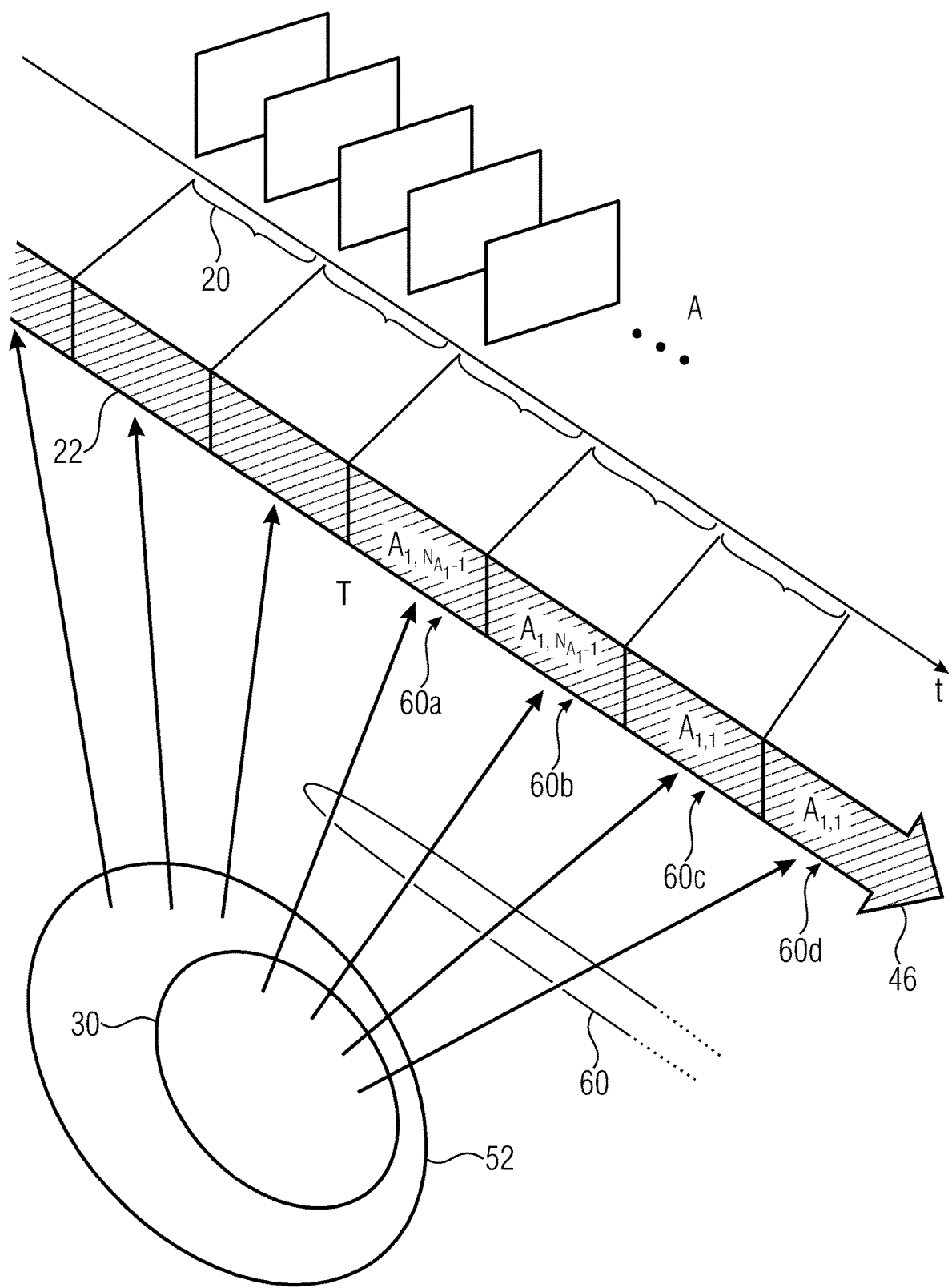
FIG. 8 shows a schematic diagram illustrating a composition of a finally downloaded/selected sequence of segment, exemplarily illustrating a tune-in or switching-into situation on the basis of the example of FIG. 6.

Thus, on the basis of information 44 which deriver 40 derives from server 12, segment downloader 42 is able to precompute the positions of random access point segments 22 within representations of subset 30 as well as to distinguish between segments 22 of discontinuous representations $A_2$ to $A_{N4}$ of subset 30 which belong to coded intervals 32 and segments 22 not belonging thereto, but being part of intervals 34/36, i.e., representing segments according to $22_3$. On the basis of this knowledge, segment downloader 42 is able to download the media content from server 12 as a sequence of segments as it is illustrated in FIG. 8. FIG. 8 shows or illustrates the downloaded sequence 46 of segments. The sequence of segments 46, when being decoded, represents the media content, here illustratively media content A. Sequence 46 comprises one segment 22 per segment 20 of media content A. The reference sign 22 is reused for segments 22 of sequence 46 as each segment of sequence 46 is selected by segment downloader 42 from any of segments 22 of the representations of set 52. For at least a sub interval or subset 60 of segments 22 of sequence 46, segment downloader 42 may, for instance, decide to remain within subset 30 so that segment downloader 30 selects representations out of the subset 30. The background may be that the segment downloader 42 may, during the time period corresponding to this subset of subsequence 60, decide to represent media content A at a quality for which subset 60 is made. FIG. 8 illustrates the case where segment downloader 42 switches at some time instant T from representations outside subset 30 to representations inside subset 30. This would correspond to a switching process within media content A itself. It may be, however, alternatively that segment downloader 42 switches at time instant T from, for instance, representations concerning another media content such as any of media contents B to H cited in FIG. 4, so as to tune-in into media content A. Even alternatively, it might be that segment downloader 42 commences at time instant T downloading any media content, here starting with media content A.

In any case, the time at which switching instant T occurs might be triggered, for instance, by external circumstances such as, for example, user inputs. For instance, user head movements may decide as to which media content is to be downloaded. Alternatively, current network conditions concerning network 8 may involve that the segment downloader 42 needs to perform a switching to another quality level at some time instant T. In any case, time instant T may occur at any segment and accordingly, it may occur at a segment where continuous representation $A_{1,1}$ does not have any random access points. Accordingly, segment downloader 42 may use information 44 and especially information 50 and 54, so as to start the selection for the segments within phase 60 for the first segment of this phase 60 at that representation within subset 30 which has for the respective segment at which the switching instant T occurs, a random access point. FIG. 8 illustrates the case where this representation is the discontinuous representation Segment downloader 42 may be configured to remain within this representation for the consecutive segment 22 within phase 60 as long as possible, i.e., as long as the respective representation, here does not enter any of the non-coded intervals 34/36, and no longer than encountering a segment for which the continuous representation 29, here exemplarily $A_{1,1}$, has the next occurring or next-to-come random access point segment. As soon as the latter is encountered, segment downloader 42 selects this random access point segment out of continuous representation $A_{1,1}$ and remains within this representation for the following segments of phase 60 until, for instance, changing the media content, changing the quality level within media content A or ceasing downloading at all, or the like. FIG. 8 illustrates the selection by inscribing the representations from which the respective segments of sequence 46 have been chosen, into the respective segments 60a to 60d at the beginning of phase 60. It might be that segment downloader 42 needs to preliminarily select another discontinuous representation than the currently selected one for bridging a non-coded interval 34/36 of a currently selected discontinuous representation until reaching the next-to-come random access point of the continuous representation. Segment downloader 42 may be configured to perform such preliminary change at the last occasion possible so as to remain as long as possible at one representation. See, for instance, FIG. 3B: imagine that switching instant would take place so that from frame 17 onwards, the quality associated with streams 1 to 4 should be downloaded. In that case, segment downloader 42, being informed on the temporal distribution of random access point segments and coded and non-coded segments, would start with stream 3 for 2 segments until frame 32, then transitioning to stream 2 for the following four segments, then transitioning to continuous stream 1 from frame 65 onwards.

Thus, briefly summarizing the description of FIGS. 4 to 8, these figures provided an embodiment for a streaming device taking advantage of "discontinuous representations" by being informed on the discontinuities and by using at least one such discontinuous representation in a subset of representations for a faster tune-in or any-time switching into the subset. Concurrently, the description put forward above, revealed the description of the corresponding server 12. As an implementation example, it is noted that the actual download of selected segments may be performed by streaming device 10 using corresponding HTTP requests using addresses which downloader 42 may compute based on the aforementioned address information 62. The controller 16 of server 12 may simply be configured to answer respective requests from streaming device 10. In addition to the requests sent from streaming device 10 to server 12 relating to the actual segments finally making-up the sequence 46 of segments, streaming device 10 may be configured to direct a request such as an HTTP request, to server 12, with this request requesting server 12 to issue a media presentation description or manifest file 70 (FIG. 4) from server 12 to streaming device 10. The media presentation description 70 may, for instance, be an XML file comprising attributes on the basis of which deriver 40 may derive information 44 discussed with respect to FIG. 7. In the following, an example is provided as to what attributes the media presentation description 70 could comprise in order to reveal information 44. It is to be understood, however, that the source of information on the basis of which deriver 40 derives media information 44 may partially or completely be derived from elsewhere and in particular on the basis of data sent from server 12 to streaming device 10 elsewhere, i.e., external to media presentation description 70. This may, for instance, be true with respect to the random access point distribution information concerning the one or more continuous representations within subset 30.

As explained above with respect to FIGS. 4 to 8, the embodiments described with respect to these figures enable a fast tune-in or any-time switching in an efficient manner by spending one or more discontinuous representations within a subset of representations so that the subset of representations allows for a fast tune-in or any-time switching. The fact that the one or more representations have gaps in the form of segments of type $22_3$, increases the efficiency in terms of storage overhead at server-side. In particular, not all segments are present within all representations of the subset. As explained above with respect to FIGS. 4 to 8, there may optionally be one main representation 29, or a continuously coded representation 29 within subset 30, for which all media segments 20 are present or coded into this representation, and for which the RAP interval is set to a certain value which represents a maximum RAP interval for which the attainable bitrate in downloading the media content within any of the representations of the subset 30 is minimum. The one or more remaining representations 31 within subset 30 may be considered as "helping" representations that may be used for fast tune-in or switching. These helping representations, as well as their available segments, could be indicated by information 40 and, in particular, by information 50 and 54, and could be called an EssentialDescriptor D which, in turn, could possibly be defined as per below.

The value of @schemeIdURI for the descriptor shall be equal "urn:mpeg:dash:incompleteRepresentations:2016".

It indicates which segments are present in an incomplete representation. In addition, it indicates which segments correspond to a RAP-segment.

@value of the essential property descriptor is a white-space separated list of three values as specified in the following table:

| EssentialProperty@value attributes of incompleteRepresentation: 2016 | | |
| --- | --- | --- |
| EssentialProperty @value parameter | Use | Description |
| granularity | M | specifies the number of segments for which the segment present and segment is a RAP-segment (or SAP segment - SAP is as a RAP but in DASH terms and includes system layer aspects such as encryption random access and so forth.) pattern applies. |
| segmentPresent | M | specifies, as a comma-separated list of n values (where n = @granularity, or n can be the number of elements with 1 in segmentPresent, i.e. n ≤ @granularity), which segments are present and which not. A value of 1 in the comma-separated value indicates that the segment at that position within the n-length pattern is present. |
| segmentRAP (segmentSAP) | M | specifies, as a comma-separated list of n values (where n = @granularity), which segments are RAP-segments and which not. A value of 1 in the comma-separated value indicates that the segment at that position within the n-length pattern is RAP-segment. (or: A value of X (integer) in the comma-separated value indicates that the segment at that position within the n-length pattern is SAP-segment of SAP type X.) |

Legend:

M = Mandatory,

O = Optional

In addition to the descriptor, complete and incomplete representations have to be grouped together. For instance, if complete and incomplete representations have equal or almost equal bitrates and several different operation points are offered, the incomplete representation has to be associated to complete representations. The association could be done by forcing the @qualityRanking to be present and be equal, or using the @associationId attribute in the MPD or even by adding a further attribute to the described descriptor with a "representationGroupId". The first two options would involve a different interpretation of the existing attributes (@qualityRanking or @associationId) when the descriptor is present. The latter would be an additional field in the descriptor that would group the representations together. In such a case, the descriptor should be present also for the complete representation but in this case it should be made available as a SupplementalProperty descriptor and not as an EssentialProperty descriptor.

In such a case, @value of the essential/supplemental property descriptor is a white-space separated list of four/three values as specified in the following table:

| EssentialProperty@value or SupplementalProperty@value attributes incompleteRepresentation: 2016 | | |
|---|---|---|
| EssentialProperty @value or SupplementalProperty @value parameter | Use | Description |
| granularity | M | specifies the number of segments for which the segment present and segment is a RAP-segment (or SAP segment) pattern applies. |
| segmentPresent | CM | specifies, as a comma-separated list of n values (where n = @granularity), which segments are present and which not. A value of 1 in the comma-separated value indicates that the segment at that position within the n-length pattern is present. This attribute shall be present if the descriptor is an EssentialProperty descriptor and shall not be present if within a SupplementalProperty descriptor |
| segmentRAP (segmentSAP) | M | specifies, as a comma-separated list of n values (where n = @granularity, or n can be the number of elements with 1 in segmentPresent, i.e. n ≤ @granularity), which segments are RAP-segments and which not. A value of 1 in the comma-separated value indicates that the segment at that position within the n-length pattern is RAP-segment. (or: A value of X (integer) in the comma-separated value indicates that the segment at that position within the n-length pattern is SAP-segment of SAP type X) |
| representationGroupId | M | specifies the group to which the representations belong to. |

Legend:

M = Mandatory,

O = Optional

The described options have the benefit that they allow providing a service with a very high granularity of RAPs. E.g., the period that RAPs can be reduces to be as small as the GOP size. Additionally, under stable circumstances where the receiver does not have to switch to different representations and streams, it receives the stream with the largest RAP interval, which corresponds to the stream that has the highest quality (when considering that the bitrate of the different streams is equal). However, whenever a client needs to switch to another stream and access one of the RAP segments of an "incomplete" representation, the number of RAPs downloaded increases. A client receives the RAP-segment of the complete (regular) representation, i.e. segment #n|mod(#n,N)=0. Whenever a switch occurs in a segment that does not fulfill mod(#n,N)=0, the client additionally downloads a RAP-segment. Ideally, a client should request a RAP-segment N segments after the last RAP-segment and should only request representation with smaller RAP periods whenever a switch is needed. E.g. it is assumed that a client is at the complete (regular) representation and downloads a RAP-segment at segment #n|mod(#n,N)=0 for #n<N1; and that at N1|mod(N1,N)≠0 the client needs to switch to another quality (e.g., due throughput variations). It would be desirable that from that time onward the client downloads a RAP-segment for #n|mod(#n−N1,N)=0 instead of for #n|mod(#n,N)=0.

Among the different representation and different streams, signalling could be added that indicates that all representations of the same group have an approximately same bitrate, approximately same quality or some kind of prioritization, where moving up to further RAP distances is achieved by switching to higher priority streams.

In case clients switch using this technique and not approximately the same bitrate is used/signalled, more RAPs are downloaded and the bitrate cannot easily be derived from the downloaded data. Switching bitrate can be signalled by adding a @bandwidth per potential RAP used for random accessing or switching. An instantiation of such a signalling mechanism could be done, by adding an additional value to the descriptor described above. E.g., might be pre-fetched or downloaded by streaming device 10 at the beginning of a session upon having studied the media presentation description 70 which, for instance, contains the information 50 on all available representations. In the above example, deriver 40 reads or codes from the media presentation 70, separately from the indication of the temporal pitch between consecutive random access points of the continuous representation, the attribute @granularity indicating the period length at which the temporal distribution of coded and RAP segments in the discontinuous representations is indicated. It should be mentioned, however, that the attribute @granularity could alternatively be left off, and the number of segments forming the length of each period such as period 80 in FIG. 6 could alternatively be derived by deriver 40 from the RAP interval indication of the continuous representation. For each discontinuous representation, deriver 40 reads for each of the N segment, two attributes, namely @segmentPresent and @segmentRAP, the former indicating whether the $i^{th}$ with i=1 . . . n segment is a coded segment, i.e., no segment of type 22₃ and the latter indicating whether the $i^{th}$ segment is an RAP segment. Deriver 40 deduces from this information, and using the periodic nature with periodicity n, the type of each segment in that both attributes are the same for the segments spaced apart by n segments. Instead of relating the attribute @granularity to the number of segments n, with n=8 in the example of FIG. 6, for instance, the length of the periods 80 of the discontinuous representations could be indicated as a number n of subintervals within period 80. For example, the attribute @granularity could be related to the RAP interval of the continuous representation and @granularity could indicate the number n of subintervals into which period 80 is subdivided. For instance, in the case of FIG. 6, the RAP interval of the continuous representation $A_1$ could be indicated by a separate attribute or syntax element provided by server 12 to streaming device 10 to be 8 segments long or, alternatively speaking, 8 times N frames long, with N being the segment length indicated separately by server 12 within MPD 70 or elsewhere. @granularity could indicate 8, meaning that the RAP interval of the continuous representation $A_1$

| | | |
|---|---|---|
| @SAbandwidth | O | specifies, as a comma-separated list of n values (where n = @granularity, or n can be the number of elements with 1 in segmentPresent, i.e. n ≤ @granularity), which indicates the bandwidth needed for performing stream access or switching. Consider a hypothetical constant bitrate channel of bandwidth with the value of this attribute in bits per second (bps). Then, if the representation is continuously delivered at this bitrate, starting at a SAP at the position corresponding to the index in the list, a client can be assured of having enough data for continuous playout providing playout begins at time @minBufferTime after the first bit from the SAP is received. |

Referring back to FIG. 4, this means that the subset 30 of representations construed to allow for fast tune-in or anytime switching, may comprise at least one representation into which the video content is coded intermittently, and the deriver 40 may be configured to derive, as part of the media information 44, from server 12, information on the RAP distribution 56 of the continuous representation by way of an indication of a random access period between consecutive random access points of the continuous representation such as representation $A_{1,1}$ in the example of FIG. 4. This indication of the RAP period or RAP interval for the continuous representation may be contained in headers of the continuous representation such as within an initial segment which is divided by 8, resulting in one segment per subinterval and 8 such subintervals of one segment each, forming one period 80. As indicated above, the two attributes spent for each discontinuous representation in the media presentation description, may comprise one flag for each of the end subintervals.

As has also been already described above, each subset 30 of representations may have one bandwidth information associated therewith in, for example, the media presentation description 70 that indicates the range of bandwidths commonly for all representations of the respective subset 30, or more precise, needed for the subset on the long run. Such bandwidth information may indicate a bandwidth or a range of bandwidths allowing, when available for download, a continuous play-out of the media content when downloaded using the subset. Such a common indication may neglect, for instance, the preliminary increase in bandwidth needed when tuning-in or switching-into the respective subset of representations in case of, for instance, designing the subset of representations to leave the quality constant when tuning-in or switching. Likewise, a common quality information could be associated with such a subset 30. Even further, another attribute could be used for indicating the membership of the individual representations of set 52 of a certain media content to a certain subset 30. All representations for which this attribute is the same, then would belong to the same subset 30. An example for such an attribute has been presented above by way @representationGroupId.

As has also been described above, for each of the n subintervals into which period 80 is subdivided, the media presentation description 70 could further comprise a third attribute indicating the bandwidth information associated with using this subinterval in order to tune-in or switch into the respective representations subset 30. For instance, imagine that FIG. 6 is designed so as to achieve constant quality even when tuning-in or switching-into the respective representation subset 30 by using any of the discontinuous representations. Then, the bandwidth consumption will be preliminarily increased until reaching the next-to-come RAP segment of the continuous representation owing to the worse ratio between RAP segments and non-RAP segments within the preliminarily used discontinuous representation until reaching the said next-to-come segment of the continuous representation. This preliminary increase could be indicated by way of this third attribute, an example of which has been given above by way @SAbandwidth. Similarly, a third attribute could indicate quality information for each of the n subintervals, thereby indicating the preliminary decrease in quality when tuning-in or switching-into the respective representation subset 30 at the respective subinterval when having designed, for instance, the representations of subinterval to allow maintaining a constant bitrate even when switching into the representation subset via a detour using any of the discontinuous representations.

A reminder is made that several subsets 30 may be present within subset 52 for a certain media content as has already been discussed with regard to FIG. 4. Switching from one subset to the other may, using the above embodiment, be performed very efficiently, namely, in a fast manner owing to the increased RAP density due to the ability to exploit the one or more discontinuous representations, and in view of storage capacity over at the server owing to the discontinuous coding nature of the discontinuous representation(s).

Before transitioning to the next embodiments concerning a further aspect of the present application it is again noted that the information 44 which deriver 40 derives from the data received from server 10 does not necessarily have the same structure. For example, differing from the above outlined examples, one index, or one index plus indication of the size of the pitch 80, could suffice in order to derive therefrom information 56 and 54, i.e. the temporal distribution of RAPs and "gaps" over the segments of representations of subset 30.

With respect to the embodiments described so far with respect to FIGS. 4 to 8, it is noted that, as has already discussed above, it is not necessarily the case that segments of type $22_3$ are completely left out or non-coded so that the discontinuous representations have gaps. Rather, these representations, called discontinuous representations in the above description, could be alternatively designed so that, as already described above, segments of type $22_3$ are downloadable. Thus, the "discontinuous representations" could, in accordance with alternative embodiments, signaled as containing all segments, i.e., as if they had no gaps and were in fact complete or regular representations. As has been described above, instead of treating segments $22_3$ as missing segments, segments $22_3$ could be of very bad quality or could be "empty" segments. Alternatively, segments $22_3$ of the helper representations could be associated with replacement segments of other representations and the streaming device could be provided with these replacement segments upon requesting the download of such segment $22_3$. Even alternatively, no segments of type $22_3$ could be used at all. Such a procedure would have the advantage of keeping the MPD 70 simple and may be aligned with current designs. Nevertheless, in accordance with the embodiment described below, a streaming device is "guided", or steers, by relying on certain server/client agreements, its way through the representations such that the RD performance of the downloaded substream or subsequence 60 put together from the representations of such a subset of representations assumes its optimum as soon as possible, but nevertheless minimizing tune-in time, i.e. the start of this downloaded subsequence 60 or the time till switching T takes place. Explicit or implicit Signaling may be used that makes the client or streaming device understand that there is a hierarchy (in terms of priority) within the subset of representations indicating that it is desirable or expected from a user, that whenever there is an RAP or stream access point, for example called SAP in DASH, opportunity to a higher priority representation, the client or streaming device should switch to that representation. The just-mentioned circumstance forms the basis of the embodiments of the second aspect of the present application described next.

In particular, FIG. 4 may serve as a basis for explaining and describing a further embodiment of the present application which relates to the second aspect of the present application. The description of this embodiment coincides largely with the description of the embodiment described before with respect to FIGS. 4 to 8 as far as the design, provision and storage of the representations of the media content(s) at server 12 is concerned. However, the media information 44 which deriver 40 derives from server 12 or, to be more precise, on the basis of data obtained from server 12, differs in accordance with the embodiment described now and likewise, segment downloader 42 acts differently as described in the following, on the basis of this differing information. Insofar, the description put forward below with respect to FIG. 4 differs from the above description in the following manner. In explaining the differences, special attention is drawn to the media information 44, the content of which is now described with respect to FIG. 9. Frankly speaking, according to the embodiment below, the streaming device 10 is not made aware of the "holes" or "gaps" in representations which in accordance of the present embodiment may be present in the representations, but need not to be. However, the streaming device derives information from data received by server 10 rendering clear a priority among representations of one subset so that the streaming device knows that certain low-priority representations should merely be used for sake of fast switching into the subset, thereby allowing for providing gaps in such "helper representations".

Figure 9:
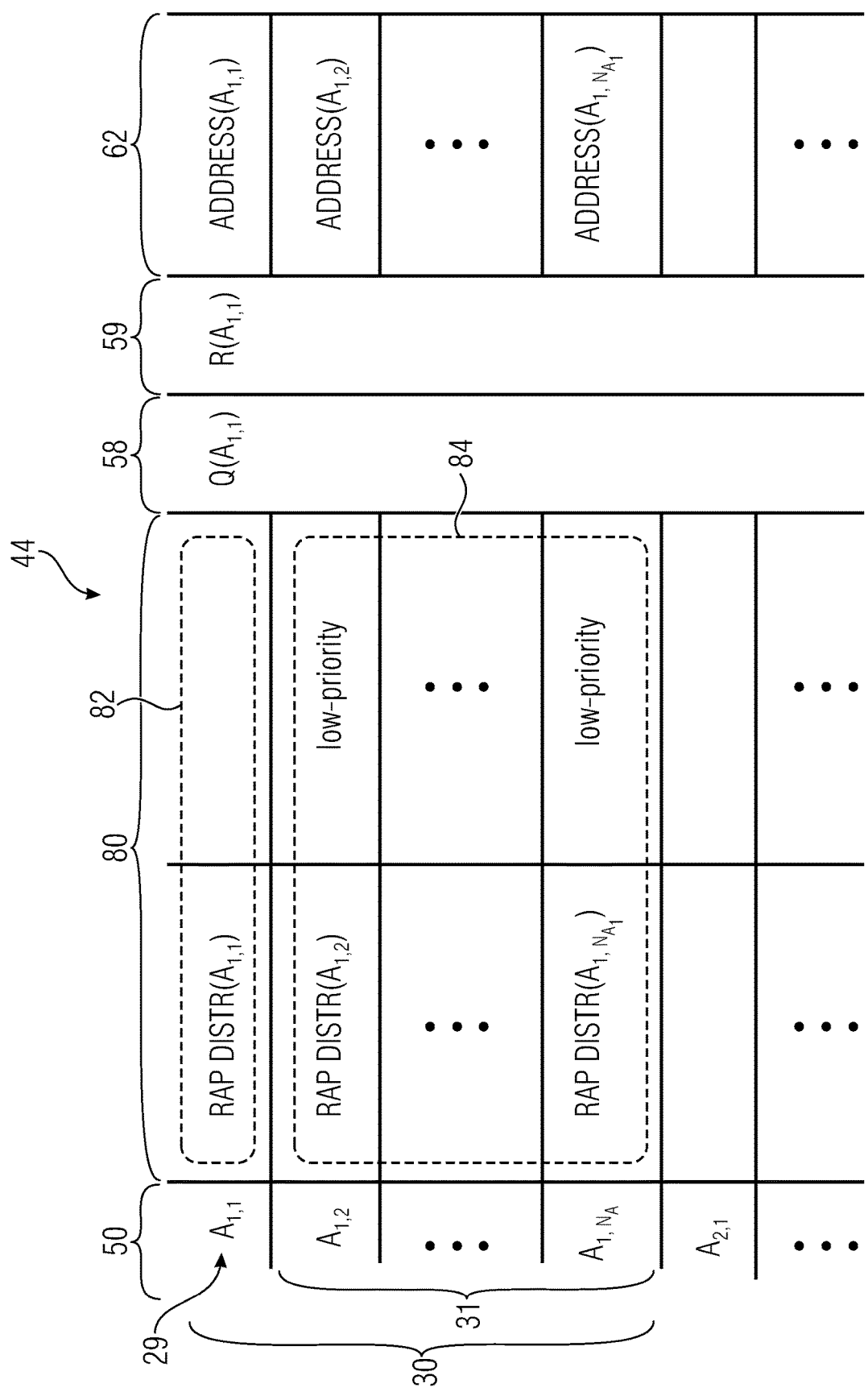
FIG. 9 schematically illustrates a composition of the media information in accordance with an embodiment for an exemplary case of the subset of representations comprising a continuous representation forming a main representation, and one or more secondary representations.

As FIG. 9 shows, the media information which deriver 40 derives from server 12 or, to be more precise, from data obtained from server 12, comprises, in addition to information 50, which specifies the whole set 52 of representations, subset specific information 80 which specifically sets up the rules and inter-relation between the representations of a subset 30. This information 80 comprises an information 82 on, for the continuous representation 29 of subset 30, the temporal distribution of random access points of this representation 29, and a further information 84 on, for each of the set 31 of one or more helper representations, which might be "discontinuous representations" as explained above, the temporal distribution of random access points of the respective helper representation. Additionally, information 84 indicates or specifies for each of such helper representation that the same is of lower priority than compared to the continuous representation 29 which, thus, may alternatively be called a main representation 29 in accordance with the aspect currently explained.

Figure 7:
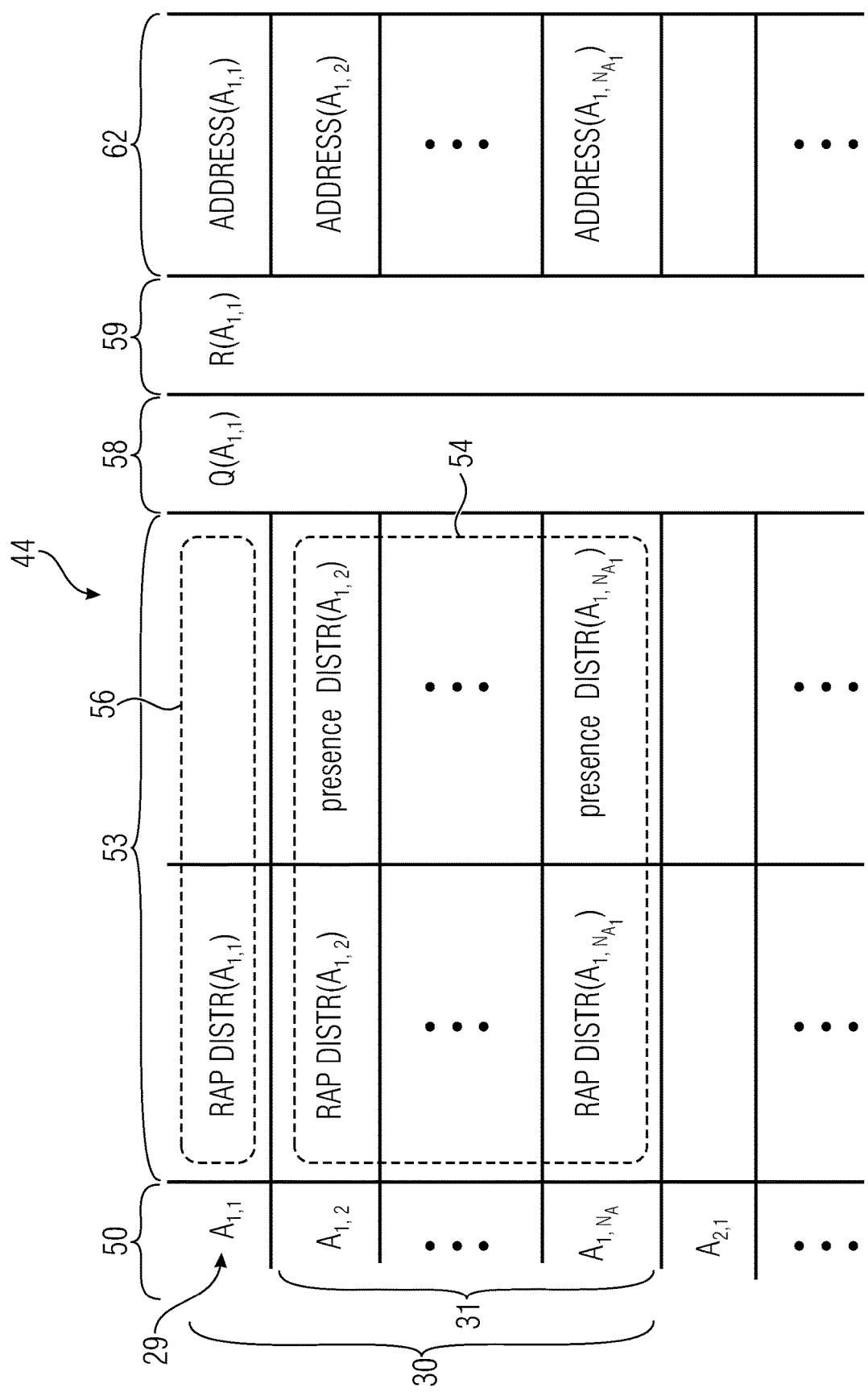
FIG. 7 illustrates a composition of the media information retrieved by the deriver of the streaming device in accordance with an embodiment where the set of representations of the media content at least comprises a subset of representations including a discontinuous representation.

Further information may be comprised by media information 44 in accordance with the embodiment of FIG. 9, with the explanation of this additional information being illustrated in FIG. 9 as coinciding in meaning and semantics with the corresponding information discussed with respect to FIG. 7.

The segment downloader 42 receiving the media information 44 in accordance with FIG. 9, is configured to download the media content from server 12 in the form of sequence 46 of segments, with selecting on the basis of the media information 44, for each of the sequence 46 of segment, one of the set 52 of representations and retrieving the respective segment 22 of sequence 46 from the representation selected for the respective segment. So far, the functionality of the segment downloader 42 coincides with the description put forward above with respect to FIG. 4 relating to the first aspect of the present application. However, owing to the fact that in accordance with the media information of FIG. 9, the segment downloader 42 is not aware of the "gaps" in the helper representations, namely, $A_{1,2}$ to $A_{1,N_A}$, segment downloader 42 acts differently compared to the previous description as far as situations are concerned where segment downloader 42 commences downloading the media content by selecting and retrieving segments 22 of sequence 46 out of subset 30, i.e., upon entering phase 60 shown in FIG. 8 where segment downloader 42 decides to tune-in or switch-to the quality level with which the subset 30 of representations is associated.

In particular, in this situation, segment downloader 42 detects a next-to-come random access point of the continuous representation based on information 82. Imagine, for instance, that the switching time instant T in FIG. 8 occurs at a segment where representation $A_1$ (see FIGS. 6 and 8) does not have a random access point segment, and where, as exemplarily shown in FIG. 6, helper representation $A_{N_A-1}$ has a random access point. Then, the next-to-come random access point of representation $A_1$ comes two segments later. The segment downloader 42 then, selects based on the second information 84, for the segment preceding the next-to-come random access point of representation $A_1$, the continuous representation or main representation 29, irrespective of one of the helper representations. These are the segments between the transition time instant T and the segment immediately preceding the RAP segment of main representation $A_1$. In the example FIG. 6, there are two such segments. For the following segments, i.e., the segments including and succeeding the next-to-come random access point of the main representation $A_1$, segment downloader 42 then elects the main representation as the source for the segments of sequence 46.

In case of using the subset design of FIG. 6 which relies on the design according to FIGS. 1E and 1F, segment downloader 42 may be configured to simply select for the segments 20 between transition time instant T and first-to-come RAP segment of main representation $A_1$ that helper representation which contains a RAP segment at the transition time instant T, i.e., $A_{N_A-1}$, in the case of FIG. 6. Segment downloader 42 would, in this case, exploit an implicit agreement between server and client that the helper representations do not comprise a "gap" of the type of interval 34 or 36 between the random access point of this helper representation and the next following random access point of the main representation.

Figure 10:
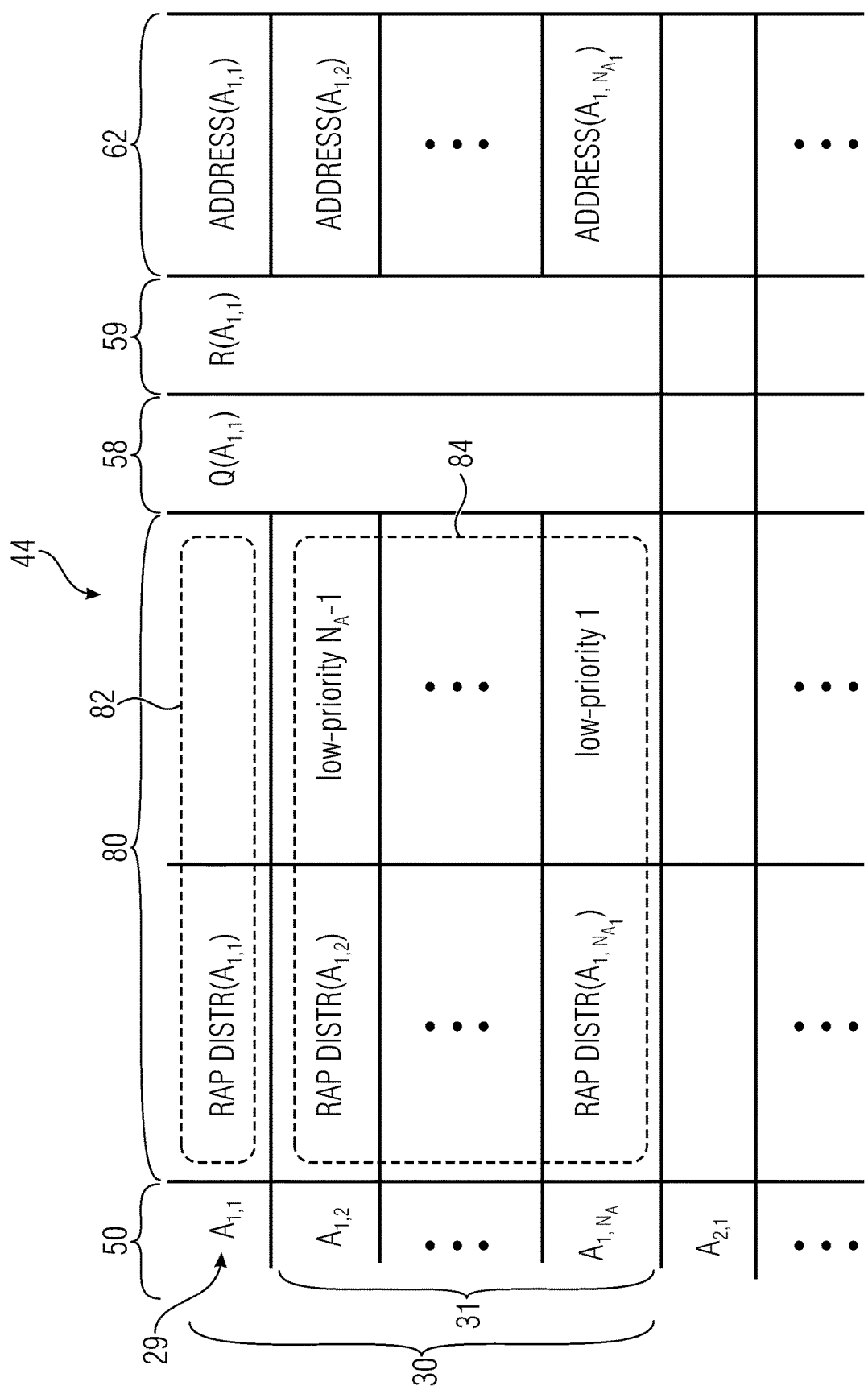
FIG. 10 shows a schematic diagram similar to the one of FIG. 9, but additionally providing a priority ranking among the secondary representations.

More freedom in the design of helper representations is achieved by way of information 84 on a priority ranking among the helper representations. This is illustrated in FIG. 10. Here, the priority among the helper representations is contrary to the second index of the helper representations, i.e., helper representation $A_{1,i}$ has higher priority than helper representation $A_{1,j}$ if i<j. Using this priority ranking, segment downloader 42 could act as follows: the first segment 60a at the time of transition time instant T is retrieved from the representation containing an RAP segment at this segment. For the following segments preceding the next-to-come RAP segment of main representation $A_1$, such as 60b in FIG. 8, the segment downloader 42 acts as follows. For each of these segments, the segment downloader 42 checks whether, for the respective segment any of the helper representations has a random access point segment. If not, segment downloader 42 chooses the helper representation chosen for the immediately preceding segment. That is, the segment downloader 42 remains at the current helper representation. If, however, there is a helper representation having an RAP segment at the respective segment, then segment downloader 42 checks whether this representation is of lower priority. If yes, segment downloader 42 remains at the current representation. If not, the segment downloader 42 selects for the respective segment the helper representation containing the RAP segment, i.e., the RAP segment of this helper representation is inserted into sequence 46. In this manner, segment downloader 42 safely arrives without media interruption to the segment immediately preceding the RAP segment of the main representation. Imagine, for instance, the transition time instant would have happened at the segment concerning frames 9 to 16 in FIG. 3A with the subset 30 of representations being designed according to FIG. 3A. The, the segment downloader 42 would have chosen RAP segment of stream 4 for the first segment at the transmission time instant.

As the next segment which concerns frames 17 to 24, as the segment for which stream 3 has an RAP segment, segment downloader 42 selects stream 3 for this segment and downloads RAP segment of stream 3 as part of sequence 46. The next segment concerns frames 15 to 32. For this segment, stream 4 has an RAP segment, but stream 4 is of lower priority than stream 3 and accordingly, segment downloader 42 remains in the current representation and selects representation 3 of stream 3 for the segment concerning frames 15 to 32. As the segment concerning frames 33 to 40 has an RAP segment in the higher priorities stream 2, segment downloader 42 changes to representation of stream 2 of this segment and remains for the following segments in this representation, namely stream 2, until reaching the next-to-come segment of the main representation, mainly stream 1 at frame 65.

With respect to the source of information 50, and 84, it may be that this information is comprised in the media presentation description 70 although, similar to the statement made with respect the embodiments of FIGS. 4 to 8, concerning the first aspect of the present application, the information 44 may be distributed over several sources including or excluding the media presentation description 70. As to the sort of syntax elements and attributes which may be used to describe the information indicated in FIGS. 9 and 10, it is noted that same may coincide with the examples set out in the above tables wherein, however, @segmentPresent, would be left off here. Moreover, like the statement done with respect to FIG. 7, it is noted that the media information 44 of FIGS. 9 and 10 does not necessarily to be derived from data sent by server 10, which has the same structure shown in FIGS. 9 and 10. For instance, although it may suffice if the data sent from server 12 to client 10 merely contains an explicit indication of the RAP intervals of the representations of subset 30, information on the RAP distribution of these representations. The deriver 40 may deduce the priorities among same from the RAP distributions. The larger the RAP distance the higher the priority is, for instance. I.e. implicit signaling may be used for priorities. That is, the streaming server's 10 deriver would deduce the priorities among the RAP distances and its downloader 42 would determine the path from a low-priority, frequent-RAP representation 29 to the desirable least-frequent-RAP representation 30 as described above. Whether gaps are present in any of representations 29 or not is a matter of design choice. Some segments may be of type $22_3$ since the service provider may rely on the "path finding" behavior of streaming device 10 which behavior may lead to a bypassing of certain segments inevitably independent from the segment or time instant T at which streaming device 10 tunes-in in to subset 30. The "behavior" may be as outlined above: Whenever client 10 encounters a RAP segment of another representation than the currently selected one, which has a RAP period which is advantageous, i.e. larger, then client 10 switches to the latter representation.

The SIDR solution has the drawback that the server storage overhead is very high and other approaches rely on having a complete stream with a RAP segment at segment #n|mod(#n,N)=0 with no other segment #n available at any stream. This means that a client has to download an RAP segment for segment #n|mod(#n,N)=0, which might be undesirable. An alternative is that the content provider generates two streams. Each stream has every second segment encoded as an RAP segment, but at a different position (i.e. in an alternate fashion), as illustrated in FIG. 11A. This solution is referred to as alternate-RAP (alt-RAP).

The idea behind alt-RAP is that a service is provided in such a way that the client can switch from one stream to another and that it can download consecutively N−1 non-RAP segments after an RAP segment although N−1 is greater than 2 which is the RAP periodicity of streams 1 and 2. There could be a promise that downloading such N−1 non-RAP segments does not lead to a quality which is too low. The server could, for instance, promise, e.g., by signaling an attribute or descriptor within the MPD 70, that the drift that results from decoding the streams by using "incorrect" references is acceptable as long as not more than N−1 consecutive non-RAP segments are downloaded and decoded. Such a client operation is illustrated in FIG. 11B. The segments downloaded are marked used cross-hatching in order to differentiate the same from the co-temporal non-selected segments.

The idea underlying the alt-RAP configuration explained above with respect to FIGS. 11 and 12 forms the basis of the subsequently explained embodiment of the third aspect of the present application. Again, FIG. 4 may serve as a basis for explaining the embodiment. At least, the components of server 10, network 18 and streaming device 10 with a following decoder 48 may remain. The nomenclature and illustration of the media contents available may remain, too. $N_{A_1}$ and $N_{A_2}$ are two, i.e., there are subsets of two representations having non-overlapping random access point segments. They may be designed according to FIG. 11A, but a different configuration would be feasible, too. For example, the number of streams per subset is not restricted to two, although the restriction to two streams per subset 30 will result in a lower storage capacity consumption at server-side compared to a higher number per subset. Moreover, the RAP pitch or period between the RAP segments within streams 1 and 2, i.e., the streams of subset 30 may, in accordance with an alternative embodiment, not equal each other. That is, it could be allowed that from time to time there are segments where both streams or both representations have an RAP segment concurrently. Even further, the RAP interval of streams 1 and 2 may be equal but greater than two segments long, and accordingly, there may be segments between RAP segments of streams 1 and 2 where both streams 1 and 2 have non-RAP segments of type $22_2$. In such a case, there may be a kind of "freedom" for segment downloader 42 to switch from one stream to another in order to "bypass" a forthcoming random access point and the currently selected stream.

Figures 11C, 11D:
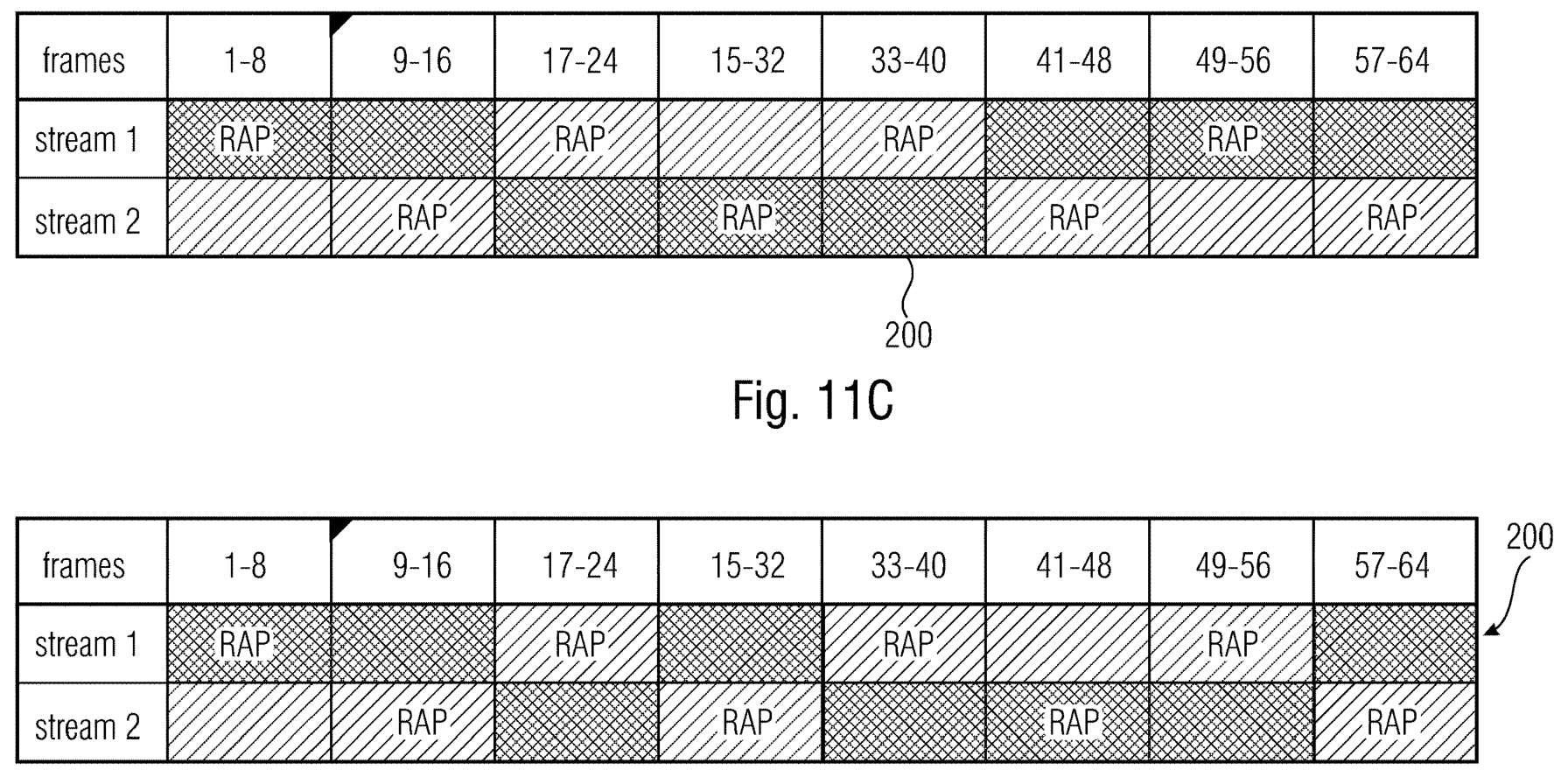
Figure 12:
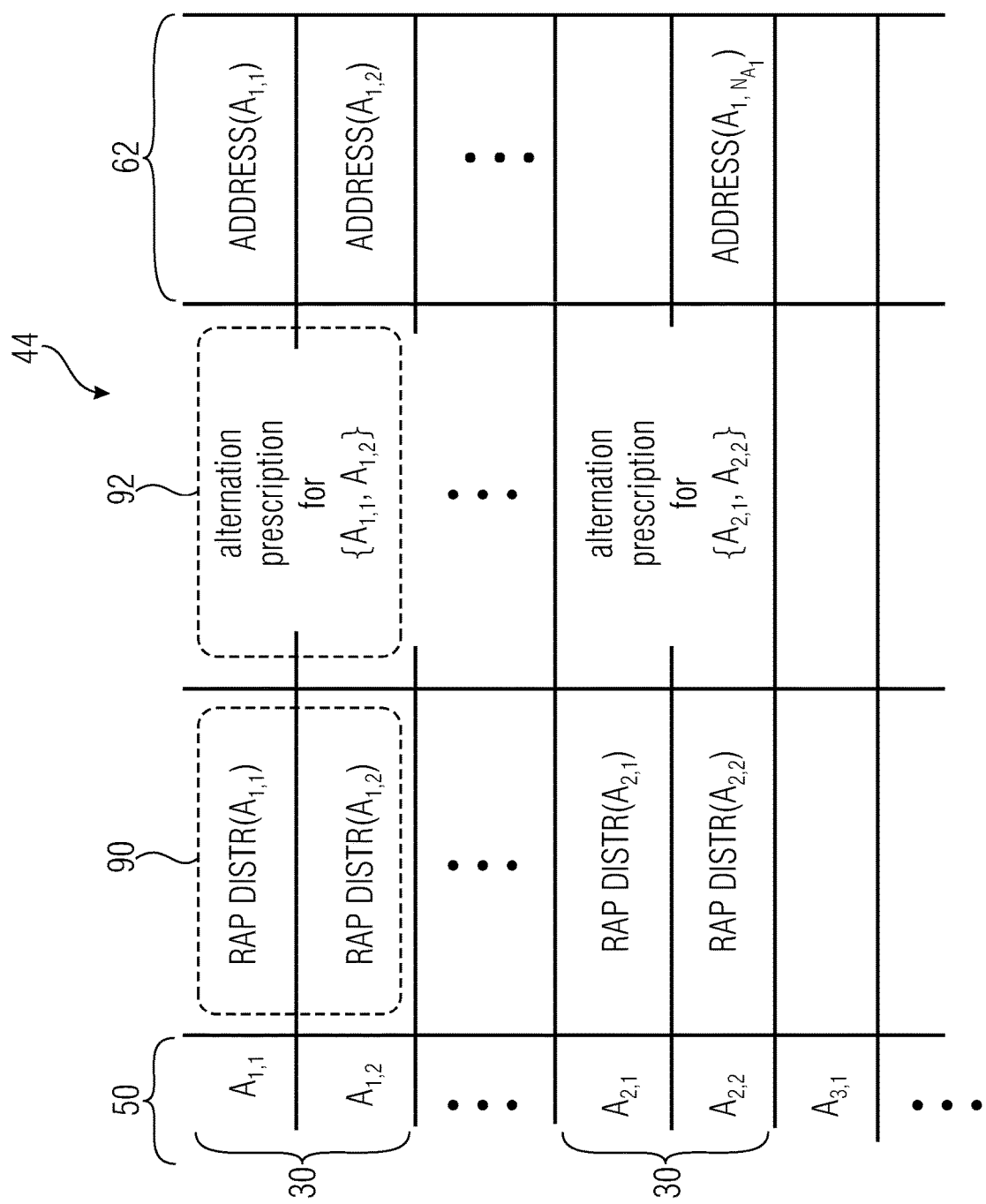
FIG. 12 schematically illustrates a composition of the media information in accordance with an embodiment where a subset of representations between which the streaming device may alternate is used.

FIG. 12 illustrates the media information 44 which could be derived by deriver 40 in accordance with an embodiment of the third aspect of the present application on the basis of data provided by server 12. The media information 44 of FIG. 12 comprises the information 50 specifying the set 52 of representations at which a certain media content, here exemplarily media content A, is available at sever 12. It has already been mentioned above, that the availability of more than one subset 30 of representations would not be necessary, but for illustration purposes, FIG. 12 adheres to the example provided in FIG. 4 so that there are two subsets of representations, one containing representations $A_{1,1}$ and $A_{1,2}$ and the other subset containing representations $A_{2,1}$ and $A_{2,2}$. Other information comprised by media information 44 could be information on the temporal distribution of random access points of the representations forming one subset. This is information 90. On the basis of both pieces of information, namely 50 and 90, segment downloader 42 is able to remain, within a certain time phase 60 within one subset 30 of representations, i.e., with performing the selection among the representations of set 52 to be restricted to the corresponding subset 30, in such a manner that in the finally downloaded sequence 46 of segments, the RAP segments within phase 60 exceeds the RAP intervals of each representation of the current subset 30. To ease the understanding, it should be noted that segment downloader 42 is able to tune-in or switch-to a subset 30 of representations faster than it would be allowed by the RAP intervals of the individual representations of that subset. See, for instance, FIG. 11A: both streams of subset 30 have an RAP interval of 2 segments. Accordingly, for each stream individually, every second segment does not allow for a random access or tune-in into the respective stream. Owing to the RAP offset relative between these streams, however, the segment downloader 42 may tune-in or access the subset of streams at each segment, simply selecting for the first segment 60a within time phase 60 (compare FIG. 8) that representation of subset 30 which comprises at the switching time instant T an RAP segment. More broadly speaking, segment downloader 42 selects among the representations of subset 30 that representation for the first segment 60a for tuning-in or switching-to the subset of representations, which comprises the next-to-come random access point relative to the switching time instant. From that time onwards, it is not necessary that segment downloader 42 has to live with a bandwidth consumption which would result from maintaining at that representation until leaving subset 30 again, namely, the bandwidth consumption inevitably associated with the RAP interval of the chosen representation of subset 30. Rather, segment data 42 is allowed to alternate between the representations so as to bypass any forthcoming RAP segment of a currently selected representation so as to prolong the RAP pitch or distance within the downloaded sequence 46. This reduces, however, the quality continuously from the first representation change onwards due to the drift which results from changing a non-RAP segment's reference. In order to better understand the just-mentioned circumstance, see FIG. 11B: at the time where segment downloader 42 switches from stream 1 to stream 2 from the segment concerning frames 9 to 16 on the one hand to the non-RAP segment concerning frames 17 to 24 on the other hand, the decoding reference for the non-RAP segment of stream 2 concerning frames 17 to 24 has changed: this segment has actually been encoded assuming that at the time of decoding, the segment will decoded on the basis of, i.e. with using a coding reference, the RAP segment immediately preceding the segment and being of the same stream, namely stream 2. In the finally downloaded sequence 46 of segments, however, namely in the sequence of segments indicated cross-hatched in FIG. 11B, the new reference is formed by segment of stream 1 relating to frames 9 to 16. Depending on the coding technique used, this may result in a different reconstruction result or decoding result as far as the segment of stream 2 concerning frames 17 to 24 are concerned. For instance, normally, coding codecs are of lossy-type and accordingly, the coding distortion associated with segment of stream 1 concerning frames 9 to 16 will most likely differ from the segment of stream 2 concerning frames 9 to 16. From this time onwards, there is a drift which will continuously increase until reaching the next RAP segment. In the case of FIG. 11B, the immediately subsequent segment within the downloaded sequence 46 of segments is an RAP segment, and accordingly, the drift merely affected the segment concerning frame 17 to 24. Further bypassing this RAP segment by selecting segment of frames 15 to 32 of stream 1, instead, would however, extend the drift until reaching the next RAP segment. The crosshatched segments could, thus, form a subsequence 60 of sequence 46 in FIG. 8. Sequence 60 could become sequence 46 in case of subset 30 being the whole set 52.

The above description has already revealed that the individual representations of one subset 30 in accordance with the embodiment of FIG. 12, are somehow of equal priority and have lost their meaning as a "main representation". Accordingly, media information 44 may not contain an individual indication of quality and bandwidth needed in order to download any of the representations of a subset 30 exclusively without alternating switching between the representations of that subset. Alternatively, media information 44 may alternatively comprise for each subset 30 an information 92 indicating a kind of "alternation prescription". This alternation prescription could, for instance, indicate a maximum RAP distance in the finally downloaded/selected sequence 46 or, to be more precise, within phase 60. The alternation prescription could concurrently indicate the bandwidth associated with, or resulting from, alternating between the representation of the corresponding subset 30 to attain this maximum RAP distance in sequence 46. The downloader 42 would, accordingly, maintain a constant RAP rate in the alternatingly composed segment subsequence 60.

As the quality decreases in a saw tooth-like manner from RAP to RAP in sequence 60 with increasing the RAP distance in the finally downloaded/selected sequence 46, the alternation prescription 92 may indicate several pairs of RAP distances achievable by alternating between the participating representations of the respective subset 30 and the corresponding resulting bandwidth needed. Additionally or alternatively, a minimum quality or a mean quality associated with a corresponding RAP distance could be indicated. By this measure, the segment downloader 42 could perform rate adaptation not only by changing from one representation subset 30 to the other, but also by changing the RAP distance by alternating between representations within a current subset 30. In other words, downloader 42 would exploit that the RAP distance achieved be alternation between the representations of one subset would represent an ordinal measure for the quality degradation of the media content represented by the resulting subsequence 60 of segments owing to the drift, and for the data compactness of the sequence of segments as the data rate decrease with increasing RAP distance. Accordingly, the rate adaptation process of segment downloader 42 could take place in a two-dimensional space spanned by the various instantiations of subsets 30 which are associated, for instance, with different qualities per se, and the RAP distance associated with alternating between the representations of a respective subset 30.

An instantiation of a signaling for information 92 using a supplementary descriptor could be as follows.

An instantiation of such a signalling using a supplementary descriptor could be as follows.

The value of @schemeIdURI for the descriptor shall be equal "urn:mpeg:dash:alternateRAPRepresentations:2016".

It indicates how many non-RAP segments can be downloaded and groups the representations together where switching at non-RAP segments can be performed with an acceptable quality, i.e. negligible drift.

@value of the supplemental property descriptor is a white-space separated list of three values as specified in the following table:

| SupplementalProperty@value attributes alternateRAPRepresentations: 2016 | | |
| --- | --- | --- |
| SupplementalProperty @value parameter | Use | Description |
| alternateRAPGroupId | M | Specifies the ID that associates the representation, to which the descriptor belongs to a group of representations for which non-RAP switching can be done up to a given number of consecutive segments. |
| numNonRAPSeg | M | Specifies the number of non-RAP segments that can be consecutively downloaded with negligible drift. |

Legend:
M = Mandatory,
O = Optional

Additionally, "with an acceptable quality, i.e. negligible drift", could be interpreted as unnoticeable difference. And a maxNumNonRAPSeg parameter could be added to the descriptor (or attribute or element) that indicates the number of non-RAP segments that should not be exceeded since it would lead to an unacceptable quality. If so, clients could decide how many consecutive non-RAP segments x to download, where 1≤x≤numNonRAPSeg or 1≤x≤maxNumNonRAPSeg.

Note that the same approach can be used if sub-segments are used. The embodiments described in the present application should be read so that if sub-segments are used all described techniques applying to segment can apply also to sub-segments.

In case clients switch using this technique the downloaded bitrate cannot easily be derived. An @bandwidth attribute per potential x consecutive non-RAP segments, where 1≤x≤numNonRAPSeg or 1≤x≤maxNumNonRAPSeg, is signalled. An additional signalling could be added to indicate the quality (in arbitrary measure, PSNR, SSIM or any other indicated method) and can be added to each pair (x,@bandwidth) so that clients could decide, depending on their available throughput, the amount x of consecutive non-RAP segments they want to operate with.

Many alternatives to the above embodiments are feasible. For example, the possibility to use a RAP pitch indication to indicate the RAP distribution of representations it not the only possibility and could be handled differently. @segmentRAP represents such a possibility, but even here it should be understood that other possibilities would be feasible as well. A similar statement is true for indicating the "gaps" or intervals 32, 34. @segmentPresent leaves a high degree of freedom, but other descriptions may suffice if, for example, the design of representations subsets including "discontinuous representations" is restricted to certain design types. The fact that according to the first aspect a continuous representation 29 might reasonably be left off may be illustrated using FIG. 6, for instance: Imagine a design of the 8 representations which form one subset 30 which results from duplicating period 80 and changing the roles of the eight representations between the first and second halves of period 80. No representations would then be continuous, but the same efficiency could be achieved. Further it should be noted that information 50, 90 and 92 could be contained in MPD file 70.

Figure 13:
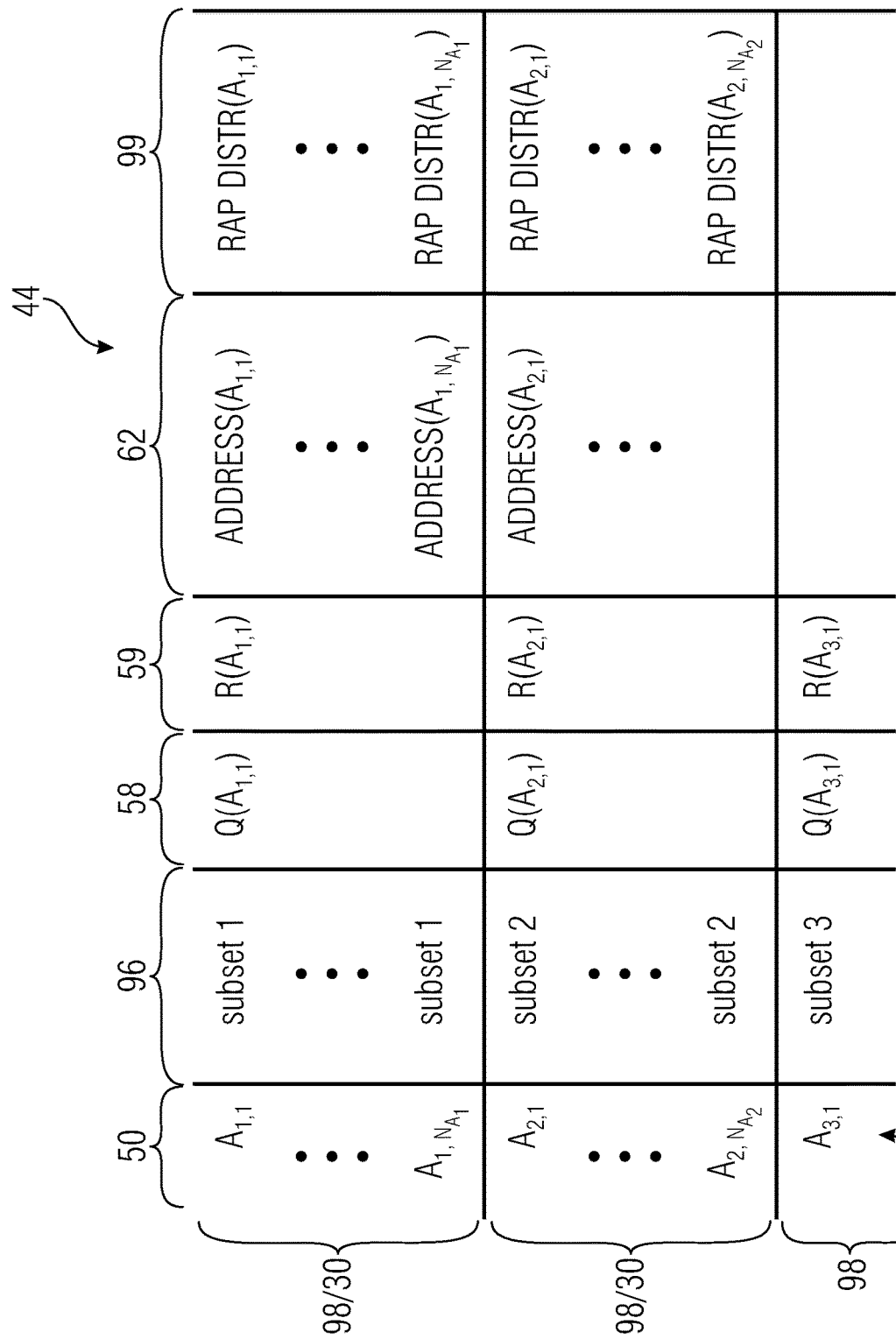
FIG. 13 shows a schematic diagram illustrating a composition of the media information in accordance with an embodiment.

The above embodiments and aspects described so far represent different possibilities of efficiently designing a subset of representations. In accordance with the embodiment described next with respect to FIG. 13, which relates to a fourth aspect of the present application, the juxtaposition of representations of a subset 30 is seen as a kind of further dimension along which representations of set 52 may be semantically grouped or even ordered. Representations of one subset form one RD level for enabling rate adjustment at client side, i.e. are associated with the same bitrate and/or the same quality, but their juxtaposition allows for a fast switching between these subsets and accordingly, a very responsive or quick rate adaption.

As done with respect to FIGS. 9 to 12, the following description of a streaming device uses FIG. 4 as basis, with concentrating the description to the differences, especially with respect to media information 44. In case of FIG. 13, As from the server (12), and the media information 44 comprises first information 50 specifying the set 52 of representations of the media content at which the media content A is available for download at the server 12. Second information 96 on subdividing set 52 of representations into subsets 98 of one or more representations, by bitrate or quality is contained, too. This information has inherently been used in the above embodiments as well, as can be seen by the first low-ranking index of representations $A_{\#,\#}$. Information 96 may, thus, be something which is derived by deriver 40 from either explicit or implicit signaling, and in case of explicit signaling, the structure thereof needs not to coincide with the structure illustrated in FIG. 13 according to which each representation of set 52 is illustratively shown as being tagged with a subset tag. For instance, imagine that even the third bitrate/quality level would by composed of a subset 30, then the signaling of N, the number of representations per subset 30, with $N=N_{A_1}=N_{A_2}=N_{A_3}$ could suffice to indicate the subdivision information 96. The subsets 98 are associated with different bitrates and/or different qualities. For example, information 58 and 59 could be used to this end which information would indicate for each subset 98 the associated bitrate (in case if information 59) and/or associated quality (in case of information 58). The representations of one subset 98 are associated with one bitrate and/or quality. At least one of the subsets 98 would be a subset 30 composed to allow for fast tune-in or switching thereto. Two subsets 30 are illustrated in case of FIG. 13 in order to comply with the example outlined in FIG. 4, but each of subsets 98 may or may not be a subset 30. Such subset 30 may be designed in accordance with any of the above presented in FIG. 1A to 12. The media information 44 comprises information 99 on, for each representation of each subset 98 of type 30, a temporal distribution of random access points of the respective representation. Such information has also been present in the media information in the embodiments described above. The segment downloader 42 downloads the media content A from the server 12 in a sequence 46 of segments with selecting on the basis of the media information 44, for each of the sequence 46 of segments, one of the set 52 of representations and retrieving the respective segment from the representation selected for the respective segment, wherein the segment downloader 42 is configured to perform rate adaptation by switching between the subsets 98, and, responsive to switching to any subset 98 of type 30, detect, based on the third information 99, one of the representations of the respective subset 30 which comprises, among the random access points of all representations of the predetermined subset, the random access point which occurs soonest relative to the switching time instant T to the respective subset 30. That is, the segment chooses to download the segment at T from the representation of subset 30 which has at this time instant a RAP segment, or has the RAP segment soonest to come after T, as it has already described above. All of the above descriptions shall apply to the present embodiment as well, such as for the downloader 42: Whether gaps are present or not, i.e. whether the subsets(s) 30 contain incomplete representations 29 or not, the downloader would derive enough information so as to determine the path from any RAP towards the main representation 31 if such exist. The streaming device, thus, switches progressively towards such representation 31.

The above embodiments described so far enable a sufficient support of a fast switching and tune-in capability, namely efficient in terms of server-sided storage overhead. The nevertheless occurring storage overhead, however, may in addition to the description brought forward above, be restricted temporally. For instance, the media information of the above-described embodiments may additionally be provided with an information which is derivable by deriver 40, which indicates as to how long the aforementioned helper representations, and/or discontinuous representations and/or the juxtaposition of representations within a subset according to the alt-RAP embodiments are available. That is, media information 44 could be provided with an information as to how long such additional or "nice to have" representations are available at the server. After that time, they are no longer available. This makes sense, for instance, whenever the media content relates to a live media content so that the necessity to have a low latency in downloading the media content may vanish rapidly. Accordingly, the availability of the latter representations may be provided with an information indicating as to how long they are available at the server 12.

The latter aspect forms the starting point of a thinking which leads to a fifth aspect of the present application which is described in the following on the basis of a combination of FIGS. 4 and 14. In particular, according to this embodiment, the media information 44 derived by deriver 40 comprises the first information 50 specifying the set 52 of representations of the media content, here exemplarily media content A. The representations have associated therewith various RAP distributions which may be indicated by an information item 100 of media information 44 as has been the case in the various embodiments described above. It should be mentioned, however, that according to the embodiment of FIG. 14, the representations forming one subset need not be designed as efficiently as explained above with respect to the various embodiments. Rather, the efficiency "of the embodiment of FIG. 14" comes from the further information contained in media information 44 and, thus, derived by deriver 40. In particular, the media information 44 additionally comprises for each subset 30 a further information $T_{i,Avail}$ indicating a media content availability duration for which the media content is available at the server within this subset i. This information 102 is typically a rather long duration in the order of minutes, hours or days. Additionally, however, a further information 104 is present in order to indicate the availability of the further representations, namely the helper representations, of each subset 30. In this regard, it should be noted that in the case of the embodiment of FIG. 12, any of the representations of one subset 30 could be treated as the primary representation, whereas the other representations or the other representation is treated as a helper representation with respect to information 104. The information 104 is information on a fast random access capability duration $T_{i,live}$ with respect to subset i. This duration is in the order of, for instance, milliseconds or seconds. The second downloader 42 could act as follows in retrieving/downloading sequence 46: when commencing downloading the media content, segment downloader 42 could derive a minimum of an availability duration of the primary representation of a corresponding subset 30 from the media content availability duration. The segment downloader 42 would further check whether the fast random access capability duration of the subset has been exceeded. If yes, the segment downloader 42 simply selects the main representation or primary representation of the respective subset 30 whenever seeking to use this subset. If, however, the fast random access capability duration 104 has not been exceeded for a certain subset, segment downloader 42 exploits helper representations of the respective subset in order to attain a faster tune-in or switching-into the respective representation subset 30.

Figure 14:
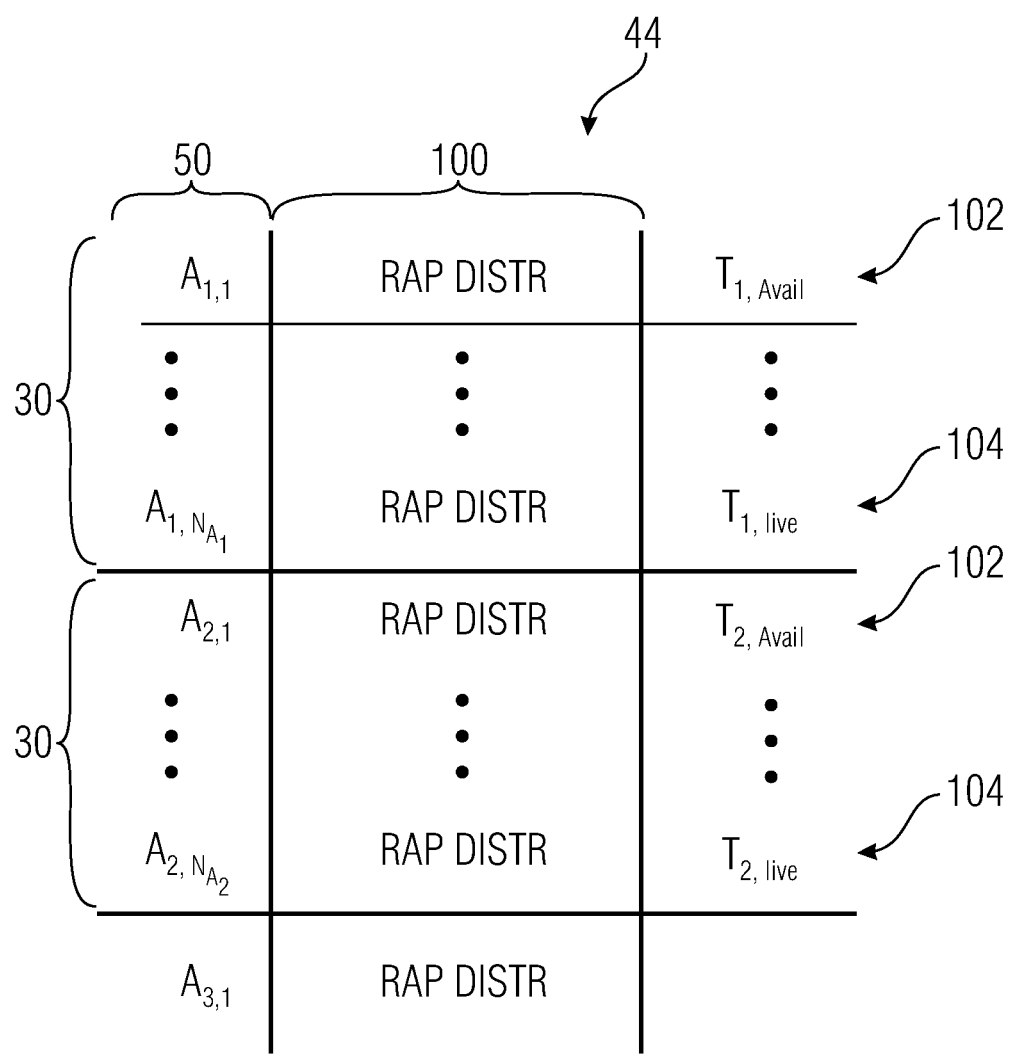
FIG. 14 shows a schematic diagram illustrating a composition of the media information in accordance with an embodiment where helper or secondary representations are associated therewith a lifetime indication.

The embodiment of FIG. 14 may be amended to fit to the alt-RAP embodiments. Here after a while only a "mixed representation" is available, i.e. a result of combining some segments of one of the alt-Rap representations and some segments of another alt-rap representation, which then sequentially put together result into a one-dimensional temporal path through the representations of the subset. Media streaming is rendered more efficient in terms of supporting fast tune-in or any-time switching by offering a set of representations at which a certain media content is available for download at the server, at least a subset of representations between which the streaming device may alternate at segments where random access points of the representations between which the alternation takes place, are absent, along with information on a media content availability for each of the segments of the different representations and a fast random access capability duration. The former concerns an availability duration after which only a subset of segments of the representations are available and only download of segments of that representations lead to a continuous consumption of the media, and downloading the still available segments is equivalent to performing the described segment alternation, i.e. with a lower random access capability duration than when all segments are available. The latter concerns the availability duration of all segments being available for the fast random access capability, the same may be used for fast tune-in or any-time switching, i.e., for a faster random access. By this measure, a live media stream may, for instance, be offered in a manner so that the effort in terms of storage capacity and management overhead at the server-side may be kept at a minimum around the "real time" of the media content.

The recent paragraph renders clear that the association of $T_{live}$ and $T_{Avail}$ to the individual representations of one subset 30 may be done in a non 1:1 manner. Rather, $T_{Avail}$ may indicate the availability of the just-mentioned path, which may have an increased RAP distance by alternating between the representations of that subset, and $T_{live}$ may indicate the availability of the whole segments of all representations of the subset 30. An information on the one-dimensional path may be contained in the media information 44 of the alt-Rep embodiments and in case of the embodiment using $T_{live}$ and $T_{Avail}$, respectively. An example composed of a list or sequence of indices indexing the representations of subset 30 sequentially is described herein below.

The description so far concentrated on the streaming procedure itself. However, the following embodiments show concepts which may be used in order to generate the sets of representations of a media content for live-streaming in a manner so that these representations may be used in accordance with the above-mentioned embodiments.

Figure 15:
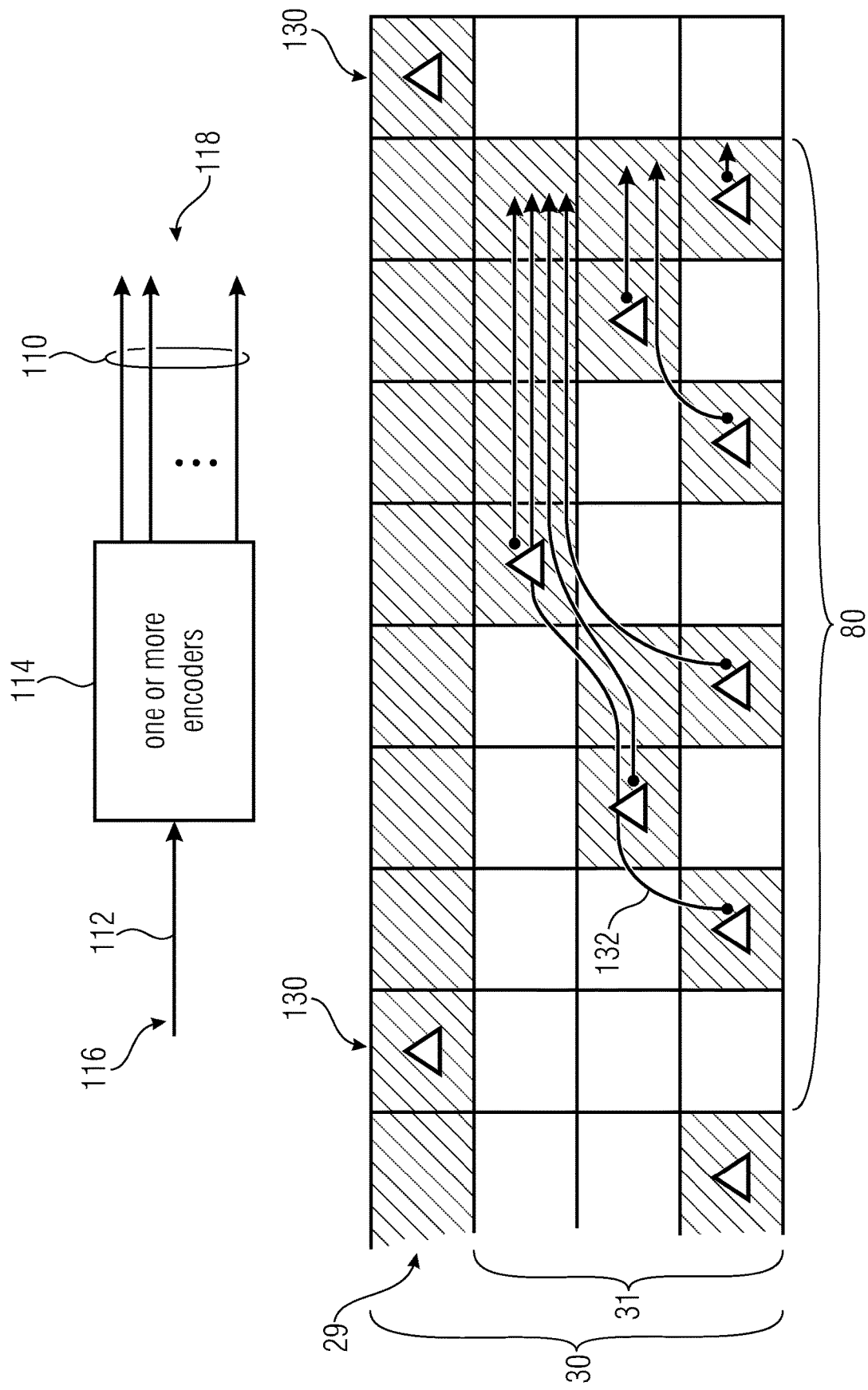
FIG. 15 shows a schematic block diagram of a media content source provider which may be used to generate a set of media representations including "gaps" as illustrated in FIGS. 1C to 1F and 3A to 3D.

In particular, FIG. 15 shows a media content source provider which may be used in order to generate a set of representations on the basis of a media content wherein the set is indicated by 110 in FIG. 15 and may correspond to one of the subsets 30 including discontinuous representations of the above embodiments. The media content 112 is encoded by one or more encoders 114 of the media content source provider so as to obtain the set 110 of representations. The one or more encoders 114 encode the media content 112 into the set 110 of representations in segments in such a manner that the representations of set 110 differ in the temporal distribution of random access points. That is, the media content source provider comprises an input 116 for receiving the media content 112 and an output 118 for outputting the set 110 of representations. The media content source provider is configured so that the set 110 of representations comprises at least one first representation into which the media content is coded continuously. In the above examples, such representation was the first representation in the shown subsets 30. Further, the media content source provider of FIG. 15 is configured so that at least one second representation exists in subset 110 into which the media content 112 is coded intermittently, namely in a manner so that at least some segments thereof are segments of type $22_3$. In particular, each helper representation has at least one segment of type $22_3$ and at least one RAP segment within each interval between consecutive RAP segments of the first representation. Further, the media content source provider is configured so that whenever within one helper representation, there is one segment of type $22_3$ which follows an RAP segment of the respective helper representation and is between this RAP segment and the next RAP segment of the main representation, there is at least one other helper representation which has a random access point segment co-aligned to the segment of type $22_3$. See, for instance, stream 3 of configuration FIG. 3A: the fifth segment concerning frames 33 to 40 is of type $22_3$, but there is stream 2 which has an RAP segment co-aligned thereto.

It should be noted that there might be one encoder among set 114 for each representation of set 110, but this is not mandatory. Further, for each representation, the media content might be encoded into the respective representation independent from other the other representations. However, in order to obtain a switching of almost constant rate, for example, discontinuous representations might be encoded in a manner so that the data rate it takes to get from a random access point of such a discontinuous representation to the next-to-come random access point of the continuous representation, namely by preliminarily selecting one or more of the discontinuous representations, substantially equals the mean data rate of the continuous representations. Let n be the periodicity of RAP segments and "gap segments" mentioned above, i.e. the length of period 80, in segments, and the RAP distance of the continuous representation, respectively, and let $R_{mean}$ the mean data rate per segment of the continuous representation. Then, for each of the n−1 segments between each RAP segments 130 of the continuous representation 29, there is one starting sequence 132 of segments, a downloader 42 will select when entering phase 60 or will select as start of subsequence 60 (cp. FIG. 6), i.e. enter the subset 30. This sequence will start at the $i^{th}$ segment after a RAP segment (the left hand one 130 in FIG. 15) of the continuous representation 29, namely at the discontinuous representation having a RAP segment at that segment, and be n−i segments long. Each of these n−1 starting sequences remains, for instance, within one representation 31 in case of FIG. 1F, but changes between representations 31 in case of FIG. 3A, for instance. The latter example is illustrated in FIG. 15. The possibility of shifting data rate between RAP segments and non-RAP segments distributed over different ones of the possibly more than one discontinuous representations within the sequences 132 may lead to some dependency between the encoding procedures for each discontinuous representation. Similar statements are true when considering encoding the media content into the representations of set 30 with seeking to obtain a tune-in point independent quality.

As to FIG. 15 it is noted that the encoders may either skip encoding segments $22_3$ in incomplete representations directly in case of same completely missing in the discontinuous representations, or may encoded same with the letter segments, however, being dropped before the segments of the representations are output.

Figure 16:
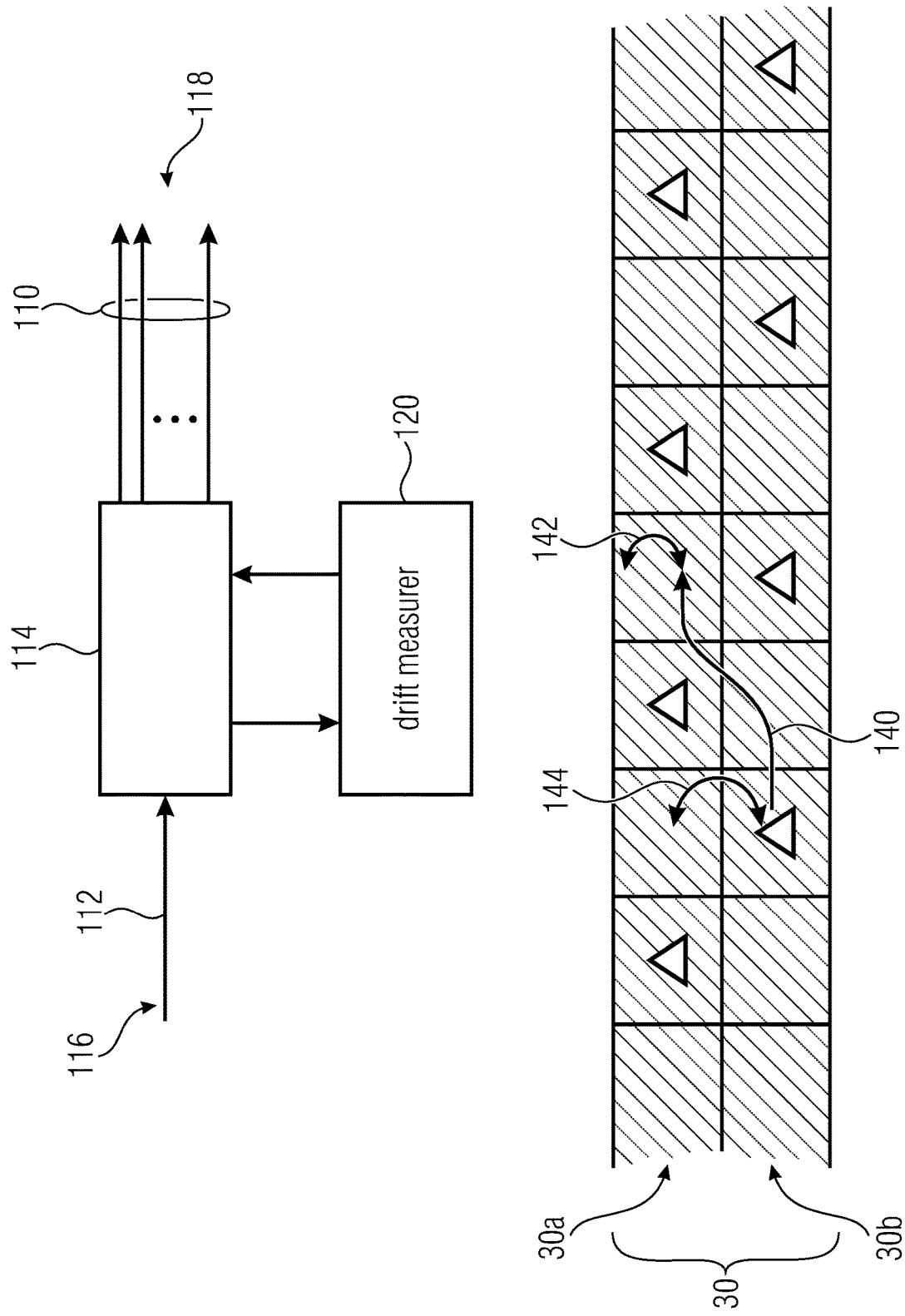
FIG. 16 shows a schematic block diagram of a media content source provider which may be used to generate sets of representations between which the streaming device may alternate in order to prolong the RAP interval in accordance with the embodiment set out above with respect to FIGS. 11A to 12.
Figure 17:
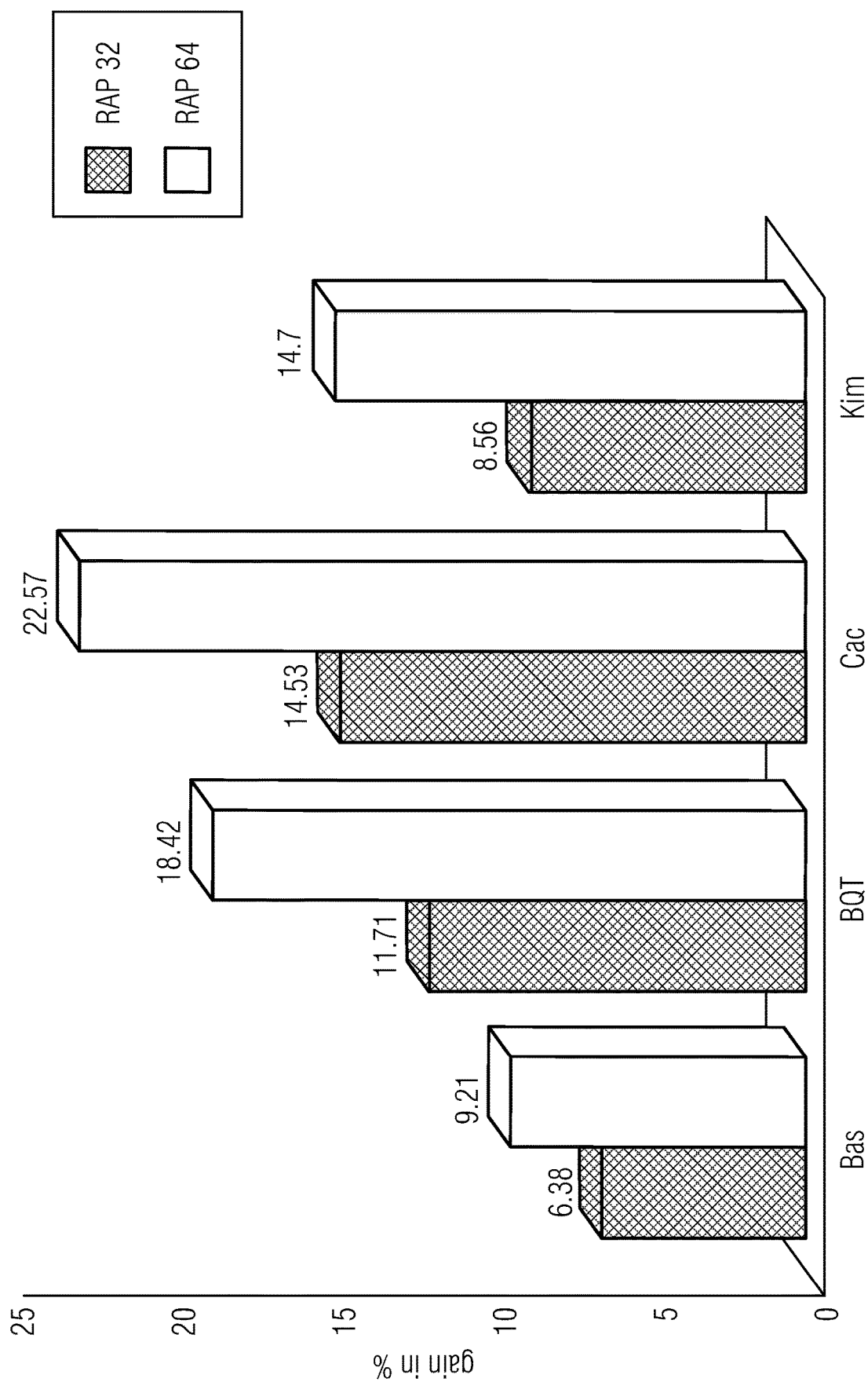
FIG. 17 shows a bar graph illustrating the influence or coding gain achievable by prolonging the RAP interval, here exemplarily for four different standard videos.

Likewise, FIG. 16 shows a media content source provider which could be used in order to generate a set of representations of a media content for streaming, which would be suitable for generating a subset according to the embodiment of FIGS. 11 to 12. In addition to the components shown in FIG. 15, the media content source provider of FIG. 16 comprises a drift measurer 120 operatively connected to the one or more encoders 114. The encoders 114 encode the media content into the set 110 of representations in segments so that the representations 110 of the set of representations differ in the temporal distribution of random access points. However, they do not operate completely independent from each other. Rather, drift measurer 120 somehow interlinks the operation. In particular, drift measurer 120 generates a drift measure for a drift of a sequence of segments of the media content resulting from selecting the segments from the set of representations alternating between the representations of set 110 at segments where the representations between which the selection alternates, have no random access point. For example, drift measurer 120 may continuously checks or measure the drift error manifesting itself in a moving window of consecutive segments resulting from alternating between representations of set 110 as described above for a certain predetermined number of segments due to the coding drift. The drift measurer 120 sends back as feedback, this drift measure to at least one of the one or more encoders 114 so as to control the same. For example, the one or more encoders receiving the feedback from drift measurer 120 may redo the coding with respect to the current moving window of consecutive segments so that the coding of the media content into at least one of the set of representations depends on this drift measure. For example, see FIG. 16 which exemplifies this for the configuration of FIG. 11A: encoding of media content into representation 30a would use a RAP segment every $2i^{th}$ segment while encoding of media content into representation 30b would use a RAP segment every $(2i+1)^{th}$ segment, and the drift measurer 120 would measure, for instance, for each RAP segment of each representation 30a,b, the drift occurring at the end of a sequence 140 of m segments (here exemplarily m=3) which starts with the respective RAP segment and otherwise merely has non-Rap segments, by alternatingly selecting the segments form the two streams with the alternation taking place between non-RAP segments. That is, drift measurer 120 would measure that difference between the representation resulting from decoding sequence 140 and the representation resulting from decoding the representation containing the last segment of sequence 140 up to that last segment of sequence 140 as illustrated using arrow 142. This is done for each RAP segment of both representations 30a and 30b. If the drift measured would not comply with some constraint, then the encoding of representation 30a and 30b, respectively, with respect to those portions containing the segments of the respective sequence 140 of segments for which the drift has been measured, would be repeated, or the encoding of both representations could continuously surveyed so that the drift constraint will be met inherently.

Another possibility could be additionally or alternatively, to couple the encoding of the media content into the representations directly by, for instance, performing the encoding such that a difference 144 between the coding errors of both representations, i.e. the deviation from the original, namely the media content at the input, does not exceed a certain value for each media segment. That is, for each RAP segment of any of the two representations, the temporally collocated non-RAP segment results, when decoding its representation up to that non-RAP segment, in a reconstructed version of the media content which is very similar to the reconstructed result of the respective RAP segment itself, i.e. the difference does not exceed to certain value. The difference may merely be measured at frames of segments which may form a reference of frames of a non-RAP segment $22_2$. The "difference of co-temporal" segments would represent a "measure for a drift" as the lower the difference is, the lower a drift will get.

With respect to FIGS. 15 and 16, it is noted that the one or more encoders may by embodied in hardware, firmware or software, i.e., may be implemented as an integrated circuit, a field programmable array or as a suitably programmed computer. The same applies for the drift measurer in FIG. 16.

With respect to FIG. 16 and the corresponding FIG. 11A to 12, it is noted that it might be favorable to restrict dependencies of the non-RAP segments from their predecessor segment to predictors derived on the basis on the finally reconstructed signal of the predecessor segment. For instance, motion vector prediction could be switched off.

For sake of completeness, in the following some design possibilities for deigning other subsets of representations including one or more discontinuous representations are outlined.

FIG. 3A to 3D were specific configurations in addition to those set out in FIGS. 1E to 1G among a much wider range of possibilities. The details set out below allow for a much more flexible solution the flexibility of which may be, for example, but not exclusively, reflected by the signalling examples embodied by @segmentRAP and @segmentPresent. For any solution, the design of the RAP pattern underlies the following optimization targets, where the optimal configuration depends on the service provisioning.

Target overhead
Target switching bitrate: (e.g. same as non-switching, constraint, unconstraint)
Target switching quality: (e.g. progressively/gradually increasing, same as non-switching)

Some Considerations for Option 1 (Approx. Same Bitrate):
Requirements:
1. Enable a desired RAP granularity of X frames (e.g. 8 frames)
2. Gradual quality increase, no decrease
Optimization:
1. Get target server storage/Minimize server storage that fulfils the requirement
For construction we can derive the following design rules:
1. X (e.g. 8) frames RAP granularity desired (e.g. for VR streaming)
2. Stream 1 with max RAP period (N*X frames)
3. Let's define the set $S_{all}=\{S_{ij}\}$, $\forall$i and j: $1 \leq i \leq N-1$ and $i \leq j \leq N-1-i$. This set consist of all possible streams ($S_{ij}$) that have a RAP in any of the frames [i*X+1, (i+1)*X] and contains (j−i+1)*X frames.
4. Now we define $S_{opt}=\{S_1, S_2, \ldots, S_{N-1}\}$, where $S_n=S_{nj(n)}$, $1 \forall n \leq N-1$ and j(n) fulfils:
   a. Size($S_n=S_{nj(n)}$) (approx.) to the sizes of frames [n*X+1, (j(n)+1)*X] (approx. equal bitrate)
   b. $\forall$n, j(n): j(n)=n or (j(n)−n)>(j(k)−k),$\forall$k: n+1≤k≤j(n) there is no with $S_k=S_{kj(k)}$ (overhead reduction by enforcing no non-RAP GOP present if RAP period smaller than that of the corresponding alternative stream with a RAP GOP at same position)
   c. Either:
      i. Overall Size≤Target server storage & max. gradual quality increase
      ii. Minimize server storage & achieve target gradual quality increase
      iii. Joint optimization: Minimize server storage while maximizing gradual quality increase Some Considerations for Option 2 (Approx. Same Quality):
Requirements:
1. Enable a desired RAP granularity of X frames (e.g. 8 frames)
2. (Almost) Same quality as if no switching Optimization:
1. Get target server storage/Minimize server storage that fulfils the requirement
2. Get target downloaded "switching" bitrate/Minimize downloaded "switching" bitrate
For construction we can derive the following design rules:
1. X (e.g. 8) frames RAP granularity desired (e.g. for VR streaming)
2. Stream 1 with max RAP period (N*X frames)
3. Let's define the set $S_{all}=\{S_{ij}\}$, $\forall$i and j: $1 \leq i \leq N-1$ and $i \leq j \leq N-1-i$. This set consist of all possible streams ($S_{ij}$) that have a RAP in any of the frames [i*X+1, (i+1)*X] and contains (j−i+1)*X frames.
4. Now we define $S_{opt}=\{S_1, S_2, \ldots, S_{N-1}\}$, where $S_n=S_{nj(n)}$, $1 \forall n \leq N-1$ and j(n) fulfils:
   a. Quality($S_n=S_{nj(n)}$) (approx.) to the quality of frames [n*X+1, (j(n)+1)*X] (approx. equal quality)
   b. $\forall$n, j(n): j(n)=n or (j(n)−n)>(j(k)−k), $\forall$k: n+1≤k≤j(n) there is no with $S_k=S_{kj(k)}$ (overhead reduction by enforcing no non-RAP GOP present if RAP period smaller than that of the corresponding alternative stream with a RAP GOP at same position)
   c. Either:
      i. Overall Size≤Target server storage & min. downloaded "switching" bitrate
      ii. Minimize server storage & achieve target downloaded "switching" bitrate
      iii. Joint optimization: Minimize server storage while minimizing downloaded "switching" bitrate Some Considerations for Option 3 (Neither Approx. Same Quality Nor Approx. Same Bitrate):
Requirements:
1. Enable a desired RAP granularity of X frames (e.g. 8 frames)
2. Gradual quality increase during switching/Acceptable Quality variations
3. Constraints on switching bitrate
Optimization:
1. Get target server storage/Minimize server storage that fulfils the requirement
For construction we can derive the following design rules:
1. X (e.g. 8) frames RAP granularity desired (e.g. for VR streaming)
2. Stream 1 with max RAP period (N*X frames)
3. Let's define the set $S_{all}=\{S_{ij}\}$, $\forall$i and j: $1 \leq i \leq N-1$ and $i \leq j \leq N-1-i$. This set consist of all possible streams ($S_{ij}$) that have a RAP in any of the frames [i*X+1, (i+1)*X] and contains (j−i+1)*X frames.
4. Now we define $S_{opt}=\{S_1, S_2, \ldots, S_X\}$, where $S_n=S_{i(n)j(n)}$, $1 \forall n \leq X$ and N−1≤X and j(n) fulfils:
   a. $\exists$n: i(n)=x, $\forall$1≤x≤N−1
   b. Quality($S_n=S_{nj(n)}$) fulfils the Quality characteristics in Req1.
   c. Size($S_n=S_{nj(n)}$) fulfils the switching bitrate characteristics in Req2.
   d. Either:
      i. Overall Size≤Target server
      ii. Minimize server storage Note that for the last version (Option 3) there might be more than N−1 streams (N−1≤X) and there is at least one stream that has a RAP in each of the positions for the desired RAP granularity.

Further, for the above embodiments relating to various examples of media information 44 which a streaming device 10 obtains from server 12, the following is noted. The signalling for the usage of the segments in any of the solutions in a non low-delay manner, could be controlled by a time-shift consumption of a live service. A DASH client consuming a live event with a given delay, would not suffer from the issues of a small buffer. Those DASH clients could build a larger buffer and therefore do not require so frequent RAPs. In DASH the @timeShiftBufferDepth present at the MPD level or Adaptation/Representation level indicates how long in the past segments of a representation are available. Representations might have different @timeShiftBufferDepth but all of them have to be larger than the @timeShiftBufferDepth indicated at the MPD level. Thus, for embodiments using incomplete Representations, for instance, it could be envisioned that incomplete representations are not present and should not be used when using large time-shifts. Since @timeShiftBufferDepth is not a good candidate to signal the non-presence of the incomplete representations, the max time-shift (e.g. @maxTimeShiftBufferDepthForincompleteReps) could be indicated that can be used to download incomplete representations.

For the alt-RAP solution embodiments of FIG. 11A to 12, a combination of 2 representations with @maxNonRAPSegs consecutive non-RAP segments could be the solution to offer the content. One option is that the segments available are derived based on parameter @numNonRAPSeg or @maxNumNonRAPSeg, by starting from representation 1 from segment #0 segment #1 and switching alternatively to another representation up to segment #(@numNonRAPSeg-2) or segment #(@maxNumNonRAPSeg-2) then segments from representation chosen for segment #(@numNonRAPSeg-2) or segment #(@maxNumNonRAPSeg-2) from segment #(@numNonRAPSeg-1) or segment #(@maxNumNonRAPSeg-1) up to segment #(@numNonRAPSeg) or segment #(@maxNumNonRAPSeg) and so on. Another option is to signal the pattern in a white-separated list of the pattern of segments that are persistent/available, by indicating to which representations they belong, when operating in the time-shift mode. E.g. "1 1 2 1 2 2 1 2" would indicate the pattern that follows the segments that have to be downloaded and indicates the representation from which they have to be downloaded.

The white-separated list just-outlined could be the above-mentioned one-dimensional path of segments remaining as the only offered "version" of the media content after expiration of $T_{live}$. An explicit signalling of this information may be left off if, for instance, the path may be deduced from other singling from server 10 such as the indication of the initial segments of the representations on the one hand and the RAP positions of the representations on the other hand using some agreements between server 12 and client 10 such as start at representation 1 at the initial segment and then staying in representation 1 till the last non-RAP segments before switching to representation 2 and so on till reaching the maximum RAP distance. Alternatively @maxNonRAPSegments could be signalled and an anchor to identify which RAP segment is available so that the client can derive the segments that are available. That is, the client would apply the pattern or fixed path of switching between the representations of subset 30 from that anchor segment onwards, irrespective of this path being deduced from other signalling and/or convention or derived from explicit signalling. In other words, the segments available even after $T_{live}$ could be derived based on parameter @numNonRAPSeg, by starting from representation 1 from signalled segment #n (RAP segment) switching alternatively to achieve @numNonRAPSeg between RAP segments.

FIG. 11C and FIG. 11D depict two examples of representations designed for the alternation embodiments of FIG. 11A to 12 and indicate a one-dimensional path by indicating at each temporal media segments one segment out of the representations of the subset, here two of RAP distance 3 and 5, respectively, by highlighting and leaving the other non-selected segments outside the path 200 white. That is, for segments close to "real-time, i.e. to the edge, all segments are present and only the acceptable non-RAP segments are signalled. For time shift consumption, further from the edge, e.g. 20 minutes behind the edge, only some segments are available from each of the representations. If signalled with the described option, then the pattern or path 200 is signalled in a white-separated list of the pattern of segments that are persistent/available, by indicating to which representations they belong, when operating in the time-shift mode. The example in FIG. 11C would result into a list of representation indices of "1 1 2 2 2 1 2 2". If less RAP segments are available, FIG. 11D shows an example where the signalled segments and corresponding representations are "1 1 2 1 2 2 2 1". The list would indicate for each of a run of immediate consecutive segments from which of the representations of subset 30 the respective segment should be derived/downloaded from. The length of the run would correspond to the length of the list or the number of indices respectively. The client or downloader 42 could link together this run cyclically to result into an indication of the complete path 200. The list as an example for information on path 200 could be included in the MPD 70.

In summary after some time only some segments are available in each representation, and a client needs to download segments from the two representations for a continuous playback. I.e. there is no primary and secondary representations. Both, or at least those traversed by the path 200, are needed. Naturally, any client or streaming device 10 is free to use path 200 despite the availability of further segments or the possibility of choosing another path. Likewise, the signalling described above for signalling path 200, may not be restricted to the case where this signalling is especially for usage after expiration of $T_{live}$. Rather, the explicit signalling of path 200 may be used for easing the guidance of clients 200 through subset 30 if fast tune-in issues don not play a role.

For any of the above mentioned RAP distribution information, it is noted that same information may additional reveal. Or enable the derivation of, the type of each RAP such as IDR, CRA or SAP or the like.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive sets, subsets and pairs of representations and the sequences 46 of segments finally downloaded as well as the media presentation description file can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for streaming media content from a server, comprising:
   a deriver configured to derive media information from the server, the media information comprising
      first information specifying a set of representations of the media content at which the media content is available for download at the server;
      second information on a media content availability duration for which the media content is available at the server, and
      third information on a fast random access capability duration,
   a segment downloader configured to download the media content from the server in a sequence of segments with selecting, on the basis of the MPD, for each of the sequence of segments, one of the set of representations and retrieving the respective segment from the representation selected for the respective segment,
   wherein the segment downloader is configured to, when commencing downloading the media content by selecting and retrieving from the set of representations,
      derive a minimum of an availability duration of a primary representation of the set of representations from the media content availability duration, and
      check whether the fast random access capability duration has already been exceeded, and if so,
         perform the selecting, on the basis of the MPD, for each of the sequence of segments, one of the set of representations in a manner so that
            the primary representation is selected and a set of one or more secondary representations of the subset of representations is excluded from being selected, and
      if not,
         perform the selecting, on the basis of the MPD, for each of the sequence of segments, so that the set of one or more secondary representations of the subset of representations is available for selection, and use the set of one or more secondary representations for a faster random access.

2. The device of claim 1, wherein the set of representations comprises a primary representation and a set of one or more secondary representations, and
   wherein the media information further comprises fourth information indicating RAP distributions of the representations of the set of representations.

3. The device of claim 1, wherein the third information is indicative of the fast random access capability duration for each subset faster for a faster tune-in into the respective subset.

4. A server offering a download of a media content, wherein the server stores and sends-out, upon request, to a client
   segments of a set of representations of the media content, with
      the representations of the set of representations having the media content coded thereinto in segments, and
      the representations of at least a subset of the set of representations differing in a temporal distribution of random access points, and
   a media presentation description comprising
      a first information specifying a set of representations of a media content at which the media content is available for download at the server;
      a second information on a media content availability duration for which the media content is available at the server, and
      a third information on a fast random access capability duration,
   wherein the server is configured to
      provide a minimum availability duration for a primary representation of the set of representations according to the media content availability duration, and
      provide a minimum availability duration for a set of one or more secondary representations of the set of representations according to the fast random access capability duration,
   wherein the fast random access capability duration is shorter than the media content availability duration.

5. The device of claim 4, wherein the third information is indicative of the fast random access capability duration for each subset faster for a faster tune-in into the respective subset.

6. A method for streaming media content from a server, comprising:
   deriving media information from the server, the media information comprising
      first information specifying a set of representations of the media content at which the media content is available for download at the server;
      second information on a media content availability duration for which the media content is available at the server, and
      third information on a fast random access capability duration,
   downloading the media content from the server in a sequence of segments with selecting, on the basis of the MPD, for each of the sequence of segments, one of the set of representations and retrieving the respective segment from the representation selected for the respective segment,
   the method comprising, when commencing downloading the media content by selecting and retrieving from the set of representations,
      deriving a minimum of an availability duration of a primary representation of the set of representations from the media content availability duration, and
      checking whether the fast random access capability duration has already been exceeded, and if so,
         performing the selecting, on the basis of the MPD, for each of the sequence of segments, one of the set of representations in a manner so that
            the primary representation is selected and a set of one or more secondary representations of the subset of representations is excluded from being selected,
      and if not,
         performing the selecting, on the basis of the MPD, for each of the sequence of segments, so that the set of one or more secondary representations of the subset of representations is available for selection, and the set of one or more secondary representations is used for a faster random access.

7. A non-transitory digital storage medium having a computer program stored thereon to perform the method for streaming media content from a server, comprising:
   deriving media information from the server, the media information comprising
      first information specifying a set of representations of the media content at which the media content is available for download at the server;
      second information on a media content availability duration for which the media content is available at the server, and
      third information on a fast random access capability duration,
   downloading the media content from the server in a sequence of segments with selecting, on the basis of the MPD, for each of the sequence of segments, one of the set of representations and retrieving the respective segment from the representation selected for the respective segment,
   the method comprising, when commencing downloading the media content by selecting and retrieving from the set of representations,
      deriving a minimum of an availability duration of a primary representation of the set of representations from the media content availability duration, and
      checking whether the fast random access capability duration has already been exceeded, and if so,
         performing the selecting, on the basis of the MPD, for each of the sequence of segments, one of the set of representations in a manner so that
            the primary representation is selected and a set of one or more secondary representations of the subset of representations are excluded from being selected,
      and if not,
         performing the selecting, on the basis of the MPD, for each of the sequence of segments, so that the set of one or more secondary representations of the subset of representations is available for selection, and the set of one or more secondary representations is used for a faster random access,
   when said computer program is run by a computer.

\* \* \* \* \*